US011176500B2

(12) United States Patent
DaCosta et al.

(10) Patent No.: US 11,176,500 B2
(45) Date of Patent: *Nov. 16, 2021

(54) INTERACTIVE REAL TIME SYSTEM AND REAL TIME METHOD OF USE THEREOF IN CONVEYANCE INDUSTRY SEGMENTS

(71) Applicant: TELEPORT MOBILITY, INC., San Diego, CA (US)

(72) Inventors: Alexis DaCosta, Santa Clara, CA (US); Vince Coletti, San Marcos, CA (US)

(73) Assignee: TELEPORT MOBILITY, INC., San Diego, CA (US)

(*) Notice: Subject to any disclaimer, the term of this patent is extended or adjusted under 35 U.S.C. 154(b) by 787 days.

This patent is subject to a terminal disclaimer.

(21) Appl. No.: 15/675,757

(22) Filed: Aug. 13, 2017

(65) Prior Publication Data
US 2018/0053136 A1    Feb. 22, 2018

Related U.S. Application Data

(60) Provisional application No. 62/539,706, filed on Aug. 1, 2017, provisional application No. 62/482,306, filed
(Continued)

(51) Int. Cl.
G06Q 10/06    (2012.01)
G06Q 30/06    (2012.01)
(Continued)

(52) U.S. Cl.
CPC ... *G06Q 10/063114* (2013.01); *G01C 21/343* (2013.01); *G01C 21/3438* (2013.01);
(Continued)

(58) Field of Classification Search
CPC combination set(s) only.
See application file for complete search history.

(56) References Cited

U.S. PATENT DOCUMENTS 6,182,010 B1    1/2001   Berstis .................. 701/211
6,297,748 B1   10/2001   Lappenbusch et al. ...... 340/905
(Continued)

FOREIGN PATENT DOCUMENTS

CA    2782611 A1    6/2011
CA    2974452 A1    7/2016
(Continued)

OTHER PUBLICATIONS

A. Y. S. Lam, Y. Leung and X. Chu, "Autonomous-Vehicle Public Transportation System: Scheduling and Admission Control," in IEEE Transactions on Intelligent Transportation Systems, vol. 17, No. 5, pp. 1210-1226, May 2016, doi: 10.1109/TITS.2015.2513071. (Year: 2016).*
(Continued)

*Primary Examiner* — Crystol Stewart
(74) *Attorney, Agent, or Firm* — Eleanor Musick; Musick Davison LLP

(57) ABSTRACT

The present invention recognizes that there is a long felt need for more efficient systems in the interactive conveyance industry for goods and services. A first aspect of the present invention generally relates to an interactive real time system in the conveyance and other industries. A second aspect of the present invention generally relates to a real time method of use of the interactive system of the present invention.

78 Claims, 8 Drawing Sheets

Related U.S. Application Data on Apr. 6, 2017, provisional application No. 62/426,549, filed on Nov. 27, 2016, provisional application No. 62/375,491, filed on Aug. 16, 2016.

(51) Int. Cl.

| | |
|---|---|
| *G01C 21/34* | (2006.01) |
| *H04W 4/029* | (2018.01) |
| *G06Q 10/02* | (2012.01) |
| *H04W 4/02* | (2018.01) |
| *G08G 1/127* | (2006.01) |
| *G06Q 10/08* | (2012.01) |
| *G06Q 50/30* | (2012.01) |
| *G06F 16/248* | (2019.01) |
| *G08G 1/00* | (2006.01) |
| *G06F 16/2457* | (2019.01) |
| *G08G 5/00* | (2006.01) |
| *H04W 4/20* | (2018.01) |
| *H04W 4/42* | (2018.01) |
| *G08G 1/005* | (2006.01) |
| *G06F 3/0485* | (2013.01) |
| *G06Q 50/32* | (2012.01) |

(52) U.S. Cl.
CPC ....... *G06F 16/24578* (2019.01); *G06Q 10/02* (2013.01); *G06Q 10/06316* (2013.01); *G06Q 10/063112* (2013.01); *G06Q 30/0633* (2013.01); *G06Q 30/0635* (2013.01); *G08G 1/005* (2013.01); *G08G 1/127* (2013.01); *G08G 1/202* (2013.01); *G08G 5/0043* (2013.01); *G08G 5/0069* (2013.01); *H04W 4/025* (2013.01); *H04W 4/029* (2018.02); *H04W 4/20* (2013.01); *H04W 4/42* (2018.02); *G01C 21/34* (2013.01); *G06F 3/0485* (2013.01); *G06F 16/248* (2019.01); *G06Q 10/0833* (2013.01); *G06Q 50/30* (2013.01); *G06Q 50/32* (2013.01)

(56) References Cited

U.S. PATENT DOCUMENTS

| | | | |
|---|---|---|---|
| 6,356,838 B1 | 3/2002 | Paul | |
| 7,561,069 B2 | 7/2009 | Horstemeyer | |
| 7,840,427 B2 | 11/2010 | O'Sullivan | |
| 7,894,984 B2 | 2/2011 | Rasmussen et al. | 701/208 |
| 7,920,967 B1 | 4/2011 | Harris et al. | |
| 7,941,267 B2 | 5/2011 | Adamczyk et al. | |
| 8,005,488 B2 | 8/2011 | Staffaroni et al. | |
| 8,244,594 B2 | 8/2012 | Barron et al. | |
| 8,285,570 B2 | 10/2012 | Meyer et al. | |
| 8,510,043 B1 | 8/2013 | Whiton et al. | |
| 8,630,791 B2 | 1/2014 | Yuasa | |
| 8,635,012 B2 | 1/2014 | O'Sullivan et al. | |
| 8,688,532 B2 | 4/2014 | Khunger et al. | 705/26.1 |
| 8,768,565 B2 | 7/2014 | Jefferies et al. | |
| 9,007,238 B2 | 4/2015 | Whiton et al. | |
| 9,014,876 B2 | 4/2015 | Mason et al. | |
| 9,026,367 B2 | 5/2015 | Paek et al. | |
| 9,026,454 B2 | 5/2015 | Hinrichs et al. | |
| 9,058,703 B2 | 6/2015 | Ricci | |
| 9,066,206 B2 | 6/2015 | Lin et al. | H04W 4/023 |
| 9,068,852 B2 | 6/2015 | Mason et al. | |
| 9,157,748 B2 | 10/2015 | Millspaugh | G01C 21/20 |
| 9,164,507 B2 | 10/2015 | Cheatham et al. | |
| 9,256,852 B1 | 2/2016 | Myllymaki | |
| 9,262,929 B1* | 2/2016 | Roy | G06Q 10/047 |
| 9,364,178 B2 | 6/2016 | Duncan et al. | |
| 9,368,026 B1 | 6/2016 | Herbach et al. | |
| 9,424,515 B2 | 8/2016 | Atlas | |
| 9,436,182 B2 | 9/2016 | Nemec et al. | |
| 9,459,622 B2 | 10/2016 | Abhyanker | |
| 9,488,484 B2 | 11/2016 | Lord et al. | |
| 9,534,913 B2 | 1/2017 | Newlin et al. | |
| 9,552,564 B1 | 1/2017 | Martenis | |
| 9,557,183 B1 | 1/2017 | Ross et al. | G01C 21/34 |
| 9,558,469 B2 | 1/2017 | Lord et al. | |
| 9,562,785 B1 | 2/2017 | Racah et al. | |
| 9,569,740 B2 | 2/2017 | Lord et al. | |
| 9,581,455 B2 | 2/2017 | Lord et al. | |
| 9,606,539 B1 | 3/2017 | Kentley et al. | |
| 9,613,386 B1 | 4/2017 | Arden et al. | |
| 9,619,776 B1 | 4/2017 | Lord et al. | |
| 9,625,906 B2 | 4/2017 | Meuleau et al. | |
| 9,632,502 B1 | 4/2017 | Levinson et al. | |
| 9,646,356 B1 | 5/2017 | Schwie et al. | |
| 9,665,101 B1 | 5/2017 | Templeton | |
| 9,671,233 B2 | 6/2017 | Holden et al. | G01C 21/30 |
| 9,679,489 B2 | 6/2017 | Lambert et al. | G08G 1/202 |
| 9,684,914 B1 | 6/2017 | Porter et al. | |
| 9,689,694 B2 | 6/2017 | Lord et al. | |
| 9,706,367 B2 | 7/2017 | Tao et al. | |
| 9,715,378 B2 | 7/2017 | Dickerson et al. | |
| 9,716,565 B2 | 7/2017 | Mandeville-Clarke et al. | |
| 9,718,397 B2 | 8/2017 | Kalanick et al. | |
| 9,726,506 B2 | 8/2017 | O'Beirne et al. | |
| 9,741,010 B1 | 8/2017 | Heinla | |
| 9,743,239 B1 | 8/2017 | Mishra | |
| 9,754,490 B2 | 9/2017 | Kentley et al. | |
| 9,769,616 B1 | 9/2017 | Pao et al. | |
| 9,776,512 B2 | 10/2017 | Netzer | |
| 9,778,057 B2 | 10/2017 | O'Mahony et al. | |
| 9,778,060 B2 | 10/2017 | Cheng | |
| 9,786,187 B1 | 10/2017 | Bar-Zeev et al. | |
| 9,805,519 B2 | 10/2017 | Ramanujam | |
| 9,805,605 B2 | 10/2017 | Ramanujam | |
| 9,811,086 B1 | 11/2017 | Poeppel et al. | |
| 9,813,510 B1 | 11/2017 | Nickels et al. | |
| 9,857,188 B1 | 1/2018 | O'Hare et al. | |
| 9,857,190 B2 | 1/2018 | Marueli et al. | |
| 9,886,671 B2 | 2/2018 | Lord et al. | |
| 9,898,791 B1 | 2/2018 | Stumpf et al. | |
| 9,904,900 B2 | 2/2018 | Cao | |
| 10,055,995 B2 | 8/2018 | Marco et al. | |
| D832,304 S | 10/2018 | Whatman et al. | |
| 10,093,252 B2 | 10/2018 | Zych | |
| 10,104,605 B1 | 10/2018 | Parshin et al. | |
| 10,168,164 B2 | 1/2019 | Shelby et al. | |
| 10,227,178 B2 | 3/2019 | High et al. | |
| 10,345,117 B2 | 7/2019 | O'Beirne et al. | |
| 10,349,223 B1 | 7/2019 | Yoo et al. | |
| 10,365,783 B2 | 7/2019 | Bowden et al. | |
| 10,387,791 B2 | 8/2019 | Dukatz et al. | |
| 10,460,411 B2 | 10/2019 | Liu | |
| 10,467,554 B2 | 11/2019 | Yoo et al. | |
| 10,504,258 B2 | 12/2019 | Okumura | |
| 10,628,758 B2 | 4/2020 | Ikeda et al. | |
| 2004/0143466 A1* | 7/2004 | Smith | G08G 1/20 705/6 |
| 2009/0234564 A1 | 9/2009 | Onishi et al. | |
| 2009/0248587 A1* | 10/2009 | Van Buskirk | G06Q 10/063112 705/80 |
| 2009/0319096 A1 | 12/2009 | Offer et al. | |
| 2010/0280884 A1 | 11/2010 | Levine et al. | |
| 2010/0312591 A1 | 12/2010 | Wu | |
| 2011/0055046 A1 | 3/2011 | Bowen et al. | |
| 2011/0137666 A1 | 6/2011 | Zuida et al. | |
| 2011/0153629 A1* | 6/2011 | Lehmann | G06Q 30/06 707/758 |
| 2013/0096827 A1 | 4/2013 | McCall et al. | |
| 2013/0103313 A1 | 4/2013 | Moore et al. | |
| 2013/0132140 A1 | 5/2013 | Amin et al. | |
| 2014/0026065 A1 | 1/2014 | Wang | |
| 2014/0032034 A1* | 1/2014 | Raptopoulos | G08G 5/0069 701/25 |
| 2014/0046585 A1 | 2/2014 | Morris et al. | |
| 2014/0067488 A1 | 3/2014 | James et al. | |
| 2014/0148970 A1 | 5/2014 | Dufford et al. | |
| 2014/0172727 A1* | 6/2014 | Abhyanker | G06Q 30/0645 705/307 |
| 2014/0173511 A1 | 6/2014 | Lehmann et al. | |

(56) References Cited

U.S. PATENT DOCUMENTS

| | | | |
|---|---|---|---|
| 2014/0229258 A1* | 8/2014 | Seriani | G06Q 10/08345 705/14.23 |
| 2014/0309876 A1 | 10/2014 | Ricci | |
| 2014/0365268 A1* | 12/2014 | Masterlark | G06F 11/1474 705/7.28 |
| 2015/0039365 A1* | 2/2015 | Haque | G06Q 10/06311 705/7.13 |
| 2015/0081362 A1* | 3/2015 | Chadwick | G06Q 50/30 705/7.14 |
| 2015/0161564 A1 | 6/2015 | Sweeney et al. | |
| 2015/0161752 A1 | 6/2015 | Barreto et al. | G06Q 50/30 |
| 2015/0185034 A1 | 7/2015 | Abhyanker | |
| 2015/0206267 A1 | 7/2015 | Khanna et al. | |
| 2015/0281387 A1 | 10/2015 | Barreto | |
| 2015/0294566 A1* | 10/2015 | Huang | G08G 1/133 701/41 |
| 2015/0323333 A1 | 11/2015 | Lord et al. | |
| 2015/0324708 A1 | 11/2015 | Skipp et al. | |
| 2015/0325128 A1 | 11/2015 | Lord et al. | |
| 2015/0338852 A1 | 11/2015 | Ramanujam | |
| 2015/0339928 A1 | 11/2015 | Ramanujam | G06G 1/202 |
| 2015/0356703 A1 | 12/2015 | Ellis et al. | |
| 2015/0379437 A1* | 12/2015 | Reich | G06Q 10/02 705/5 |
| 2016/0034845 A1 | 2/2016 | Hiyama et al. | G06Q 10/063114 |
| 2016/0055605 A1 | 2/2016 | Kim et al. | |
| 2016/0055743 A1 | 2/2016 | Raj | |
| 2016/0098650 A1* | 4/2016 | Ratti | G06Q 10/02 705/5 |
| 2016/0104110 A1 | 4/2016 | Jones et al. | |
| 2016/0110836 A1 | 4/2016 | Garg et al. | |
| 2016/0125735 A1* | 5/2016 | Tuukkanen | G08G 1/202 701/23 |
| 2016/0138928 A1 | 5/2016 | Guo et al. | |
| 2016/0171574 A1 | 6/2016 | Paulucci et al. | |
| 2016/0171637 A1 | 6/2016 | Rai | |
| 2016/0187150 A1 | 6/2016 | Sherman et al. | |
| 2016/0231129 A1 | 8/2016 | Erez et al. | |
| 2016/0244311 A1 | 8/2016 | Burks et al. | |
| 2016/0247106 A1 | 8/2016 | Dalloro et al. | |
| 2016/0298977 A1 | 10/2016 | Newlin et al. | |
| 2016/0321771 A1 | 11/2016 | Liu et al. | |
| 2016/0334232 A1 | 11/2016 | Zhuang | |
| 2016/0334797 A1* | 11/2016 | Ross | G06Q 10/08 |
| 2016/0356615 A1 | 12/2016 | Arata et al. | |
| 2016/0356624 A1 | 12/2016 | O'Beirne et al. | |
| 2016/0364679 A1 | 12/2016 | Cao | |
| 2016/0364812 A1 | 12/2016 | Cao | |
| 2016/0364823 A1 | 12/2016 | Cao | |
| 2017/0011324 A1* | 1/2017 | Truong | G06Q 50/32 |
| 2017/0024393 A1 | 1/2017 | Choksi et al. | G06F 17/3053 |
| 2017/0038948 A1 | 2/2017 | Cun et al. | |
| 2017/0059336 A1* | 3/2017 | Huang | G01C 21/343 |
| 2017/0059347 A1 | 3/2017 | Flier et al. | |
| 2017/0083957 A1 | 3/2017 | Ross et al. | |
| 2017/0091856 A1 | 3/2017 | Canberk et al. | |
| 2017/0098224 A1 | 4/2017 | Marco et al. | |
| 2017/0102243 A1 | 4/2017 | Samocha et al. | |
| 2017/0115125 A1 | 4/2017 | Outwater et al. | |
| 2017/0123421 A1 | 5/2017 | Kentley et al. | |
| 2017/0123422 A1 | 5/2017 | Kentley et al. | |
| 2017/0123429 A1 | 5/2017 | Levinson et al. | |
| 2017/0126810 A1 | 5/2017 | Kentley et al. | |
| 2017/0138749 A1 | 5/2017 | Pan et al. | G01C 21/3438 |
| 2017/0141873 A1 | 5/2017 | Mandeville-Clarke et al. | |
| 2017/0147959 A1* | 5/2017 | Sweeney | G07C 5/008 |
| 2017/0163398 A1 | 6/2017 | Ross et al. | |
| 2017/0169366 A1 | 6/2017 | Klein et al. | |
| 2017/0176989 A1 | 6/2017 | Hay et al. | |
| 2017/0178085 A1* | 6/2017 | Kragh | G06Q 10/063114 |
| 2017/0187787 A1 | 6/2017 | Syamala et al. | |
| 2017/0192428 A1 | 7/2017 | Vogt et al. | |
| 2017/0192437 A1 | 7/2017 | Bier et al. | |
| 2017/0193419 A1 | 7/2017 | Haparnas et al. | G06Q 10/06398 |
| 2017/0193627 A1 | 7/2017 | Urmson et al. | |
| 2017/0200321 A1 | 7/2017 | Hummel et al. | |
| 2017/0212525 A1 | 7/2017 | Wang et al. | |
| 2017/0213308 A1 | 7/2017 | Wellborn et al. | |
| 2017/0220045 A1 | 8/2017 | Templeton | |
| 2017/0227370 A1 | 8/2017 | O'Mahony et al. | |
| 2017/0234687 A1 | 8/2017 | Tseng et al. | |
| 2017/0132934 A1 | 9/2017 | Kentley et al. | |
| 2017/0265040 A1 | 9/2017 | Friedlander et al. | |
| 2017/0262790 A1 | 10/2017 | Khasis | |
| 2017/0285642 A1 | 10/2017 | Rander | |
| 2017/0293991 A1 | 10/2017 | High et al. | |
| 2017/0313323 A1 | 11/2017 | Tseng et al. | |
| 2017/0316387 A1 | 11/2017 | Joshi et al. | |
| 2017/0277191 A1 | 12/2017 | Fairfield et al. | |
| 2017/0351987 A1 | 12/2017 | Liu | |
| 2017/0352125 A1 | 12/2017 | Dicker et al. | |
| 2017/0372703 A1* | 12/2017 | Sung | G10L 15/30 |
| 2018/0004202 A1 | 1/2018 | Onaga et al. | |
| 2018/0004211 A1 | 1/2018 | Grimm et al. | |
| 2018/0004224 A1 | 1/2018 | Arndt et al. | |
| 2018/0015801 A1 | 1/2018 | Mohamed et al. | |
| 2018/0024552 A1 | 1/2018 | She | |
| 2018/0024554 A1* | 1/2018 | Brady | G05D 1/0088 701/23 |
| 2018/0025298 A1 | 1/2018 | Baggott et al. | |
| 2018/0033058 A1* | 2/2018 | Mukherjee | H04L 67/306 |
| 2018/0039917 A1 | 2/2018 | Buttolo et al. | |
| 2018/0053136 A1 | 2/2018 | DaCosta et al. | |
| 2018/0053423 A1 | 2/2018 | DaCosta et al. | |
| 2018/0059663 A1 | 3/2018 | Yako et al. | |
| 2018/0060813 A1 | 3/2018 | Ford | |
| 2018/0060827 A1 | 3/2018 | Abbas et al. | |
| 2018/0074494 A1 | 3/2018 | Myers et al. | |
| 2018/0074495 A1 | 3/2018 | Myers et al. | |
| 2018/0087918 A1 | 3/2018 | Yamashita et al. | |
| 2018/0089786 A1 | 3/2018 | Shi et al. | |
| 2018/0100747 A1 | 4/2018 | Greenwood et al. | |
| 2018/0101170 A1 | 4/2018 | Cawley et al. | |
| 2018/0101179 A1 | 4/2018 | Louey et al. | |
| 2018/0075754 A1 | 8/2018 | Salter et al. | |
| 2018/0245942 A1 | 8/2018 | Scarr et al. | |
| 2018/0276863 A1 | 9/2018 | Nerurkar et al. | |
| 2018/0336510 A1 | 11/2018 | DaCosta et al. | |
| 2018/0356821 A1 | 12/2018 | Kentley-Klay et al. | |
| 2018/0374182 A1 | 12/2018 | Khanna et al. | |
| 2019/0033883 A1 | 1/2019 | Ferguson et al. | |
| 2019/0094032 A1 | 3/2019 | Shelby et al. | |
| 2019/0129413 A1 | 5/2019 | Chamberlain et al. | |
| 2019/0204110 A1 | 7/2019 | Dubielzyk et al. | |
| 2019/0251496 A1 | 8/2019 | DaCosta et al. | |
| 2019/0293447 A1 | 9/2019 | O'Beirne et al. | |
| 2020/0211142 A1 | 7/2020 | James et al. | |
| 2021/0103877 A1 | 4/2021 | DaCosta et al. | |

FOREIGN PATENT DOCUMENTS

| | | |
|---|---|---|
| CN | 105894099 A | 8/2016 |
| EP | 2507753 A4 | 10/2012 |
| EP | 3183707 A1 | 6/2017 |
| WO | WO2015160782 A1 | 10/2015 |
| WO | WO2017053047 A1 | 3/2017 |
| WO | WO2017064202 A1 | 4/2017 |
| WO | WO2017079222 A1 | 5/2017 |
| WO | WO2017156586 A1 | 9/2017 |
| WO | WO2017172415 A1 | 10/2017 |
| WO | WO2017173209 A1 | 10/2017 |
| WO | WO2017145171 A3 | 11/2017 |
| WO | WO2018071127 A1 | 4/2018 |
| WO | WO2019018695 A1 | 1/2019 |
| WO | WO2019027715 A1 | 2/2019 |
| WO | WO2019027718 A1 | 2/2019 |
| WO | WO2019118827 A1 | 6/2019 |
| WO | WO2019204783 A1 | 10/2019 |

(56) References Cited

OTHER PUBLICATIONS

"Why you'll love the new Apple CarPlay Features in iOS for iPhone 5/6/SE," from Auto Connected Car News, Jul. 3, 2016.
"Mapping a new course with smartphone apps," The Mercury News, Sep. 14, 2016.
"Catch a Ride with Lyft or Uber Straight from Apple Maps in iOS 11," from ios.gadgethacks.com, Oct. 6, 2017.
"Uber's Sire and Apple Maps Integrations Have Disappeared," from macrumors.com, Jan. 31, 2018.
"Google unveils ride-sharing price comparison tool," from businessinsider.com, obtained Aug. 18, 2018.
"Our Driver App Functionality," Materials from Uber from SEC.gov, S-1 SEC Filing of Apr. 11, 2019.
"Uber Freight," Materials from Uber from SEC.gov, S-1 SEC Filing of Apr. 11, 2019.
"Personal Mobility," Materials from Uber from SEC.gov, S-1 SEC filing of Apr. 11, 2019.
PCT Search and Examination Reports for PCT/US18/43359, dated Oct. 16, 2018.
PCT Search and Examination Reports for PCT/US18/43363, dated Oct. 15, 2018.
Anonymous: "Heat map—Wikipedia", Oct. 16, 2014 (Oct. 16, 2014), XP055424374, Rerieved from the Internet: URL: http://web.archive.org/web/20141016035026/https://fr.wikipedia.org/wiki/Heat_map[retrieved on Nov. 13, 2017].
EP18841983.2 Extended European Search Report and Search Opinion, dated Apr. 8, 2021, 18 pages.
EP18841111.0 Extended European Search Report and Search Opinion, dated Mar. 30, 2021, 18 pages.

\* cited by examiner

INTERACTIVE REAL TIME SYSTEM AND REAL TIME METHOD OF USE THEREOF IN CONVEYANCE INDUSTRY SEGMENTS

RELATED APPLICATIONS AND/OR PRIORITY STATEMENT

The present application claims benefit of priority to U.S. Provisional Application Ser. No. 62/375,491 filed Aug. 16, 2016, U.S. Provisional Application Ser. No. 62/426,549 filed Nov. 27, 2016, U.S. Provisional Application Ser. No. 62/482,306 filed Apr. 6, 2017, and U.S. Provisional Application Ser. No. 62/539,706 filed Aug. 1, 2017, each of which are incorporated by reference herein in their entirety for all purposes.

TECHNICAL FIELD

The present invention relates generally to the fields of interactive real time systems and real time methods of use in the conveyance industry segments.

BACKGROUND

As in any new industry or industry segment, when created, there are typically multiple inefficiencies in the related systems and methods due to there not being enough data or knowledge on how to optimize these systems and methods ahead of time. These inefficiencies are typically identified over time through trial and error, which leads to technological advancement in the field. The same can be said about the conveyance industry and many of the new conveyance industry segments including but not limited to the ride-hail industry segment, rideshare industry segment, good delivery industry segment, and courier industry segment.

The current inefficient systems and methods available in the conveyance industry segments lead to disadvantages for the companies or entities themselves, hereinafter referred to as service providers, as well as the representatives carrying out the services for the service providers. Also, currently there are difficulties and challenges to efficiently utilize, dispatch, and/or provide or perform conveyance services using autonomous vehicles for both service providers and owners or controllers of autonomous vehicles.

The problems relating to the current systems and methods used in the conveyance industry segments are rooted in computer technology and tied to the fact that the modern conveyance industry segments operate and change drastically in real time or near real time. Conveyance industry segments are real time or near real time environments in that conveyance service requests are available one second and gone the next second. In the real time or near real time conveyance industry segments, a representative cannot procure all or most of the real time or near real time information and analyze or evaluate this information accurately to make a well-informed decision on the fly. There is currently no real time or near real time system or real time or near real time method that can assist a representative with this type of analysis. This lack of a real time or near real time system or real time or near real time method leads to a representative securing or obtaining a suboptimal, one-size-fits-all conveyance service request due to the inability to apply their own preferences.

Currently, a representative obtaining a ride service request in the ride-hail industry segment, can have very different ride options, prices, wait times, and times to destination depending on which service provider a given conveyance service request is from and when the conveyance service request is secured or obtained. However, a representative is only given one conveyance service request from only one service provider to accept or decline. Currently, there is a poor system and method to dispatch or assign representatives to conveyance service requests. Thus, there exists a need that the present invention addresses.

The current systems and methods for a representative to analyze or evaluate incoming conveyance service requests are very difficult and time consuming in the fast-paced, real time or near real time environment of conveyance industry segments. The current technology does not permit a representative to analyze or evaluate and then secure or obtain conveyance service requests that the representative would prefer based on their individual preferences. Representatives are currently given a single conveyance service request and only have the option to accept or decline that specific conveyance service request without an alternative. Generally, any details of a conveyance service request a representative is securing or obtaining are not provided ahead of time, but are only revealed after that conveyance service request is secured or obtained. A representative must choose to either secure or obtain a conveyance service request without knowing any of the details of the conveyance service to be provided or choose not to work at all.

Furthermore, a representative is penalized for canceling a conveyance service request the representative does not wish to fulfill even though the representative likely never would have secured or obtained that conveyance service request in the first place had the representative been given a choice. This disadvantage among others, has led to the common practice of representatives working for more than one service provider at the same time to give the representatives some semblance of choice. However, that method of analyzing or evaluating is a very laborious and time consuming process which is not useful or practical in the real time or near real time environment of conveyance industry segments.

To analyze or evaluate conveyance service requests, a representative would need to login to multiple applications from different service providers and navigate between these applications, viewing one individual conveyance service request per application. Analyzing or evaluating conveyance service requests in such a way takes a lot of time and can cause a representative to miss conveyance service requests that the representative would consider as preferred due to the real time or near real time environment. Currently there is no system or method that a representative can use as a tool to analyze or evaluate conveyance service requests in real time or near real time.

A representative is currently not able to analyze or evaluate conveyance service requests from more than one service provider in real time or near real time given conventional systems and methods, which is a frustrating hindrance when every other aspect of conveyance industry segments operates in real time or near real time. With no way to analyze or evaluate conveyance service requests continuously in real time or near real time, a representative currently is not able to maximize their profit or work as efficiently as they would like, as the representative is forced to secure or obtain less preferred conveyance service requests. To secure or obtain a preferred conveyance service request, a representative may have to wait and pass up less preferred conveyance service requests for a more preferred conveyance service request to become available to them, as representatives are only provided one conveyance service request at a time. A representative wishing to work more efficiently is not able to do so given the current limitations of the systems and methods in the conveyance industry segments.

There is also currently no system or method to analyze or evaluate and secure or obtain conveyance service requests in real time or near real time across more than one conveyance industry segment. This lack of a real time or near real time system or real time or near real time method further limits a representative's exposure in the conveyance industry and their ability to operate more efficiently if the representative wants to provide conveyance services in more than one conveyance industry segment. In addition, current limitations also reduce the amount of potential preferred conveyance service requests available to a representative. Currently, if a representative wants to provide a ride in the ride-hail industry segment, then deliver food in the good delivery industry segment because that conveyance service request is in close proximity to them, a representative would not have the ability to analyze or evaluate and then secure or obtain these preferred conveyance service requests in real time or near real time. If there were a system and method for a representative to be able to do so, the representative would have access to a greater number of diverse conveyance service requests and gives the representative more flexibility in providing conveyance services within the conveyance industry. One non-limiting aspect of the present invention solves this problem for representatives.

There is currently no system, method or product that can analyze or evaluate conveyance service requests continuously in real time or near real time and preferably secure or obtain a subsequent or additional preferred conveyance service request while a representative performs a conveyance service. In addition, there is no technology available to automatically analyze or evaluate and then secure or obtain more than one preferred conveyance service request concurrently for a representative in real time or near real time. Also, existing technology cannot automatically analyze or evaluate and then secure or obtain an additional or subsequent preferred conveyance service request in real time or near real time. A representative's decision-making ability is limited given the current state of the art. Currently, only one conveyance service request, not even a preferred conveyance service request, can be secured or obtained at a time. After completion of a conveyance service, only then can a representative manually secure or obtain a new conveyance service request.

The current systems and methods of securing or obtaining a conveyance service request in a conveyance industry segment can also be unsafe for a representative, conveyance client, and people around them. A representative that provides one conveyance service after another often tries to perform their faux analysis or just accept the next conveyance service request while still driving to operate more efficiently. Currently, the only way this type of analysis can be done is by opening different applications in hopes to find the next available conveyance service request. As a result, representatives take their eyes off the road and their surroundings, greatly increasing the probability of getting into an accident. In some states, it is illegal to operate a mobile device while driving. Existing technology is lacking in its ability to perform this type of analysis for a representative in real time or near real time and then secure or obtain a preferred conveyance service request for them. The present invention would allow a representative to be more focused on providing the conveyance service at hand as the representative would not need to be distracted with their mobile device to find their next preferred conveyance service request.

Currently, representatives are assigned or provided with one conveyance service request at a time that can either be blindly accepted, without knowing any details, or rejected. This process is not a useful way of presenting conveyance service requests to representatives.

Currently, some service providers dynamically increase prices in certain areas for various reasons. Representatives looking to work more efficiently or earn more money try to work in these areas as much as possible. The problem is that by the time a representative gets to the area with elevated pricing, the increased pricing has either moved or been removed. Representatives experience the challenge of chasing the elevated pricing areas but generally do not have the chance to capitalize on them. As a result, some representatives have given up on chasing areas with elevated pricing. Currently there is no system or method a representative can use to predict or estimate where the areas of elevated pricing will be in order to maximize their earning potential.

Analyzing or evaluating multiple conveyance service requests to be performed sequentially creates a situation known as the travelling salesman problem or dynamic travelling salesman problem. The problem of analyzing or evaluating is compounded even further when new or additional conveyance service requests to be secured or obtained become available in real time or near real time. One non-limiting aspect of the present invention solves this problem.

Many problems described herein associated with representatives can also be related to autonomous vehicles and owners or controllers of autonomous vehicles.

Service providers are also disadvantaged due to inefficient systems and methods currently used in conveyance industry segments. The biggest problem among service providers currently is the lack of representatives to provide conveyance services. Representatives, as mentioned, switch between different service providers at will. As a result, service providers do not have a stable supply of representatives to provide conveyance services. With autonomous vehicles becoming more common, service providers think they have found the solution to this problem by using autonomous vehicles to supplement the lack of representatives.

If service providers supplement the lack of representatives with autonomous vehicles, other issues such as the vehicle routing problem and vehicle dispatch problem become prevalent. Existing technology is lacking in its ability to analyze or evaluate and then secure or obtain a preferred conveyance service request for an autonomous vehicle. There is currently no system, method, or product that can automatically analyze or evaluate conveyance service requests continuously in real time or near real time and preferably secure or obtain a subsequent or additional preferred conveyance service request while an autonomous vehicle performs a conveyance service. The decision-making ability of an owner or controller of an autonomous vehicle or a service provider is limited given the current state of the art. One non-limiting aspect of the present invention solves this problem.

Currently, service providers outsource labor through representatives, however many issues have arisen. Disputes over including but not limited to wages, medical coverage, vacation pay, insurance, profit sharing, taxi permits, vehicle qualifications, vehicle maintenance, and corporate culture have all arisen and have been causing a lot of chaos. Service providers can use autonomous vehicles to address some of these challenges and increase profits, however an efficient system and method to incorporate or utilize autonomous vehicles into the conveyance industry segments is needed.

When autonomous vehicles are more common, an owner of an autonomous vehicle could enlist their vehicle to operate in at least one conveyance industry segment when not in use by the owner. Rather than having an autonomous vehicle sitting in a parking garage for eight hours while the owner is at work, the autonomous vehicle could be used to generate income in at least one conveyance industry segment for the owner during that time as well as supplement the lack of available representatives for a service provider. One non-limiting aspect of the present invention solves this problem.

Another problem faced by an owner or controller of an autonomous vehicle is how to enroll or employ an autonomous vehicle into a system that will facilitate performing or providing conveyance services. Furthermore, currently an autonomous vehicle cannot operate in multiple conveyance industry segments. In addition, autonomous vehicles cannot be employed by or contracted with multiple service providers to facilitate conveyance services. At least one non-limiting aspect of the present invention solves this problem.

SUMMARY

The present invention recognizes that there is a long felt need for more efficient systems in the interactive conveyance industry for goods and services.

A first aspect of the present invention generally relates to an interactive system in the conveyance and other industries.

A second aspect of the present invention generally relates to a method of use of the interactive system of the present invention.

Figure 1:
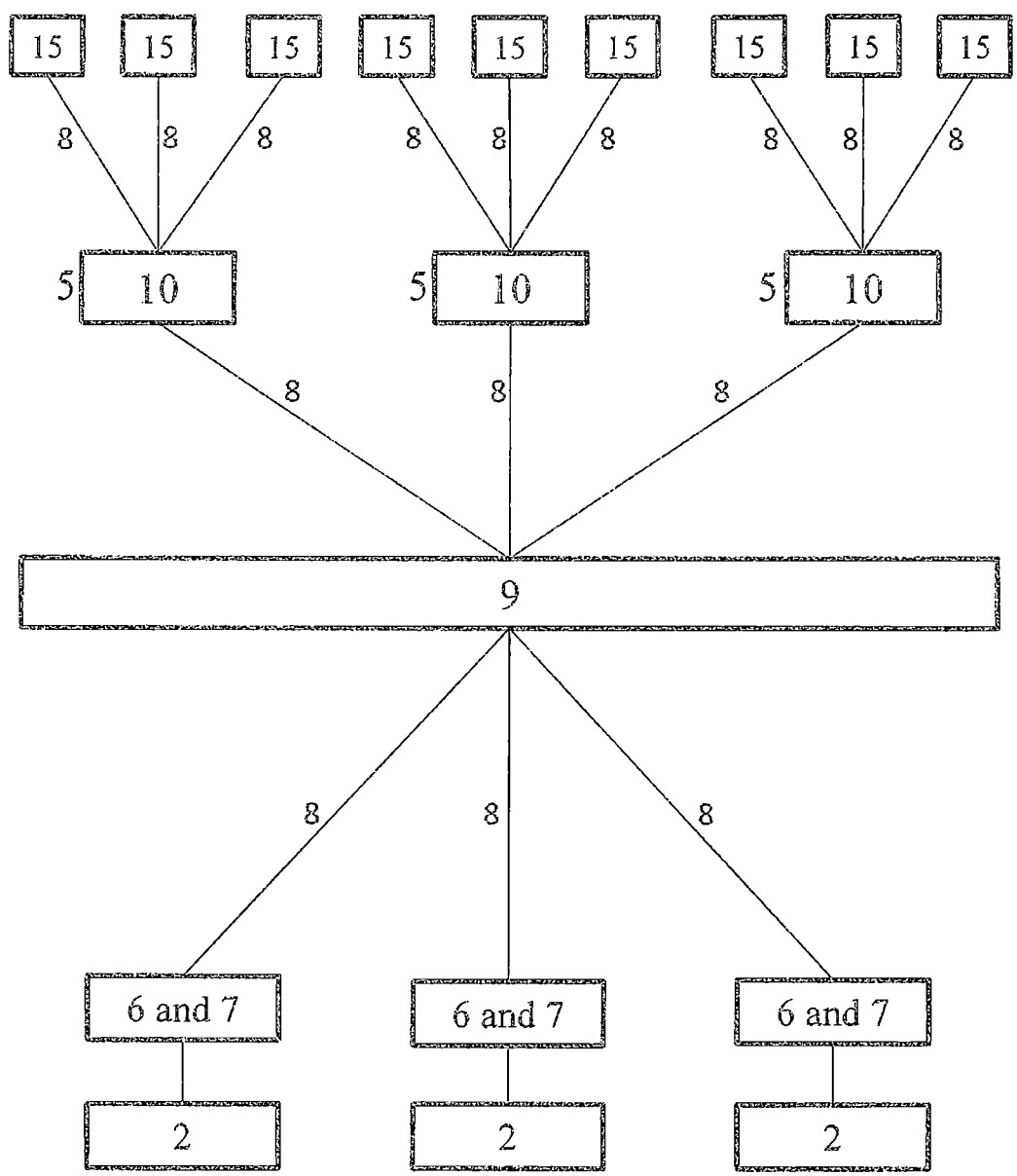
FIG. 1 relates to a preferred example of one non-limiting aspect of the present invention as a macro level view of a Representative Automated Platform 13, automated in whole or in part, where at least one representative 2 can benefit from the present invention. The conveyance service requests 15 can be sourced from at least one external server 10 and can be transmitted to a central server 9 by way of at least one link 8. At least one service provider 5 can be associated with at least one external server 10. In this non-limiting figure, each service provider 5 is associated with one external server 10. A central server 9 can filter conveyance service requests 15 into filtered conveyance service requests 16 by using at least one representative preference 18 and preferably the real time or near real time geographical location of at least one representative 2. A central server 9 can calculate the weighted average of at least one representative preference 18. A central server 9 can preferably sort the filtered conveyance service requests 16 in an order relating to the corresponding weighted averages to identify at least one preferred conveyance service request 17. At least one preferred conveyance service request 17 can be identified by a central server 9 from the filtered conveyance service requests 16 that has the highest weighted average. At least one preferred conveyance service request 17 can be secured or obtained by a central server 9. At least one secured or obtained preferred conveyance service request 17 can be transmitted from a central server 9 to at least one application 6 by way of at least one link 8. At least one application 6 can operate on at least one terminal 7. At least one secured or obtained preferred conveyance service request 17 can be displayed on at least one application 6. A Representative Automated Platform 13 can analyze or evaluate and then preferably secure or obtain at least one subsequent or additional preferred conveyance service request 17 continuously in real time or near real time, while at least one representative 2 performs at least one conveyance service relating to at least one secured or obtained preferred conveyance service request 17 until the process is stopped by at least one representative 2.
Figure 2:
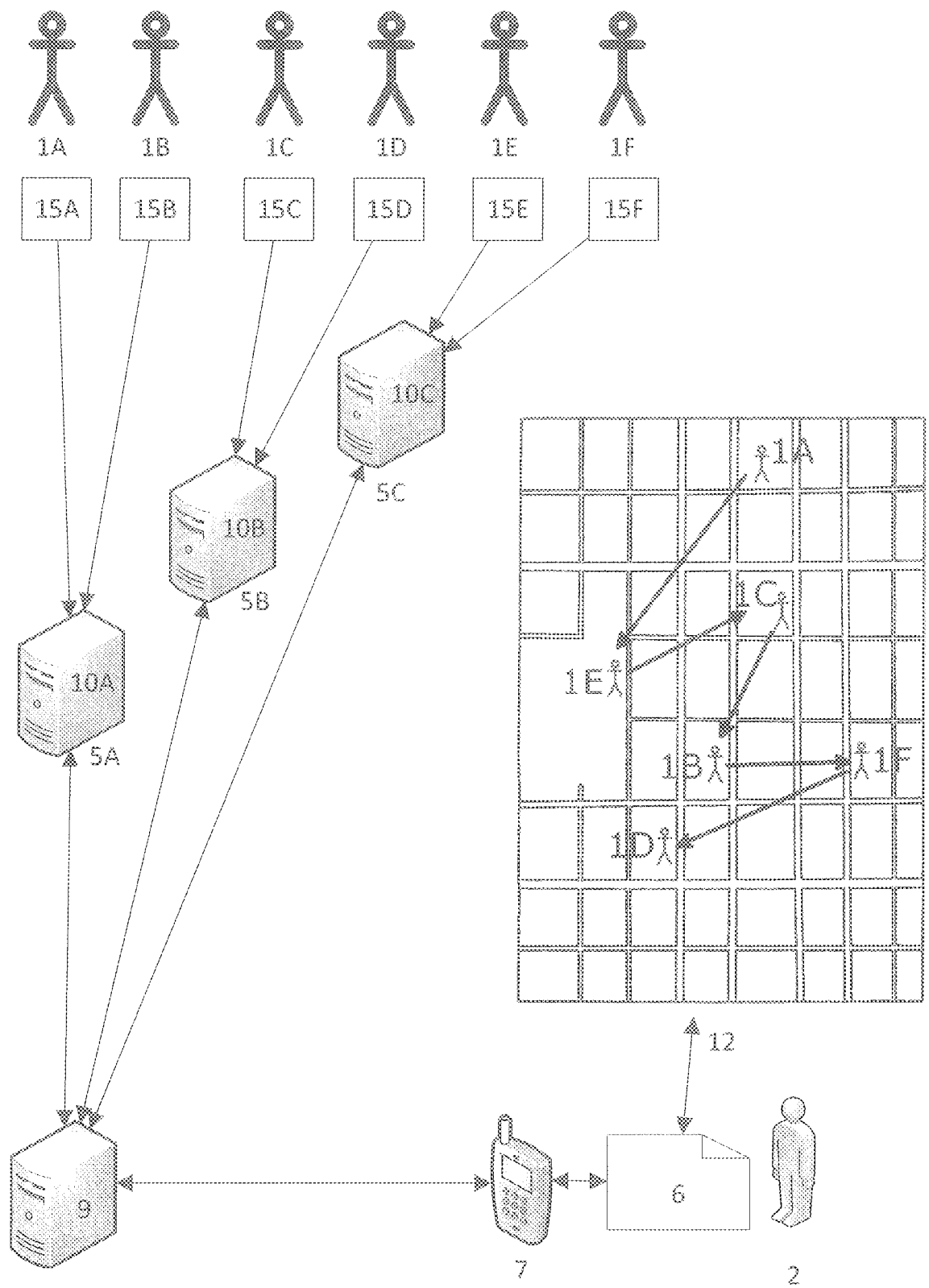
FIG. 2 relates to a preferred example of one non-limiting aspect of the present invention as a macro level view of a Representative Automated Platform 13, automated in whole or in part, where a representative 2 can benefit from the present invention. An individual conveyance service request 15 can be submitted by each individual conveyance client 1A, 1B, 1C, 1D, 1E, and 1F. An individual conveyance service request 15 corresponds with each individual conveyance client 1 in the figure. Conveyance service requests 15A and 15B are submitted by conveyance clients 1A and 1B to external server 10A associated with service provider 5A. Conveyance service requests 15C and 15D are submitted by conveyance clients 1C and 1D to external server 10B associated with service provider 5B. Conveyance service requests 15E and 15F are submitted by conveyance clients 1E and 1F to external server 10C associated with service provider 5C. Each service provider 5 can have at least one external server 10.

A central server 9 can receive conveyance service requests 15 and then filter the conveyance service requests 15 into filtered conveyance service requests 16 by using at least one representative preference 18 and preferably the real time or near real time geographical location of a representative 2. A central server 9 can calculate the weighted average of at least one representative preference 18. A central server 9 can preferably sort the filtered conveyance service requests 16 in an order relating to the corresponding weighted averages to identify at least one preferred conveyance service request 17. At least one preferred conveyance service request 17 can be identified by a central server 9 from the filtered conveyance service requests 16 that has the highest weighted average.

A central server 9 can analyze or evaluate conveyance service requests 15 and then secure or obtain at least one preferred conveyance service request 17. At least one secured or obtained preferred conveyance service request 17 can be transmitted from a central server 9 to an application 6 by way of at least one link 8. An application 6 can operate on a terminal 7 and can display at least one secured or obtained preferred conveyance service request 17. In this non-limiting figure, a representative 2 can use a visual representation 12 in conjunction with a Representative Automated Platform 13 to visually analyze or evaluate where at least one conveyance client 1 or at least one preferred conveyance service request 17 is geographically located. A Representative Automated Platform 13 can analyze or evaluate and then preferably secure or obtain at least one subsequent or additional preferred conveyance service request 17 continuously in real time or near real time, while a representative 2 performs at least one conveyance service relating to at least one secured or obtained preferred conveyance service request 17, until the process is stopped by a representative 2.

Figure 3:
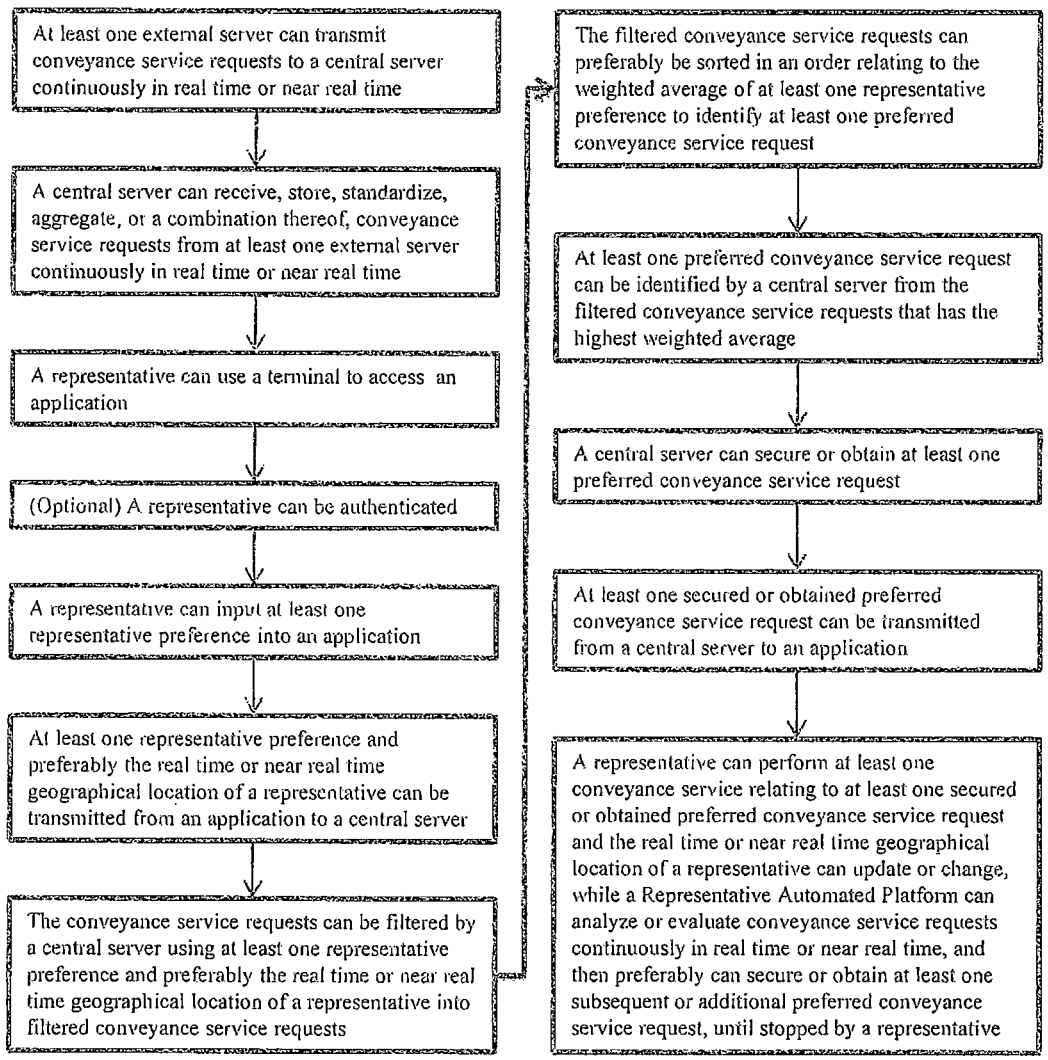

FIG. 3 relates to a preferred example of one non-limiting aspect of the present invention as a flowchart of steps of an exemplary method in a preferable but not required order where a representative 2 can benefit from the present invention. The flowchart describes steps of how a Representative Automated Platform 13, automated in whole or in part, can assist a representative 2 in analyzing or evaluating and then securing or obtaining at least one preferred conveyance service request 17. A Representative Automated Platform 13, automated in whole or in part, after securing or obtaining at least one preferred conveyance service request 17, can continuously analyze or evaluate conveyance service requests 15 in real time or near real time and then preferably secure or obtain at least one subsequent or additional preferred conveyance service request 17 while a representative 2 is performing at least one conveyance service.

Figure 4:
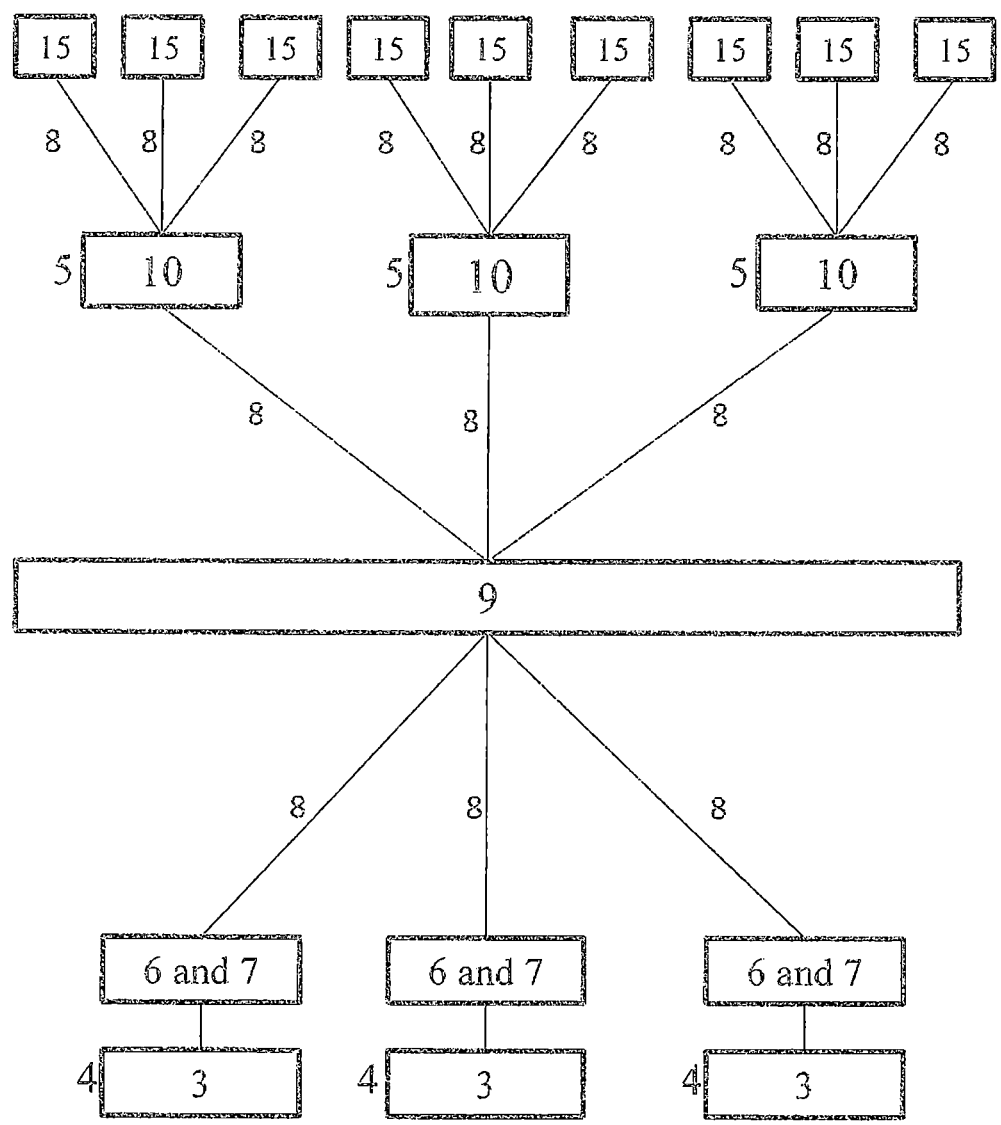

FIG. 4 relates to a preferred example of one non-limiting aspect of the present invention as a macro level view of an Autonomous Vehicle Automated Platform 14, automated in whole or in part, where at least one owner or at least one controller of at least one autonomous vehicle 4 can benefit from the present invention. The conveyance service requests 15 can be sourced from at least one external server 10 and can be transmitted to a central server 9 by way of at least one link 8. At least one service provider 5 can be associated with at least one external server 10. In this non-limiting figure, each service provider 5 is associated with one external server 10. A central server 9 can filter conveyance service requests 15 into filtered conveyance service requests 16 by using at least one selected preference 19 and preferably the real time or near real time geographical location of at least one autonomous vehicle 3. A central server 9 can calculate the weighted average of at least one selected preference 19. A central server 9 can preferably sort the filtered conveyance service requests 16 in an order relating to the corresponding weighted averages to identify at least one preferred conveyance service request 17. At least one preferred conveyance service request 17 can be identified by a central server 9 from the filtered conveyance service requests 16 that has the highest weighted average. At least one preferred conveyance service request 17 can be secured or obtained by a central server 9. At least one secured or obtained preferred conveyance service request 17 can be transmitted from a central server 9 to at least one application 6 by way of at least one link 8. At least one application 6 can operate on at least one terminal 7 associated with at least one autonomous vehicle 3. An Autonomous Vehicle Automated Platform 14 can analyze or evaluate and then preferably secure or obtain at least one subsequent or additional preferred conveyance service request 17 continuously in real time or near real time, while at least one autonomous vehicle 3 performs at least one conveyance service relating to at least one secured or obtained preferred conveyance service request 17 until the process is stopped by at least one owner or at least one controller of at least one autonomous vehicle 4.

Figure 5:
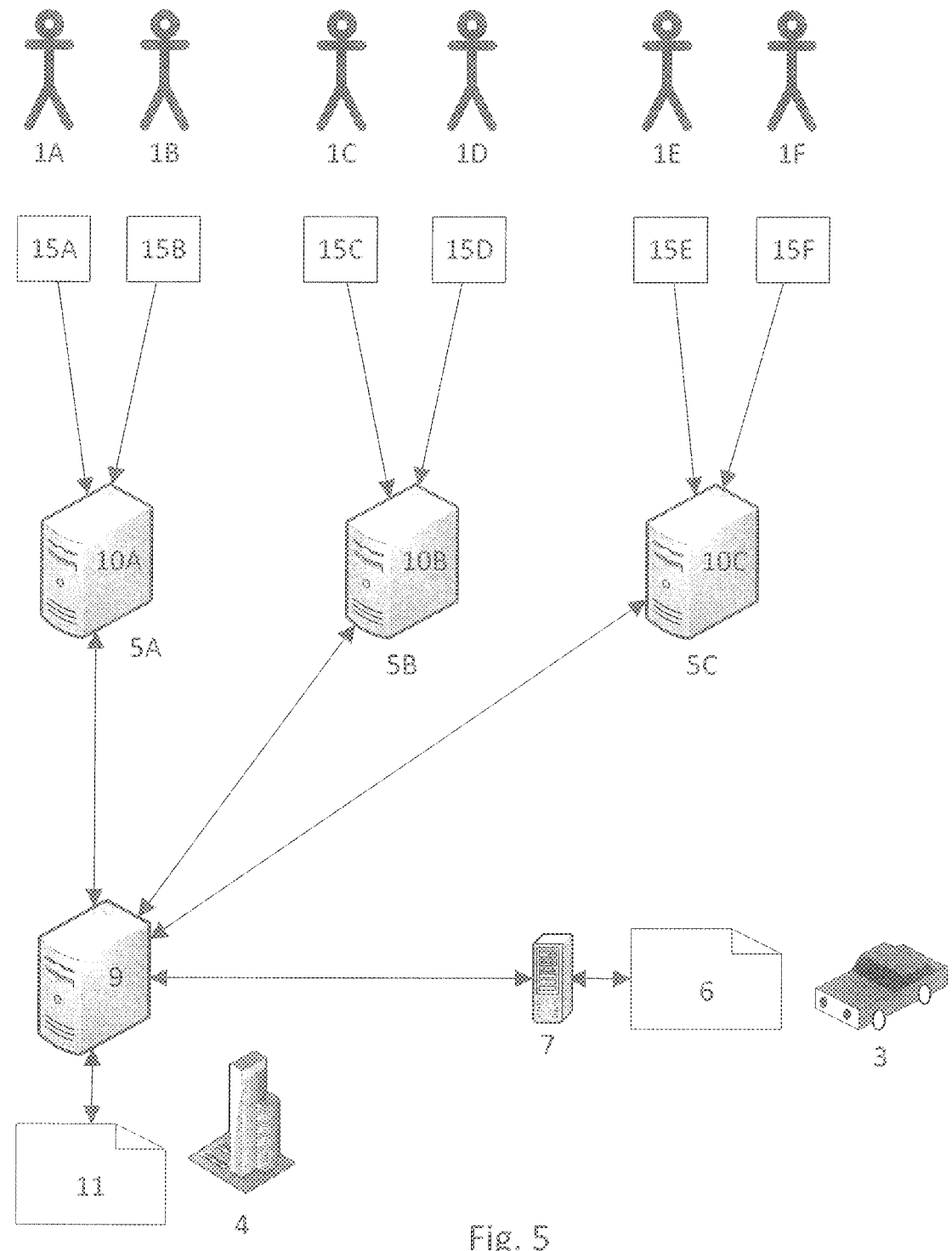

FIG. 5 relates to a preferred example of one non-limiting aspect of the present invention as a macro level view of an Autonomous Vehicle Automated Platform 14, automated in whole or in part, where an owner or controller of an autonomous vehicle 4 can benefit from the present invention. An individual conveyance service request 15 can be submitted by each individual conveyance client 1A, 1B, 1C, 10, 1E, and 1F. An individual conveyance service request 15 corresponds with each individual conveyance client 1 in the figure. Conveyance service requests 15A and 15B are submitted by conveyance clients 1A and 1B to external server 10A associated with service provider 5A. Conveyance service requests 15C and 15D are submitted by conveyance clients 1C and 1D to external server 10B associated with service provider 5B. Conveyance service requests 15E and 15F are submitted by conveyance clients 1E and 1F to external server 10C associated with service provider 5C. Each service provider 5 can have at least one external server 10.

A central server 9 can receive conveyance service requests 15 and then filter the conveyance service requests 15 into filtered conveyance service requests 16 by using at least one selected preference 19 and preferably the real time or near real time geographical location of an autonomous vehicle 3. A central server 9 can calculate the weighted average of at least one selected preference 19. A central server 9 can preferably sort the filtered conveyance service requests 16 in an order relating to the corresponding weighted averages to identify at least one preferred conveyance service request 17. At least one preferred conveyance service request 17 can be identified by a central server 9 from the filtered conveyance service requests 16 that has the highest weighted average.

At least one preferred conveyance service request 17 can be transmitted from a central server 9 to an owner or controller application 11 by way of at least one link 8. In this non-limiting figure, an owner or controller of an autonomous vehicle 4 can accept at least one preferred conveyance service request 17, when an Autonomous Vehicle Automated Platform 14 is automated in part, by using an owner or controller application 11. A central server 9 can then secure or obtain at least one preferred conveyance service request 17. At least one secured or obtained preferred conveyance service request 17 can be transmitted from a central server 9 to an application 6 by way of at least one link 8. An application 6 can operate on a terminal 7 associated with an autonomous vehicle 3. An Autonomous Vehicle Automated Platform 14 can analyze or evaluate and then preferably secure or obtain at least one subsequent or additional preferred conveyance service request 17 continuously in real time or near real time, while an autonomous vehicle 3 performs at least one conveyance service relating to at least one secured or obtained preferred conveyance service request 17, until the process is stopped by an owner or controller of an autonomous vehicle 4.

Figure 6:
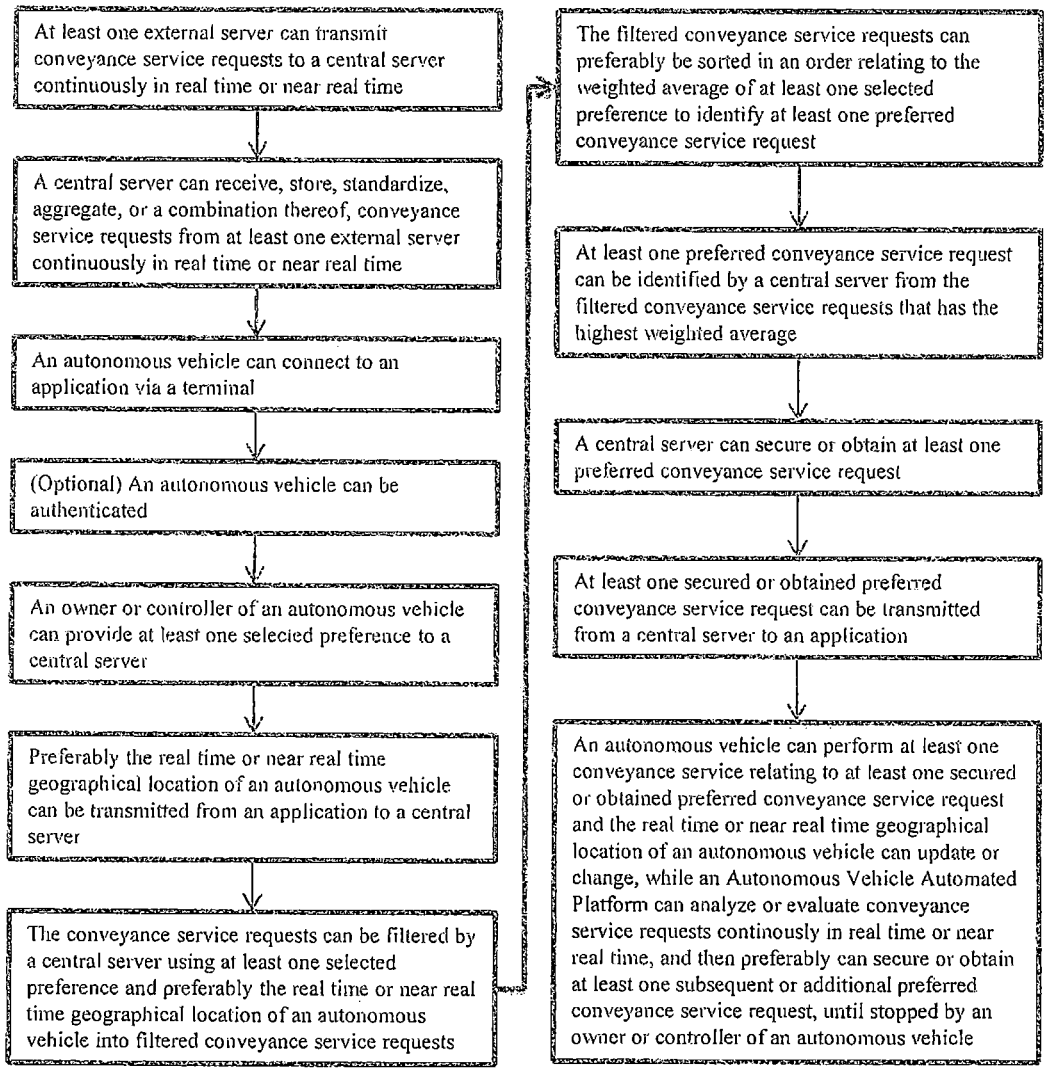

FIG. 6 relates to a preferred example of one non-limiting aspect of the present invention as a flowchart of steps of an exemplary method in a preferable but not required order where an owner or controller of an autonomous vehicle 4 can benefit from the present invention. The flowchart describes steps of how an Autonomous Vehicle Automated Platform 14, automated in whole or in part, can assist an autonomous vehicle 3 or an owner or controller of an autonomous vehicle 4 in analyzing or evaluating and then securing or obtaining at least one preferred conveyance service request 17. An Autonomous Vehicle Automated Platform 14, automated in whole or in part, after securing or obtaining at least one preferred conveyance service request 17, can continuously analyze or evaluate conveyance service requests 15 in real time or near real time and then preferably secure or obtain at least one subsequent or additional preferred conveyance service request 17 while an autonomous vehicle 3 is performing at least one conveyance service.

Figure 7:
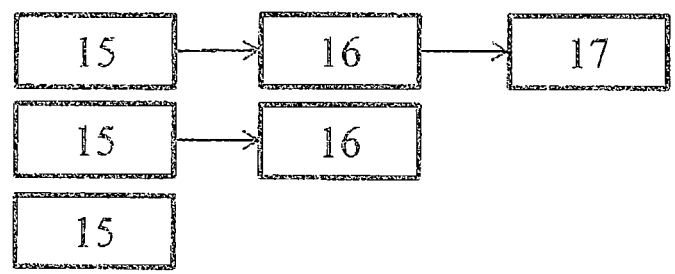

FIG. 7 relates to a preferred example of at least one non-limiting aspect of the present invention as a flowchart of the transformation of at least one conveyance service request 15 into at least one preferred conveyance service request 17. Once a central server 9 receives at least one conveyance service request 15 from at least one external server 10, a central server 9 can filter at least one conveyance service request 15 using at least one representative preference 18 or at least one selected preference 19 and preferably the real time or near real time geographical location of at least one representative 2 or at least one autonomous vehicle 3 into at least one filtered conveyance service request 16. A central server 9 can calculate the weighted average of at least one representative preference 18 or at least one selected preference 19. A central server 9 can preferably sort at least one filtered conveyance service request 16 in an order relating to the corresponding weighted averages to identify at least one preferred conveyance service request 17. At least one preferred conveyance service request 17 can be identified by a central server 9 as at least one filtered conveyance service request 16 that has the highest weighted average from at least one filtered conveyance service request 16. Not every at least one conveyance service request 15 can become at least one filtered conveyance service request 16 and not every at least one filtered conveyance service request 16 can become at least one preferred conveyance service request 17. A central server 9 can be used by a Representative Automated Platform 13 to analyze and identify at least one preferred conveyance service request 17. A central server 9 can be used by an Autonomous Vehicle Automated Platform 14 to analyze and identify at least one preferred conveyance service request 17. At least one function of a central server 9 can be performed by an application 6, an owner or controller application 11, or a combination thereof.

Figure 8:
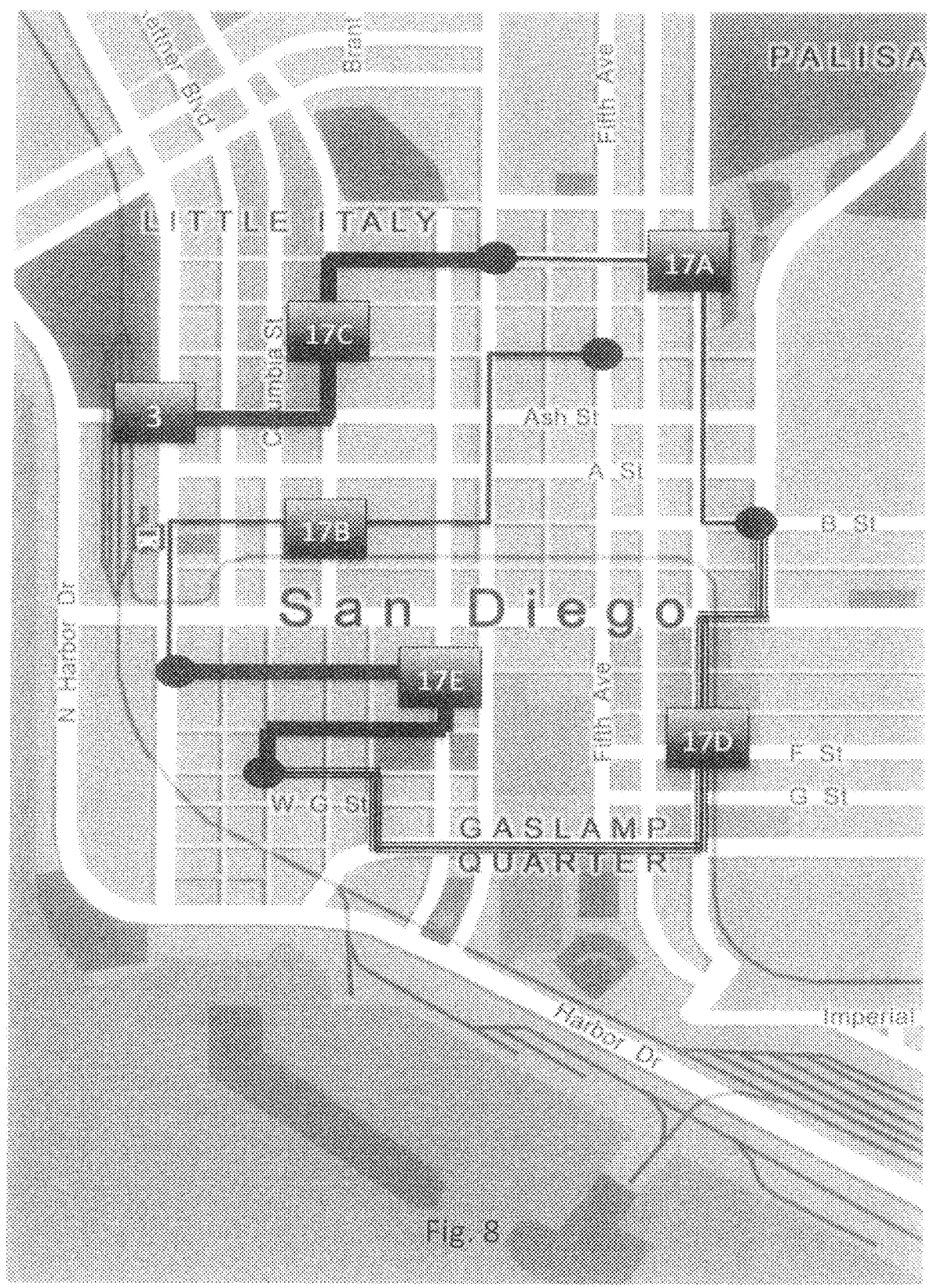

FIG. 8 relates to a preferred example of at least one non-limiting aspect of the present invention as an overview of an Autonomous Vehicle Automated Platform 14, automated in whole, being used by an autonomous vehicle 3 to analyze or evaluate and then secure or obtain, for example, five preferred conveyance service requests 17. In this non-limiting figure, not all five preferred conveyance service requests 17 were present or available when an Autonomous Vehicle Automated Platform 14 secured or obtained a first preferred conveyance service request 17. After securing or obtaining a first preferred conveyance service request 17, an Autonomous Vehicle Automated Platform 14 can continuously analyze or evaluate conveyance service requests 15 in real time or near real time and then preferably secure or obtain at least one subsequent or additional preferred conveyance service request 17 while an autonomous vehicle 3 is performing the first conveyance service and the real time or near real time geographical location of an autonomous vehicle 3 updates or changes.

The preferred conveyance service requests 17 change continuously and are updated in real time or near real time, but for illustration purposes, depicted are all five secured or obtained preferred conveyance service requests 17A, 17B, 17C, 17D, and 17E. An Autonomous Vehicle Automated Platform 14 is not required to secure or obtain preferred conveyance service requests 17A, 17B, 17C, 17D, and 17E in a sequential order because after a first preferred conveyance service request 17C is secured or obtained, an Autonomous Vehicle Automated Platform 14 analyzes or evaluates again or continuously in real time or near real time with updated information prior to securing or obtaining the next preferred conveyance service request 17.

A first preferred conveyance service request 17C is secured or obtained for an autonomous vehicle 3 by an Autonomous Vehicle Automated Platform 14. An autonomous vehicle 3 picks up the first conveyance client 1 at the beginning service geographical location, displayed as box 17C, and proceeds to the ending service geographical location depicted by the first black circle on the route. Prior to completing the first preferred conveyance service request 17C, an Autonomous Vehicle Automated Platform 14 continuously analyzes or evaluates and then secures or obtains a second preferred conveyance service request 17A. An autonomous vehicle 3 drops off the first conveyance client 1 at the ending service geographical location and proceeds to the beginning service geographical location for the second preferred conveyance service request 17A, displayed as box 17A.

An autonomous vehicle 3 picks up the second conveyance client 1 at the beginning service geographical location and proceeds to the ending service geographical location depicted by the second black circle on the route. Prior to completing the second preferred conveyance service request 17A, an Autonomous Vehicle Automated Platform 14 continuously analyzes or evaluates and then secures or obtains a third preferred conveyance service request 17D. An autonomous vehicle 3 drops off the second conveyance client 1 at the ending service geographical location and proceeds to the beginning service geographical location for the third preferred conveyance service request 17D, displayed as box 17D.

An autonomous vehicle 3 picks up the third conveyance client 1 at the beginning service geographical location and proceeds to the ending service geographical location depicted by the third black circle on the route. Prior to completing the third preferred conveyance service request 17D, an Autonomous Vehicle Automated Platform 14 continuously analyzes or evaluates and then secures or obtains a fourth preferred conveyance service request 17E. An autonomous vehicle 3 drops off the third conveyance client 1 at the ending service geographical location and proceeds to the beginning service geographical location for the fourth preferred conveyance service request 17E, displayed as box 17E.

An autonomous vehicle 3 picks up the fourth conveyance client 1 at the beginning service geographical location and proceeds to the ending service geographical location depicted by the fourth black circle on the route. Prior to completing the fourth preferred conveyance service request 17E, an Autonomous Vehicle Automated Platform 14 continuously analyzes or evaluates and then secures or obtains a fifth preferred conveyance service request 17B. An autonomous vehicle 3 drops off the fourth conveyance client 1 at the ending service geographical location and proceeds to the beginning service geographical location for the fifth preferred conveyance service request 17B, displayed as box 17B.

An autonomous vehicle 3 picks up the fifth conveyance client 1 at the beginning service geographical location and proceeds to the ending service geographical location depicted by the fifth black circle on the route. An autonomous vehicle 3 drops off the fifth conveyance client 1 at the ending service geographical location. In this non-limiting figure, after an autonomous vehicle 3 completes the fifth preferred conveyance service request 17B, the owner or controller of an autonomous vehicle 4 turns off an Autonomous Vehicle Automated Platform 14 via an owner or controller application 11.

DETAILED DESCRIPTION OF THE INVENTION

Definitions

Unless defined otherwise, all technical and scientific terms used herein have the same meaning as commonly understood by one of ordinary skill in the art to which this invention belongs. Generally, the nomenclature used herein and the procedures described below are well-known and commonly employed in the art. Conventional methods are used for these procedures, such as those provided in the art and various general references. Where a term is provided in the singular, the inventors also contemplate the plural of that term, and where a term is provided in the plural, the inventors also contemplate the singular of that term. The nomenclature used herein and the procedures described below are those well-known and commonly employed in the art, unless otherwise indicated. Other technical terms used herein have their ordinary meaning in the art that they are used, as exemplified by a variety of technical dictionaries.

Introduction

The present invention recognizes that there is a long felt need for more efficient systems in the interactive conveyance industry for goods and services.

As a non-limiting introduction to the breath of the present invention, the present invention includes several general and useful aspects, including:

1. an interactive system in the conveyance and other industries; and
2. a method of use of the interactive system of the present invention.

These aspects of the invention, as well as others described herein, can be achieved by using the methods, articles of manufacture and compositions of matter described herein. To gain a full appreciation of the scope of the present invention, it will be further recognized that various aspects of the present invention can be combined to make desirable embodiments of the invention.

General Description of the Present Invention and Problems being Solved

One non-limiting aspect of the present invention, hereinafter referred to as at least one Representative Automated Platform, can be at least one technology based solution, automated in whole or in part, that can use at least one real time or near real time system and at least one real time or near real time method to assist at least one representative in at least one process of analyzing or evaluating and then securing or obtaining at least one preferred conveyance service request.

At least one Representative Automated Platform of the present invention, automated in whole or in part, can analyze or evaluate at least one conveyance service request continuously in real time or near real time, in order to identify and then secure or obtain at least one preferred conveyance service request based on at least one representative preference and preferably at least one real time or near real time geographical location of at least one representative. After securing or obtaining at least one first preferred conveyance service request, at least one representative can perform at least one conveyance service and at least one Representative Automated Platform of the present invention, can automatically and continuously repeat at least one real time or near real time process of analyzing or evaluating and then securing or obtaining at least one subsequent or additional preferred conveyance service request until at least one process is stopped by at least one representative and at least one representative performs at least one final conveyance service.

One benefit of at least one Representative Automated Platform of the present invention, automated in whole or in part, can be improved efficiency for at least one representative in analyzing or evaluating at least one conveyance service request continuously in real time or near real time to identify and then secure or obtain at least one preferred conveyance service request and preferably at least one subsequent or additional preferred conveyance service request. At least one Representative Automated Platform of the present invention can be updated in real time or near real time with at least one incoming conveyance service request to be continuously analyzed or evaluated and can then secure or obtain at least one subsequent or additional preferred conveyance service request. At least one Representative Automated Platform of the present invention can continuously analyze or evaluate at least one conveyance service request in real time or near real time and preferably secure or obtain at least one preferred conveyance service request while at least one representative performs at least one conveyance service.

As a result, at least one representative and at least one service provider can operate more efficiently and can potentially perform at least one additional conveyance service to increase earning potential. At least one proposal or recommendation from at least one Representative Automated Platform of the present invention of at least one different conveyance service request can improve efficiency relating to at least one representative and solve at least one problem relating to at least one traveling salesman problem or at least one dynamic traveling salesman problem. At least one Representative Automated Platform of the present invention can solve at least one problem by identifying, securing or obtaining at least one subsequent or additional preferred conveyance service request, and performing at least one conveyance service more efficiently by continuously analyzing or evaluating at least one conveyance service request in real time or near real time. This improved efficiency can allow at least one representative to perform at least one additional conveyance service based on at least one representative preference and preferably at least one real time or near real time geographical location of at least one representative. At least one benefit of the present invention can address at least one problem relating to at least one traveling salesman problem, at least one dynamic traveling salesman problem, or a combination thereof, relating to at least one conveyance industry segment.

One benefit of one non-limiting embodiment of at least one Representative Automated Platform of the present invention, when automated in part, can also relate to efficiency. When at least one Representative Automated Platform of the present invention is automated in part, the present invention can perform at least one process to identify at least one preferred conveyance service request relating to at least one representative preference and at least one representative can simply accept or decline. In this non-limiting embodiment of the present invention, at least one pop-up or notification of at least one preferred conveyance service request can be displayed on at least one application for at least one representative to accept or decline. If declined, at least one next preferred conveyance service request can be displayed until at least one preferred conveyance service request is accepted, declined, or at least one representative turns off at least one Representative Automated Platform of the present invention. At least one ability of at least one Representative Automated Platform of the present invention to analyze or evaluate continuously in real time or near real time and display at least one preferred conveyance service request, can allow at least one representative to work more efficiently and improve at least one user interaction compared to the current state of the art.

One benefit of at least one Representative Automated Platform of the present invention, automated in whole or in part, can improve at least one decision making process for at least one representative in at least one real time or near real time conveyance industry segment. At least one Representative Automated Platform of the present invention can continuously analyze or evaluate at least one conveyance service request in real time or near real time whereas at least one current system limitation and at least one current method limitation generally only permit at least one representative to potentially receive only one next conveyance service request at one point in time and usually when at least one representative is close to completing one conveyance service request.

At least one limitation can decrease at least one representative's decision making ability, not allow at least one representative to use at least one representative preference, and can reduce at least one opportunity for at least one representative to secure or obtain at least one most preferred conveyance service request available at that time. At least one Representative Automated Platform of the present invention can identify at least one preferred conveyance service request that at least one representative can miss due to the current convention. At least one Representative Automated Platform of the present invention can secure or obtain at least one subsequent or additional preferred conveyance service request while at least one representative is performing at least one conveyance service. Due to the current state of the art, at least one representative can potentially miss securing or obtaining at least one subsequent or additional preferred conveyance service request because at least one representative is limited on how and when at least one conveyance service request can be secured or obtained, let alone even analyzed or evaluated. Instead of having at least one representative multi-task while performing at least one conveyance service and searching for at least one next conveyance service request, which can often lead to securing or obtaining at least one suboptimal conveyance service request, at least one Representative Automated Platform of the present invention can take care of analyzing or evaluating and then securing or obtaining at least one preferred conveyance service request for at least one representative.

With at least one Representative Automated Platform of the present invention, by using continuous and improved real time or near real time analysis or evaluation instead of a one-time analysis or evaluation, at least one decision making process can be improved, and at least one preferred conveyance service request can be secured or obtained. At least one benefit of at least one improved decision making process of the present invention can also address at least one problem relating to at least one traveling salesman problem, at least one dynamic traveling salesman problem, or a combination thereof, relating to at least one conveyance industry segment.

One benefit of at least one Representative Automated Platform of the present invention can be related to improved usability or interaction with at least one user. The current state of the art can require at least one representative to take valuable time and effort to potentially receive at least one subsequent or additional conveyance service request, often times while driving. At least one Representative Automated Platform of the present invention can update or notify at least one representative while performing at least one conveyance service about including but not limited to at least one direction, at least one route, at least one conveyance client, at least one conveyance service request, at least one preferred conveyance service request, at least one beginning service geographical location, at least one ending service geographical location, or a combination thereof, which can improve at least one interaction or usability for at least one representative to perform at least one conveyance service. The present invention can improve the current state of the art and can allow at least one representative to input or provide at least one representative preference and at least one Representative Automated Platform of the present invention can facilitate analyzing or evaluating and then securing or obtaining at least one subsequent or additional preferred conveyance service request continuously in real time or near real time.

One benefit of at least one Representative Automated Platform of the present invention can be related to safety. The less attention at least one representative has to pay to at least one mobile device and the more focused at least one representative is on performing at least one conveyance service, the safer it can be for at least one representative, at least one conveyance client, and others in the vicinity or area. At least one Representative Automated Platform of the present invention can use at least one preferred system and at least one preferred method to automatically search, filter, analyze or evaluate, and then secure or obtain at least one preferred conveyance service request based on at least one representative preference and preferably at least one real time or near real time geographical location of at least one representative while allowing at least one representative to focus solely on at least one conveyance service and provide higher levels of safety for at least one conveyance client and others.

One non-limiting aspect of the present invention, hereinafter referred to as at least one Autonomous Vehicle Automated Platform, can be at least one technology based solution, automated in whole or in part, that can use at least one real time or near real time system and at least one real time or near real time method to assist at least one autonomous vehicle in at least one process of analyzing or evaluating and then securing or obtaining at least one preferred conveyance service request.

At least one Autonomous Vehicle Automated Platform of the present invention, automated in whole or in part, can analyze or evaluate at least one conveyance service request continuously in real time or near real time, in order to identify and then secure or obtain at least one preferred conveyance service request based on at least one selected preference and preferably at least one real time or near real time geographical location of at least one autonomous vehicle. After securing or obtaining at least one first preferred conveyance service request, at least one autonomous vehicle can perform at least one conveyance service and at least one Autonomous Vehicle Automated Platform of the present invention can automatically and continuously repeat at least one real time or near real time process of analyzing or evaluating and then securing or obtaining at least one subsequent or additional preferred conveyance service request until at least one process is stopped by at least one owner or at least one controller of at least one autonomous vehicle and at least one autonomous vehicle performs at least one final conveyance service.

One benefit of at least one Autonomous Vehicle Automated Platform of the present invention, automated in whole or in part, can be improved efficiency in analyzing or evaluating at least one conveyance service request continuously in real time or near real time to identify and then secure or obtain at least one preferred conveyance service request and preferably at least one subsequent or additional preferred conveyance service request for at least one autonomous vehicle. At least one Autonomous Vehicle Automated Platform of the present invention can be updated in real time or near real time with at least one incoming conveyance service request to be continuously analyzed or evaluated and can then secure or obtain at least one subsequent or additional preferred conveyance service request. At least one Autonomous Vehicle Automated Platform of the present invention can continuously analyze or evaluate at least one conveyance service request in real time or near real time and preferably secure or obtain at least one preferred conveyance service request while at least one autonomous vehicle performs at least one conveyance service.

As a result, at least one autonomous vehicle, at least one owner or at least one controller of at least one autonomous vehicle, at least one service provider, or a combination thereof, can operate more efficiently and can potentially perform at least one additional conveyance service to increase earning potential. At least one proposal or recommendation from at least one Autonomous Vehicle Automated Platform of the present invention of at least one different conveyance service request can improve efficiency relating to at least one autonomous vehicle, at least one service provider, at least one owner or at least one controller of at least one autonomous vehicle, or a combination thereof, and solve at least one problem relating to at least one vehicle routing problem or at least one vehicle dispatch problem. At least one Autonomous Vehicle Automated Platform of the present invention can solve at least one problem by identifying, securing or obtaining at least one subsequent or additional preferred conveyance service request, and performing at least one conveyance service more efficiently by continuously analyzing or evaluating at least one conveyance service request in real time or near real time. This improved efficiency can allow at least one service provider or at least one owner or at least one controller of at least one autonomous vehicle to strategically place or dispatch at least one autonomous vehicle based on at least one selected preference and preferably at least one real time or near real time geographical location of at least one autonomous vehicle. At least one benefit of at least one Autonomous Vehicle Automated Platform of the present invention can address at least one problem relating to at least one vehicle routing problem, at least one vehicle dispatch problem, or a combination thereof, relating to at least one conveyance industry segment.

One benefit of at least one Autonomous Vehicle Automated Platform of the present invention can be increased earning potential due to at least one extra seat within at least one autonomous vehicle available for at least one conveyance service. The present invention can introduce at least one driverless autonomous vehicle that can result in having at least one extra seat available. Due to having at least one extra seat available, earning potential can be increased by facilitating at least one additional conveyance service request.

One benefit of one non-limiting embodiment of at least one Autonomous Vehicle Automated Platform of the present invention, when automated in part, can also relate to efficiency. When at least one Autonomous Vehicle Automated Platform of the present invention is automated in part, the present invention can perform at least one process to identify at least one preferred conveyance service request relating to at least one selected preference and at least one owner or at least one controller of at least one autonomous vehicle can simply accept or decline. In this non-limiting embodiment of the present invention, at least one pop-up or notification of at least one preferred conveyance service request can be displayed on at least one owner or controller application for at least one owner or at least one controller of at least one autonomous vehicle to accept or decline. If declined, at least one next preferred conveyance service request can be displayed until at least one preferred conveyance service request is accepted, declined, or at least one owner or at least one controller of at least one autonomous vehicle turns off at least one Autonomous Vehicle Automated Platform of the present invention. At least one ability of at least one Autonomous Vehicle Automated Platform of the present invention to analyze or evaluate continuously in real time or near real time and display at least one preferred conveyance service request, can allow at least one autonomous vehicle, at least one owner or at least one controller of at least one autonomous vehicle, at least one service provider, or a combination thereof, to work more efficiently.

One benefit of at least one Autonomous Vehicle Automated Platform of the present invention, automated in whole or in part, can improve at least one decision making process for at least one owner or at least one controller of at least one autonomous vehicle, at least one autonomous vehicle, at least one service provider, or a combination thereof, in at least one real time or near real time conveyance industry segment. At least one Autonomous Vehicle Automated Platform of the present invention can continuously analyze or evaluate at least one conveyance service request in real time or near real time whereas at least one current system limitation and at least one current method limitation generally only permit at least one owner or at least one controller of at least one autonomous vehicle to potentially receive only one next conveyance service request at one point in time and usually when at least one autonomous vehicle is close to completing one conveyance service request.

At least one limitation can decrease at least one owner or at least one controller of at least one autonomous vehicle's decision making ability, not allow at least one owner or at least one controller of at least one autonomous vehicle to use at least one selected preference, and can reduce at least one opportunity for at least one most preferred conveyance service request available at that time to be secured or obtained. At least one Autonomous Vehicle Automated Platform of the present invention can identify at least one preferred conveyance service request that at least one owner or at least one controller of at least one autonomous vehicle or at least one service provider can miss due to the current convention. At least one Autonomous Vehicle Automated Platform of the present invention can secure or obtain at least one subsequent or additional preferred conveyance service request while at least one autonomous vehicle is performing at least one conveyance service. Due to the current state of the art, at least one owner or at least one controller of at least one autonomous vehicle or at least one service provider can potentially miss securing or obtaining at least one subsequent or additional preferred conveyance service request because at least one owner or at least one controller of at least one autonomous or at least one service provider vehicle is limited as to how and when at least one conveyance service request can be secured or obtained, let alone even analyzed or evaluated.

With at least one Autonomous Vehicle Automated Platform of the present invention, by using continuous and improved real time or near real time analysis or evaluation instead of a one-time analysis or evaluation, at least one decision making process can be improved, and at least one preferred conveyance service request can be secured or obtained. At least one benefit of at least one improved decision making process of the present invention can also address at least one problem relating to at least one vehicle routing problem, at least one vehicle dispatch problem, or a combination thereof, relating to at least one conveyance industry segment.

Currently, there is a shortage of at least one representative in at least one conveyance industry segment. One benefit of at least one Autonomous Vehicle Automated Platform of the present invention can be at least one ability to assist at least one service provider in supplementing a shortage of at least one representative to provide at least one additional conveyance service, which can increase profitability for at least one service provider and decrease waiting times for at least one conveyance client. At least one Autonomous Vehicle Automated Platform of the present invention can allow both at least one owner or at least one controller of at least one autonomous vehicle and at least one service provider to supplement the lack of at least one representative with at least one autonomous vehicle to help fulfill at least one additional conveyance service request.

One benefit of at least one Autonomous Vehicle Automated Platform of the present invention can be at least one solution to enroll or employ at least one autonomous vehicle into at least one real time or near real time system and at least one real time or near real time method to facilitate at least one conveyance service. The present invention enables at least one owner or at least one controller of at least one autonomous vehicle to perform or provide at least one conveyance service.

One benefit of at least one Autonomous Vehicle Automated Platform of the present invention can be at least one solution for improved quality of service for at least one conveyance client. Currently, there are problems with quality of service relating to at least one representative. The present invention can improve and mitigate challenges associated with quality of service within the conveyance industry.

One benefit of the present invention can be at least one improved ability for at least one representative to interact with including but not limited to at least one conveyance client, at least one good supplier, at least one service provider, or a combination thereof, due to increased insight or knowledge relating to at least one conveyance industry segment. The present invention can be at least one tool for presenting including but not limited to at least one preferred conveyance service request, at least one filtered conveyance service request, conveyance data, or a combination thereof, to be analyzed or evaluated by at least one representative.

One benefit of the present invention can be that at least one representative can have more control or flexibility when analyzing or evaluating and then securing or obtaining at least one preferred conveyance service request. At least one representative can set at least one parameter or at least one representative preference on how and where at least one representative wants to work, thus providing more control or flexibility for at least one representative. At least one owner or at least one controller of at least one autonomous vehicle can set at least one parameter or at least one selected preference on how and where to dispatch at least one autonomous vehicle, thus providing more control or flexibility for at least one owner or at least one controller of at least one autonomous vehicle.

One benefit of the present invention for at least one representative or at least one owner or at least one controller of at least one autonomous vehicle can be that at least one method of analyzing or evaluating and then securing or obtaining at least one preferred conveyance service request can now be accomplished in real time or near real time. By utilizing at least one system and at least one method that can operate in real time or near real time, quantum computing, machine learning technology, or a combination thereof, can be incorporated to further improve analysis or evaluation for including but not limited to at least one representative, at least one autonomous vehicle, at least one owner or at least one controller of at least one autonomous vehicle, or at least one service provider to secure or obtain at least one preferred conveyance service request.

One benefit of the present invention can be a larger number of at least one conveyance service request available to be analyzed or evaluated by at least one representative, at least one owner or at least one controller of at least one autonomous vehicle, at least one autonomous vehicle, or a combination thereof. The larger number of at least one conveyance service request that at least one representative, at least one owner or at least one controller of at least one autonomous vehicle, at least one autonomous vehicle, or a combination thereof, has exposure to, the greater the chance of identifying at least one preferred conveyance service request to secure or obtain given at least one representative preference or at least one selected preference.

One benefit of the present invention can be that at least one representative can now input or provide at least one representative preference to filter at least one conveyance service request into at least one filtered conveyance service request and identify at least one preferred conveyance service request from at least one filtered conveyance service request. At least one representative can analyze or evaluate at least one conveyance service request more efficiently due to at least one improved process by using at least one representative preference to identify and preferably secure or obtain at least one preferred conveyance service request. At least one improved process can allow at least one representative to work more efficiently and spend less time on identifying and securing or obtaining at least one preferred conveyance service request and more time on providing at least one conveyance service.

One benefit of the present invention can be that at least one owner or at least one controller of at least one autonomous vehicle can now input or provide at least one selected preference to filter at least one conveyance service request into at least one filtered conveyance service request and identify at least one preferred conveyance service request from at least one filtered conveyance service request. At least one autonomous vehicle, at least one owner or at least one controller of at least one autonomous vehicle, or a combination thereof, can analyze or evaluate at least one conveyance service request more efficiently due to at least one improved process by using at least one selected preference to identify and preferably secure or obtain at least one preferred conveyance service request. At least one improved process can allow at least one autonomous vehicle, at least one owner or at least one controller of at least one autonomous vehicle, or a combination thereof, to work more efficiently and spend less time on identifying and securing or obtaining at least one preferred conveyance service request and more time on providing at least one conveyance service.

One benefit of the present invention can be that at least one representative can increase their earning potential when securing or obtaining at least one preferred conveyance service request relating to at least one representative preference. The present invention can provide at least one ability for at least one representative to input or provide at least one representative preference to identify and preferably secure or obtain at least one preferred conveyance service request. At least one improved process can allow at least one representative to secure or obtain only at least one preferred conveyance service request that can increase at least one representative's earning potential over at least one given period of time when using at least one elevated pricing preference. At least one representative may only want to provide at least one shorter distance conveyance service to stay within at least one given area when using at least one elevated pricing preference to increase earning potential. At least one representative can increase earning potential for every at least one conveyance service provided within at least one area of elevated pricing rather than at least one representative performing at least one similar conveyance service outside of at least one area of elevated pricing. The increased benefit of higher earning potential extends to including but not limited to at least one autonomous vehicle, at least one owner or at least one controller of at least one autonomous vehicle, at least one service provider, or a combination thereof.

One benefit of the present invention can be at least one ability of at least one representative or at least one autonomous vehicle to operate or contract with at least one service provider. The present invention can allow at least one representative or at least one autonomous vehicle to operate with at least one service provider concurrently or subsequently.

One benefit of the present invention can be at least one ability of at least one representative or at least one autonomous vehicle to operate or provide at least one conveyance service in at least one conveyance industry segment. Currently, at least one service provider does not have at least one ability to enable at least one representative or at least one autonomous vehicle to operate in at least one additional conveyance industry segment at the same time. The present invention can allow at least one representative or at least one autonomous vehicle to operate initially in at least one conveyance industry segment, then perform at least one conveyance service in at least one different conveyance industry segment, and then go back to operate in at least one first conveyance industry segment. The present invention can seamlessly allow at least one representative or at least one autonomous vehicle to transfer between at least one conveyance industry segment based on at least one representative preference or at least one selected preference.

One benefit of the present invention can be that value can be added to the conveyance industry as a whole. At least one Representative Automated Platform of the present invention and at least one Autonomous Vehicle Automated Platform of the present invention can allow at least one conveyance industry segment to operate more efficiently, handle more capacity, and prosper for future growth of the industry. At least one representative and at least one service provider can benefit from the present invention by increasing satisfaction of at least one representative and allowing at least one representative to identify and perform at least one preferred conveyance service based on at least one representative preference. At least one service provider can also benefit by using at least one autonomous vehicle to help reduce a shortage of at least one representative. At least one owner or at least one controller of at least one autonomous vehicle can benefit from the present invention, as now their at least one autonomous vehicle can bolster the supply of at least one representative and increase earning potential while their at least one autonomous vehicle is not in use. At least one conveyance client can benefit from the present invention including but not limited to shorter wait times, higher quality of at least one conveyance service, more price transparency, or a combination thereof. Together, the present invention can improve at least one existing system and at least one existing method by adapting to the real time or near real time environment to enhance at least one conveyance industry segment for the better for all involved.

DETAILED DESCRIPTION OF EXEMPLARY ASPECTS AND EMBODIMENTS OF THE PRESENT INVENTION

I. System #1: Representative Automated Platform

A first aspect of the present invention includes, a real time or near real time system, automated in whole or in part, to assist at least one representative in at least one process of securing or obtaining, within the conveyance industry, at least one preferred conveyance service request relating to at least one representative preference and at least one real time or near real time geographical location of said at least one representative, including:

a) at least one external server; including:
  i) at least one computer processor;
  ii) at least one computer readable memory;
  iii) at least one network interface; and
  iv) at least one real time or near real time source of a plurality of conveyance service requests;
b) at least one central server; including:
  i) at least one computer processor;
  ii) at least one computer readable memory; and
  iii) at least one network interface;
c) at least one terminal; including:
  at least one electronic computing device including:
    (i) at least one computer processor;
    (ii) at least one computer readable memory;
    (iii) at least one input source;
    (iv) at least one display;
    (v) at least one geographical location module; and
    (vi) at least one network interface;
d) at least one application; including:
  at least one computer program being operable to present said at least one preferred conveyance service request to said at least one representative;
e) at least one link; including:
  at least one electronic communication network channel;
f) a plurality of conveyance service requests, including:
  at least one individual conveyance service request including:
    (i) at least one request for transporting at least one person, at least one good, at least one thing, or a combination thereof, from at least one geographical location to at least one other geographical location;
    (ii) said individual conveyance service request being updated in real time or near real time; and
    (iii) qualitative and quantitative conveyance data corresponding to said individual conveyance service request;
g) a plurality of filtered conveyance service requests; including:
  i) at least one subset of all or some of said plurality of conveyance service requests that is at least one result of filtering all or some of said plurality of conveyance service requests using said at least one representative preference and said at least one real time or near real time geographical location of said at least one representative;
  ii) all or some of said plurality of filtered conveyance service requests being updated in real time or near real time; and
  iii) qualitative and quantitative conveyance data corresponding to individual filtered conveyance service requests;

h) at least one preferred conveyance service request; including:
  i) at least one request for transporting said at least one person, said at least one good, said at least one thing, or a combination thereof, from at least one geographical location to at least one other geographical location that is identified from all or some of said plurality of filtered conveyance service requests;
  ii) said at least one preferred conveyance service request being updated in real time or near real time; and
  iii) qualitative and quantitative conveyance data corresponding to an individual preferred conveyance service request;
i) at least one representative; including:
  at least one person, at least one machine, or a combination thereof, that performs at least one conveyance service; and
j) at least one representative preference; including:
  i) at least one option selected or provided by said at least one representative that is used to filter all or some of said plurality of conveyance service requests into all or some of said plurality of filtered conveyance service requests; and
  ii) said at least one representative preference being used to identify said at least one preferred conveyance service request;
wherein, all or some of said plurality of conveyance service requests are transmitted in real time or near real time between said at least one external server and said at least one central server by way of at least one link between said at least one external server and said at least one central server;
further wherein, said at least one preferred conveyance service request, said at least one representative preference, said at least one real time or near real time geographical location of said at least one representative, or a combination thereof, is transmitted in real time or near real time between said at least one central server and said at least one application by way of at least one link between said at least one central server and said at least one application;
further wherein, said at least one application operates on said at least one terminal and is used by said at least one representative;
further wherein, said at least one central server analyzes or evaluates all or some of said plurality of filtered conveyance service requests and then secures or obtains said at least one preferred conveyance service request relating to said at least one representative preference in real time or near real time;
further wherein, said at least one external server is at least one real time or near real time source of all or some of said plurality of conveyance service requests transmitted in real time or near real time from said at least one external server to said at least one central server by way of at least one link between said at least one external server and said at least one central server; further wherein, all or some of said plurality of conveyance service requests are updated in real time or near real time;
further wherein, said at least one central server standardizes, aggregates, or a combination thereof, in real time or near real time, all or some of said plurality of conveyance service requests;
further wherein, said at least one central server filters in real time or near real time, all or some of said plurality of conveyance service requests by using said at least one representative preference and said at least one real time or near real time geographical location of said at least one representative, to identify all or some of said plurality of filtered conveyance service requests; further wherein, all or some of said plurality of filtered conveyance service requests are updated in real time or near real time;
further wherein, said at least one terminal facilitates or provides at least one input function, at least one display function, and operation of said at least one application and is used by said at least one representative to interface with said at least one application;
further wherein, said at least one central server analyzes or evaluates all or some of said plurality of filtered conveyance service requests in real time or near real time, to identify said at least one preferred conveyance service request;
further wherein, said at least one preferred conveyance service request is updated in real time or near real time;
further wherein, said at least one central server secures or obtains said at least one preferred conveyance service request relating to said at least one representative preference in real time or near real time;
further wherein, said at least one application displays, updated in real time or near real time, at least one secured or obtained preferred conveyance service request that is transmitted in real time or near real time from said at least one central server to said at least one application by way of at least one link between said at least one central server and said at least one application; and further wherein, said at least one representative performs said at least one conveyance service relating to said at least one secured or obtained preferred conveyance service request and said at least one real time or near real time geographical location of said at least one representative updates or changes, while said at least one central server repeatedly analyzes or evaluates all or some of said plurality of conveyance service requests in real time or near real time, and then secures or obtains at least one subsequent or additional preferred conveyance service request, until stopped by said at least one representative.

A. At Least One Central Server

An embodiment of the present invention includes, wherein at least one function of said at least one central server is performed by said at least one application.

Another embodiment of the present invention includes, wherein said at least one central server is located on said at least one terminal.

A further embodiment of the present invention includes, wherein all or some of said plurality of conveyance service requests, structured in at least one different format, are standardized or converted into at least one uniform format.

An additional embodiment of the present invention includes, wherein all or some of said plurality of conveyance service requests are structured in at least one uniform format prior to being transmitted from said at least one external server to said at least one central server by way of at least one link between said at least one external server and said at least one central server, and are not standardized.

B. At Least One Application

An embodiment of the present invention includes, wherein said at least one application operates on said at least one central server.

Another embodiment of the present invention includes, wherein at least one function of said at least one application is performed by said at least one central server.

C. Plurality of Conveyance Service Requests

An embodiment of the present invention includes, wherein all or some of said plurality of conveyance service requests in conjunction with corresponding conveyance data are sourced or provided by at least one service provider operating in at least one conveyance industry segment.

Another embodiment of the present invention includes, wherein all or some of said plurality of conveyance service requests include at least one ride-hail service request, at least one ride-share service request, at least one car-share service request, at least one peer-to-peer conveyance service request, at least one person delivery service request, at least one taxi service request, at least one shuttle service request, at least one good delivery service request, at least one item delivery service request, at least one medical service and delivery request, at least one food delivery service request, at least one courier delivery service request, at least one freight delivery service request, at least one animal delivery service request, at least one delivery service request, or a combination thereof.

A further embodiment of the present invention includes, wherein said plurality of conveyance service requests is a single conveyance service request.

An additional embodiment of the present invention includes, wherein conveyance data includes at least one beginning service geographical location, at least one ending service geographical location, pricing information, elevated pricing information, at least one representative preference, at least one distance parameter, at least one estimated time of arrival, at least one time to destination, at least one real time or near real time geographical location of at least one conveyance client, at least one conveyance client review, at least one conveyance client rating, at least one conveyance client detail, at least one conveyance service detail, at least one conveyance service route, at least one preferred conveyance client, at least one real time or near real time geographical location of at least one representative, at least one representative review, at least one representative rating, at least one representative detail, at least one real time or near real time geographical location of at least one autonomous vehicle, at least one autonomous vehicle review, at least one autonomous vehicle rating, at least one autonomous vehicle detail, at least one real time or near real time geographical location of at least one service provider, at least one service provider review, at least one service provider rating, at least one service provider detail, at least one preferred service provider, at least one real time or near real time geographical location of at least one good supplier, at least one good supplier review, at least one good supplier rating, at least one good supplier detail, at least one preferred good supplier, at least one conveyance industry segment detail, at least one preferred conveyance industry segment, at least one good detail, at least one item detail, at least one type of vehicle detail, at least one vehicle detail, at least one measurement of at least one statistical variable, at least one level of service detail, or a combination thereof.

D. Plurality of Filtered Conveyance Service Requests

An embodiment of the present invention includes, wherein all or some of said plurality of conveyance service requests are filtered relating to said at least one representative preference and said at least one real time or near real time geographical location of said at least one representative, to identify all or some of said plurality of filtered conveyance service requests by at least one process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

A further embodiment of the present invention include, wherein said at least one preferred conveyance service request is identified from all or some of said plurality of filtered conveyance service requests relating to at least one weighted average of said at least one representative preference.

An additional embodiment of the present invention includes, wherein at least one different geographical location is used other than said at least one real time or near real time geographical location of said at least one representative when filtering all or some of said plurality of conveyance service requests.

An embodiment of the present invention includes, wherein said plurality of filtered conveyance service requests is a single filtered conveyance service request.

E. At Least One Preferred Conveyance Service Request

An embodiment of the present invention includes, wherein said at least one representative secures or obtains at least one said filtered conveyance service request other than said at least one preferred conveyance service request.

F. At Least One Representative Preference

An embodiment of the present invention includes, wherein said at least one representative preference includes at least one pricing preference, at least one elevated pricing preference, at least one geographical location preference, at least one distance preference, at least one route preference, at least one service duration preference, at least one beginning service geographical location preference, at least one ending service geographical location preference, at least one time preference, at least one predictive preference, at least one historical preference, at least one efficiency preference, at least one event inclusion preference, at least one event exclusion preference, at least one traffic based preference, at least one road condition preference, at least one weather condition preference, at least one duration of conveyance service preference, at least one conveyance service request density preference, at least one conveyance client density preference, at least one conveyance client detail preference, at least one conveyance client rating preference, at least one representative density preference, at least one service provider inclusion preference, at least one service provider exclusion preference, at least one service provider density preference, at least one level of service preference, at least one good supplier inclusion preference, at least one good supplier exclusion preference, at least one good supplier density preference, at least one good detail preference, at least one conveyance industry segment preference, at least one freight preference, at least one waypoint preference, at least one delivery service preference, or a combination thereof.

G. Functionality

Another embodiment of the present invention includes, wherein said at least one subsequent or additional preferred conveyance service request is secured or obtained in at least one different conveyance industry segment for said at least one representative.

A further embodiment of the present invention includes, wherein said at least one preferred conveyance service request in conjunction with corresponding conveyance data, all or some of said plurality of filtered conveyance service requests in conjunction with corresponding conveyance data, or a combination thereof, is identified or updated in real time or near real time as said at least one real time or near real time geographical location of said at least one representative updates or changes or as traffic information updates or changes.

An embodiment of the present invention includes, wherein said at least one representative uses said at least one application to analyze or evaluate and then secure or obtain said at least one preferred conveyance service request.

Another embodiment of the present invention includes, wherein said at least one preferred conveyance service request in conjunction with corresponding conveyance data is transmitted to said at least one application and is displayed, includes at least one pop-up, at least one icon, at least one visual, at least one symbol, at least one pattern, at least one marker, at least one notification, at least one alert, at least one message, at least one short message service, at least one multimedia messaging service, at least one smart messaging service, at least one extended message service, or a combination thereof.

A further embodiment of the present invention includes, wherein said at least one representative accepts or declines said at least one preferred conveyance service request.

An additional embodiment of the present invention includes, wherein said at least one representative declines said at least one preferred conveyance service request and at least one new or different preferred conveyance service request is identified and displayed.

An embodiment of the present invention includes, wherein more than one said preferred conveyance service requests are secured or obtained concurrently for said at least one representative.

Another embodiment of the present invention includes, wherein said at least one secured or obtained preferred conveyance service request in conjunction with corresponding conveyance data, said at least one preferred conveyance service request in conjunction with corresponding conveyance data, all or some of said plurality of filtered conveyance service requests in conjunction with corresponding conveyance data, or a combination thereof, is displayed on at least one remote display.

A further embodiment of the present invention includes, wherein said at least one subsequent or additional preferred conveyance service request is secured or obtained and at least one order to perform said at least one conveyance service is updated or changed.

An additional embodiment of the present invention includes, wherein said at least one central server, said at least one application, or a combination thereof, proposes or recommends at least one different conveyance service request other than said at least one preferred conveyance service request.

II. Method #1: Representative Automated Platform

A second aspect of the present invention includes a real time or near real time method, automated in whole or in part, to assist at least one representative in at least one process of securing or obtaining, within the conveyance industry, at least one preferred conveyance service request relating to at least one representative preference and at least one real time or near real time geographical location of said at least one representative, the method including:

a) providing any system of section I above;

b) receiving in real time or near real time, at said at least one central server, all or some of said plurality of conveyance service requests from said at least one external server by way of at least one link between said at least one central server and said at least one external server;

c) storing in real time or near real time, all or some of said plurality of conveyance service requests in said at least one computer readable memory of said at least one central server;

d) standardizing in real time or near real time, all or some of said plurality of conveyance service requests using said at least one central server;

e) aggregating in real time or near real time, all or some of said plurality of conveyance service requests using said at least one central server;

f) transmitting in real time or near real time, said at least one representative preference and said at least one real time or near real time geographical location of said at least one representative from said at least one application to said at least one central server by way of at least one link between said at least one application and said at least one central server, wherein:
  i) said at least one representative, using said at least one input source of said at least one terminal, inputs or provides said at least one representative preference into said at least one application; and
  ii) said at least one application provides said at least one real time or near real time geographical location of said at least one representative using said at least one geographical location module of said at least one terminal;

g) receiving in real time or near real time, said at least one representative preference and said at least one real time or near real time geographical location of said at least one representative at said at least one central server from said at least one application by way of at least one link between said at least one central server and said at least one application;

h) filtering in real time or near real time, at said at least one central server, all or some of said plurality of conveyance service requests by using said at least one representative preference and said at least one real time or near real time geographical location of said at least one representative, to identify all or some of said plurality of filtered conveyance service requests;

i) identifying in real time or near real time, at said at least one central server, said at least one preferred conveyance service request from all or some of said plurality of filtered conveyance service requests relating to said at least one representative preference;

j) securing or obtaining in real time or near real time, at said at least one central server, said at least one preferred conveyance service request;

k) transmitting in real time or near real time, said at least one secured or obtained preferred conveyance service request from said at least one central server to said at least one application by way of at least one link between said at least one central server and said at least one application;

l) receiving in real time or near real time, said at least one secured or obtained preferred conveyance service request at said at least one application from said at least one central server by way of at least one link between said at least one application and said at least one central server;

m) displaying in real time or near real time, said at least one secured or obtained preferred conveyance service request in conjunction with corresponding conveyance data on said at least one application; and n) wherein, said at least one representative performs said at least one conveyance service relating to said at least one secured or obtained preferred conveyance service request and said at least one real time or near real time geographical location of said at least one representative updates or changes, while said at least one central server repeatedly analyzes or evaluates all or some of said plurality of conveyance service requests in real time or near real time, and then secures or obtains said at least one subsequent or additional preferred conveyance service request, until stopped by said at least one representative.

A. Standardizing Plurality of Conveyance Service Requests

An embodiment of the present invention includes, wherein all or some of said plurality of conveyance service requests, structured in at least one different format, are standardized or converted into at least one uniform format.

Another embodiment of the present invention includes, wherein all or some of said plurality of conveyance service requests are structured in at least one uniform format prior to being transmitted from said at least one external server to said at least one central server by way of at least one link between said at least one external server and said at least one central server, and are not standardized.

A further embodiment of the present invention includes, wherein steps C-G can be in any order prior to filtering all or some of said plurality of conveyance service requests.

B. Transmitting at Least One Representative Preference and at Least One Geographical Location to at Least One Central Server An embodiment of the present invention includes, wherein said at least one representative preference, once inputted or provided into said at least one application, is stored or cached on said at least one application, said at least one computer readable memory of said at least one central server, or a combination thereof, and said at least one representative preference is not inputted or provided again into said at least one application by said at least one representative.

Another embodiment of the present invention includes, wherein said at least one representative preference is stored or cached in said at least one computer readable memory of said at least one central server and said at least one representative preference is not transmitted again from said at least one application to said at least one central server.

A further embodiment of the present invention includes, wherein said at least one representative preference, said at least one real time or near real time geographical location of said at least one representative, or a combination thereof, is transmitted from said at least one application to said at least one central server at any time prior to filtering all or some of said plurality of conveyance service requests.

C. Filtering Plurality of Conveyance Service Requests

An embodiment of the present invention includes, wherein all or some of said plurality of conveyance service requests are filtered relating to said at least one representative preference and said at least one real time or near real time geographical location of said at least one representative, to identify all or some of said plurality of filtered conveyance service requests by at least one process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

Another embodiment of the present invention includes, wherein all or some of said plurality of conveyance service requests are filtered in real time or near real time and said at least one preferred conveyance service request is identified in real time or near real time from all or some of said plurality of filtered conveyance service requests on said at least one application by:

a) transmitting in real time or near real time, all or some of said plurality of conveyance service requests from said at least one central server to said at least one application by way of at least one link between said at least one central server and said at least one application;

b) filtering in real time or near real time, all or some of said plurality of conveyance service requests by using said at least one representative preference and said at least one real time or near real time geographical location of said at least one representative, to identify all or some of said plurality of filtered conveyance service requests; and c) identifying in real time or near real time, said at least one preferred conveyance service request from all or some of said plurality of filtered conveyance service requests relating to said at least one representative preference.

A further embodiment of the present invention includes, wherein at least one different geographical location is used other than said at least one real time or near real time geographical location of said at least one representative when filtering all or some of said plurality of conveyance service requests.

D. Identifying at Least One Preferred Conveyance Service Request

An embodiment of the present invention includes, wherein said at least one preferred conveyance service request relating to said at least one representative preference is identified from all or some of said plurality of filtered conveyance service requests by using at least one sorting algorithm, at least one selection algorithm, at least one search algorithm, at least one merge algorithm, at least one maximum function, at least one minimum function, at least one comparison, or a combination thereof.

Another embodiment of the present invention includes, wherein said at least one preferred conveyance service request is identified from all or some of said plurality of filtered conveyance service requests relating to at least one weighted average of said at least one representative preference.

A further embodiment of the present invention includes, wherein said at least one preferred conveyance service request is identified in real time or near real time from all or some of said plurality of filtered conveyance service requests on said at least one application by:
  a) transmitting in real time or near real time, all or some of said plurality of filtered conveyance service requests from said at least one central server to said at least one application by way of at least one link between said at least one central server and said at least one application; and
  b) identifying in real time or near real time, said at least one preferred conveyance service request from all or some of said plurality of filtered conveyance service requests relating to said at least one representative preference.

E. Securing or Obtaining at Least One Preferred Conveyance Service Request

An embodiment of the present invention includes, wherein said at least one representative uses said at least one application to analyze or evaluate and then secure or obtain said at least one preferred conveyance service request.

Another embodiment of the present invention includes, wherein said at least one preferred conveyance service request in conjunction with corresponding conveyance data is transmitted to said at least one application and is displayed, includes at least one pop-up, at least one icon, at least one visual, at least one symbol, at least one pattern, at least one marker, at least one notification, at least one alert, at least one message, at least one short message service, at least one multimedia messaging service, at least one smart messaging service, at least one extended message service, or a combination thereof.

A further embodiment of the present invention includes, wherein said at least one representative accepts or declines said at least one preferred conveyance service request.

An additional embodiment of the present invention includes, wherein said at least one representative declines said at least one preferred conveyance service request and at least one new or different preferred conveyance service request is identified and displayed.

An embodiment of the present invention includes, wherein more than one said preferred conveyance service requests are secured or obtained concurrently for said at least one representative.

F. Displaying

An embodiment of the present invention includes, wherein said at least one secured or obtained preferred conveyance service request in conjunction with corresponding conveyance data, said at least one preferred conveyance service request in conjunction with corresponding conveyance data, all or some of said plurality of filtered conveyance service requests in conjunction with corresponding conveyance data, or a combination thereof, is displayed on at least one remote display.

G. Additional Embodiments

An embodiment of the present invention includes, wherein at least one function of said at least one central server is performed by said at least one application.

Another embodiment of the present invention includes, wherein said at least one application operates on said at least one central server.

A further embodiment of the present invention includes, wherein at least one function of said at least one application is performed by said at least one central server.

An embodiment of the present invention includes, wherein all or some of said plurality of conveyance service requests in conjunction with corresponding conveyance data are sourced or provided by at least one service provider operating in at least one conveyance industry segment.

Another embodiment of the present invention includes, wherein said at least one subsequent or additional preferred conveyance service request is secured or obtained in at least one different conveyance industry segment for said at least one representative.

A further embodiment of the present invention includes, wherein said at least one preferred conveyance service request in conjunction with corresponding conveyance data, all or some of said plurality of filtered conveyance service requests in conjunction with corresponding conveyance data, or a combination thereof, is identified or updated in, real time or near real time as said at least one real time or near real time geographical location of said at least one representative updates or changes or as traffic information updates or changes.

An embodiment of the present invention includes, wherein said plurality of conveyance service requests is a single conveyance service request.

An embodiment of the present invention includes, wherein said plurality of filtered conveyance service requests is a single filtered conveyance service request.

Another embodiment of the present invention includes, wherein said at least one representative secures or obtains at least one said filtered conveyance service request other than said at least one preferred conveyance service request.

An additional embodiment of the present invention includes, wherein said at least one subsequent or additional preferred conveyance service request is secured or obtained and at least one order to perform said at least one conveyance service is updated or changed.

An embodiment of the present invention includes, wherein said at least one central server, said at least one application, or a combination thereof, proposes or recommends at least one different conveyance service request other than said at least one preferred conveyance service request.

III. System #2: Autonomous Vehicle Automated Platform

A third aspect of the present invention includes a real time or near real time system, automated in whole or in part, to assist at least one autonomous vehicle in at least one process of securing or obtaining, within the conveyance industry, at least one preferred conveyance service request relating to at least one selected preference and at least one real time or near real time geographical location of said at least one autonomous vehicle, including:
  a) at least one external server; including:
    i) at least one computer processor;
    ii) at least one computer readable memory;
    iii) at least one network interface; and
    iv) at least one real time or near real time source of a plurality of conveyance service requests;
  b) at least one central server; including:
    i) at least one computer processor;
    ii) at least one computer readable memory; and
    iii) at least one network interface;
  c) at least one terminal; including:
    at least one electronic computing device including;
      (i) at least one computer processor;
      (ii) at least one computer readable memory;
      (iii) at least one geographical location module; and
      (iv) at least one network interface;

d) at least one application; including:
at least one computer program being operable to communicate said at least one preferred conveyance service request to said at least one autonomous vehicle;
e) at least one link; including:
at least one electronic communication network channel;
f) a plurality of conveyance service requests, including:
at least one individual conveyance service request including:
(i) at least one request for transporting at least one person, at least one good, at least one thing, or a combination thereof, from at least one geographical location to at least one other geographical location;
(ii) said individual conveyance service request being updated in real time or near real time; and
(iii) qualitative and quantitative conveyance data corresponding to said individual conveyance service request;
g) a plurality of filtered conveyance service requests; including:
i) at least one subset of all or some of said plurality of conveyance service requests that is at least one result of filtering all or some of said plurality of conveyance service requests using said at least one selected preference and said at least one real time or near real time geographical location of said at least one autonomous vehicle;
ii) all or some of said plurality of filtered conveyance service requests being updated in real time or near real time; and
iii) qualitative and quantitative conveyance data corresponding to individual filtered conveyance service requests;
h) at least one preferred conveyance service request; including:
i) at least one request for transporting said at least one person, said at least one good, said at least one thing, or a combination thereof, from at least one geographical location to at least one other geographical location that is identified from all or some of said plurality of filtered conveyance service requests;
ii) said at least one preferred conveyance service request being updated in real time or near real time; and
iii) qualitative and quantitative conveyance data corresponding to an individual preferred conveyance service request;
i) at least one autonomous vehicle; including:
at least one self-maneuvering machine or at least one self-driving machine that performs at least one conveyance service; and
j) at least one selected preference; including:
i) at least one option selected or provided by at least one owner or at least one controller of said at least one autonomous vehicle that is used to filter all or some of said plurality of conveyance service requests into all or some of said plurality of filtered conveyance service requests; and
ii) said at least one selected preference being used to identify said at least one preferred conveyance service request;
wherein, all or some of said plurality of conveyance service requests are transmitted in real time or near real time between said at least one external server and said at least one central server by way of at least one link between said at least one external server and said at least one central server;

further wherein, said at least one preferred conveyance service request, said at least one real time or near real time geographical location of said at least one autonomous vehicle, or a combination thereof, is transmitted in real time or near real time between said at least one central server and said at least one application by way of at least one link between said at least one central server and said at least one application;

further wherein, said at least one application operates on said at least one terminal and is utilized by said at least one autonomous vehicle;

further wherein, said at least one terminal is associated with said at least one autonomous vehicle;

further wherein, said at least one central server analyzes or evaluates all or some of said plurality of filtered conveyance service requests and then secures or obtains said at least one preferred conveyance service request relating to said at least one selected preference in real time or near real time;

further wherein, said at least one external server is at least one real time or near real time source of all or some of said plurality of conveyance service requests transmitted in real time or near real time from said at least one external server to said at least one central server by way of at least one link between said at least one external server and said at least one central server;

further wherein, all or some of said plurality of conveyance service requests are updated in real time or near real time;

further wherein, said at least one central server standardizes, aggregates, or a combination thereof, in real time or near real time, all or some of said plurality of conveyance service requests;

further wherein, said at least one central server filters in real time or near real time, all or some of said plurality of conveyance service requests by using said at least one selected preference and said at least one real time or near real time geographical location of said at least one autonomous vehicle, to identify all or some of said plurality of filtered conveyance service requests; further wherein, all or some of said plurality of filtered conveyance service requests are updated in real time or near real time;

further wherein, said at least one terminal interfaces with said at least one autonomous vehicle and facilitates or provides operation of said at least one application;

further wherein, said at least one central server analyzes or evaluates all or some of said plurality of filtered conveyance service requests in real time or near real time, to identify said at least one preferred conveyance service request;

further wherein, said at least one preferred conveyance service request is updated in real time or near real time;

further wherein; said at least one central server secures or obtains said at least one preferred conveyance service request relating to said at least one selected preference in real time or near real time;

further wherein, by way of at least one link between said at least one central server and said at least one application, at least one secured or obtained preferred conveyance service request is transmitted in real time or near real time from said at least one central server to said at least one application and updated in real time or near real time; and further wherein, said at least one autonomous vehicle performs said at least one conveyance service relating to said at least one secured or obtained preferred conveyance service request and said at least one real time or near real time geographical location of said at least one autonomous vehicle updates or changes, while said at least one central server repeatedly analyzes or evaluates all or some of said plurality of conveyance service requests in real time or near real time, and then secures or obtains at least one subsequent or additional preferred conveyance service request, until stopped by said at least one owner or said at least one controller of said at least one autonomous vehicle.

A. At Least One Central Server

An embodiment of the present invention includes, wherein at least one function of said at least one central server is performed by said at least one application, at least one owner or controller application, or a combination thereof.

Another embodiment of the present invention includes, wherein said at least one central server is located on said at least one terminal.

A further embodiment of the present invention includes, wherein all or some of said plurality of conveyance service requests, structured in at least one different format, are standardized or converted into at least one uniform format.

An additional embodiment of the present invention includes, wherein all or some of said plurality of conveyance service requests are structured in at least one uniform format prior to being transmitted from said at least one external server to said at least one central server by way of at least one link between said at least one external server and said at least one central server, and are not standardized.

B. At Least One Application

An embodiment of the present invention includes, wherein said at least one application, at least one owner or controller application, or a combination thereof, operates on said at least one central server.

Another embodiment of the present invention includes, wherein at least one function of said at least one application, at least one owner or controller application, or a combination thereof, is performed by said at least one central server.

C. Plurality of Conveyance Service Requests

An embodiment of the present invention includes, wherein all or some of said plurality of conveyance service requests in conjunction with corresponding conveyance data are sourced or provided by at least one service provider operating in at least one conveyance industry segment.

Another embodiment of the present invention includes, wherein all or some of said plurality of conveyance service requests includes at least one ride-hail service request, at least one ride-share service request, at least one car-share service request, at least one peer-to-peer conveyance service request, at least one person delivery service request, at least one taxi service request, at least one shuttle service request, at least one good delivery service request, at least one item delivery service request, at least one medical service and delivery request, at least one food delivery service request, at least one courier delivery service request, at least one freight delivery service request, at least one animal delivery service request, at least one delivery service request, or a combination thereof.

A further embodiment of the present invention includes, wherein said plurality of conveyance service requests is a single conveyance service request.

An additional embodiment of the present invention includes, wherein conveyance data includes at least one beginning service geographical location, at least one ending service geographical location, pricing information, elevated pricing information, at least one selected preference, at least one distance parameter, at least one estimated time of arrival, at least one time to destination, at least one conveyance client geographical location, at least one conveyance client review, at least one conveyance client rating, at least one conveyance client detail, at least one conveyance service detail, at least one conveyance service route, at least one preferred conveyance client, at least one representative geographical location, at least one representative review, at least one representative rating, at least one representative detail, at least one autonomous vehicle geographical location, at least one autonomous vehicle review, at least one autonomous vehicle rating, at least one autonomous vehicle detail, at least one service provider geographical location, at least one service provider review, at least one service provider rating, at least one service provider detail, at least one preferred service provider, at least one good supplier geographical location, at least one good supplier review, at least one good supplier rating, at least one good supplier detail, at least one preferred good supplier, at least one conveyance industry segment detail, at least one preferred conveyance industry segment, at least one good detail, at least one item detail, at least one type of vehicle detail, at least one vehicle detail, at least one measurement of at least one statistical variable, at least one level of service detail, or a combination thereof.

D. Plurality of Filtered Conveyance Service Requests

An embodiment of the present invention includes, wherein all or some of said plurality of conveyance service requests are filtered relating to said at least one selected preference and said at least one real time or near real time geographical location of said at least one autonomous vehicle, to identify all or some of said plurality of filtered conveyance service requests by at least one process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

Another embodiment of the present invention includes, wherein said at least one preferred conveyance service request is identified from all or some of said plurality of filtered conveyance service requests relating to at least one weighted average of said at least one selected preference.

A further embodiment of the present invention includes, wherein at least one different geographical location is used other than said at least one real time or near real time geographical location of said at least one autonomous vehicle when filtering all or some of said plurality of conveyance service requests.

An additional embodiment of the present invention includes, wherein said plurality of filtered conveyance service requests is a single filtered conveyance service request.

E. At Least One Preferred Conveyance Service Request

An embodiment of the present invention includes, wherein said at least one owner or said at least one controller of said at least one autonomous vehicle secures or obtains at least one said filtered conveyance service request other than said at least one preferred conveyance service request.

F. At Least One Autonomous Vehicle

An embodiment of the present invention includes, wherein said at least one autonomous vehicle includes at least one car, at least one automobile, at least one van, at least one truck, at least one semi-trailer truck, at least one shuttle, at least one helicopter, at least one aircraft, at least one boat, at least one vessel, at least one spacecraft, at least one bus, at least one train, at least one wagon, at least one all-terrain vehicle, at least one eighteen wheeler, at least one transportation machine, at least one drone, at least one medical vehicle, or a combination thereof.

G. At Least One Selected Preference

An embodiment of the present invention includes, wherein said at least one selected preference includes at least one pricing preference, at least one elevated pricing preference, at least one geographical location preference, at least one distance preference, at least one route preference, at least one service duration preference, at least one beginning service geographical location preference, at least one ending service geographical location preference, at least one time preference, at least one predictive preference, at least one historical preference, at least one efficiency preference, at least one event inclusion preference, at least one event exclusion preference, at least one traffic based preference, at least one road condition preference, at least one weather condition preference, at least one duration of conveyance service preference, at least one conveyance service request density preference, at least one conveyance client density preference, at least one conveyance client detail preference, at least one conveyance client rating preference, at least one representative density preference, at least one autonomous vehicle density preference, at least one service provider inclusion preference, at least one service provider exclusion preference, at least one service provider density preference, at least one level of service preference, at least one good supplier inclusion preference, at least one good supplier exclusion preference, at least one good supplier density preference, at least one good detail preference, at least one conveyance industry segment preference, at least one freight preference, at least one waypoint preference, at least one delivery service preference, or a combination thereof.

H. Functionality

An embodiment of the present invention includes, wherein said at least one subsequent or additional preferred conveyance service request is secured or obtained in at least one different conveyance industry segment for said at least one autonomous vehicle.

Another embodiment of the present invention includes, wherein said at least one preferred conveyance service request in conjunction with corresponding conveyance data, all or some of said plurality of filtered conveyance service requests in conjunction with corresponding conveyance data, or a combination thereof, is identified or updated in real time or near real time as said at least one real time or near real time geographical location of said at least one autonomous vehicle updates or changes or as traffic information updates or changes.

An additional embodiment of the present invention includes, wherein said at least one selected preference of said at least one owner or said at least one controller of said at least one autonomous vehicle is provided or inputted into at least one owner or controller application and transmitted to said at least one central server by way of at least one link between said at least one owner or controller application and said at least one central server.

An embodiment of the present invention includes, wherein said at least one owner or said at least one controller of said at least one autonomous vehicle uses at least one owner or controller application, said at least one application, or a combination thereof, to analyze or evaluate and then secure or obtain said at least one preferred conveyance service request.

A further embodiment of the present invention includes, wherein said at least one preferred conveyance service request in conjunction with corresponding conveyance data is transmitted to said at least one owner or controller application or said at least one application and is displayed, includes at least one pop-up, at least one icon, at least one visual, at least one symbol, at least one pattern, at least one marker, at least one notification, at least one alert, at least one message, at least one short message service, at least one multimedia messaging service, at least one smart messaging service, at least one extended message service, or a combination thereof.

An additional embodiment of the present invention includes, wherein said at least one owner or said at least one controller of said at least one autonomous vehicle accepts or declines said at least one preferred conveyance service request.

An embodiment of the present invention includes, wherein said at least one owner or said at least one controller of said at least one autonomous vehicle declines said at least one preferred conveyance service request and at least one new or different preferred conveyance service request is identified and displayed.

Another embodiment of the present invention includes, wherein more than one said preferred conveyance service requests are secured or obtained concurrently for said at least one autonomous vehicle.

A further embodiment of the present invention includes, wherein said at least one owner or said at least one controller of said at least one autonomous vehicle is at least one service provider operating in at least one conveyance industry segment.

An additional embodiment of the present invention includes, wherein said at least one subsequent or additional preferred conveyance service request is secured or obtained and at least one order to perform said at least one conveyance service is updated or changed.

An embodiment of the present invention includes, wherein said at least one central server, said at least one application, at least one owner or controller application, or a combination thereof, proposes or recommends at least one different conveyance service request other than said at least one preferred conveyance service request.

Another embodiment of the present invention includes, wherein said at least one application, at least one owner or controller application, or a combination thereof, secures or obtains said at least one preferred conveyance service request.

IV. Method #2: Autonomous Vehicle Automated Platform

A fourth aspect of the present invention includes a real time or near real time method, automated in whole or in part, to assist at least one autonomous vehicle in at least one process of securing or obtaining, within the conveyance industry, at least one preferred conveyance service request relating to at least one selected preference and at least one real time or near real time geographical location of said at least one autonomous vehicle, the method including:

a) providing any system of section III above;
b) receiving in real time or near real time, at said at least one central server, all or some of said plurality of conveyance service requests from said at least one external server by way of at least one link between said at least one central server and said at least one external server;
c) storing in real time or near real time, all or some of said plurality of conveyance service requests in said at least one computer readable memory of said at least one central server;
d) standardizing in real time or near real time, all or some of said plurality of conveyance service requests using said at least one central server;
e) aggregating in real time or near real time, all or some of said plurality of conveyance service requests using said at least one central server;
f) transmitting in real time or near real time, said at least one real time or near real time geographical location of said at least one autonomous vehicle from said at least one application to said at least one central server by way of at least one link between said at least one application and said at least one central server, wherein:
  i) said at least one application provides said at least one real time or near real time geographical location of said at least one autonomous vehicle using said at least one geographical location module of said at least one terminal;
g) receiving in real time or near real time, said at least one real time or near real time geographical location of said at least one autonomous vehicle at said at least one central server from said at least one application by way of at least one link between said at least one central server and said at least one application;
h) filtering in real time or near real time, at said at least one central server, all or some of said plurality of conveyance service requests by using said at least one selected preference and said at least one real time or near real time geographical location of said at least one autonomous vehicle, to identify all or some of said plurality of filtered conveyance service requests, wherein:
  i) said at least one selected preference is inputted or provided by said at least one owner or said at least one controller of said at least one autonomous vehicle and stored or cached in said at least one computer readable memory of said at least one central server.
i) identifying in real time or near real time, at said at least one central server, said at least one preferred conveyance service request from all or some of said plurality of filtered conveyance service requests relating to said at least one selected preference;
j) securing or obtaining in real time or near real time, at said at least one central server, said at least one preferred conveyance service request;
k) transmitting in real time or near real time, said at least one secured or obtained preferred conveyance service request from said at least one central server to said at least one application by way of at least one link between said at least one central server and said at least one application;
l) receiving in real time or near real time, said at least one secured or obtained preferred conveyance service request at said at least one application from said at least one central server by way of at least one link between said at least one application and said at least one central server; and
m) wherein, said at least one autonomous vehicle performs said at least one conveyance service relating to said at least one secured or obtained preferred conveyance service request and said at least one real time or near real time geographical location of said at least one autonomous vehicle updates or changes, while said at least one central server repeatedly analyzes or evaluates all or some of said plurality of conveyance service requests in real time or near real time, and then secures or obtains said at least one subsequent or additional preferred conveyance service request, until stopped by said at least one owner or said at least one controller of said at least one autonomous vehicle.

A. Standardizing Plurality of Conveyance Service Requests

An embodiment of the present invention includes, wherein all or some of said plurality of conveyance service requests, structured in at least one different format, are standardized or converted into at least one uniform format.

Another embodiment of the present invention includes, wherein all or some of said plurality of conveyance service requests are structured in at least one uniform format prior to being transmitted from said at least one external server to said at least one central server by way of at least one link between said at least one external server and said at least one central server, and are not standardized.

A further embodiment of the present invention includes, wherein steps C-G can be in any order prior to filtering all or some of said plurality of conveyance service requests.

B. Transmitting at Least One Geographical Location to at Least One Central Server An embodiment of the present invention includes, wherein said at least one selected preference is provided or inputted by said at least one owner or said at least one controller of said at least one autonomous vehicle into said at least one application or at least one owner or controller application and stored or cached on said at least one application, said at least one owner or controller application, said at least one computer readable memory of said at least one central server, or a combination thereof.

Another embodiment of the present invention includes, wherein said at least one selected preference is transmitted from said at least one application to said at least one central server by way of at least one link between said at least one application and said at least one central server.

A further embodiment of the present invention includes, wherein said at least one selected preference is transmitted from said at least one owner or controller application to said at least one central server by way of at least one link between said at least one owner or controller application and said at least one central server.

An additional embodiment of the present invention includes, wherein said at least one selected preference, said at least one real time or near real time geographical location of said at least one autonomous vehicle, or a combination thereof, is transmitted to said at least one central server at any time prior to filtering all or some of said plurality of conveyance service requests.

C. Filtering a Plurality of Conveyance Service Requests

An embodiment of the present invention includes, wherein all or some of said plurality of conveyance service requests are filtered relating to said at least one selected preference and said at least one real time or near real time geographical location of said at least one autonomous vehicle, to identify all or some of said plurality of filtered conveyance service requests by at least one process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

Another embodiment of the present invention includes, wherein all or some of said plurality of conveyance service requests are filtered in real time or near real time and said at least one preferred conveyance service request is identified in real time or near real time, from all or some of said plurality of filtered conveyance service requests on said at least one application by:
  a) transmitting in real time or near real time, all or some of said plurality of conveyance service requests from said at least one central server to said at least one application by way of at least one link between said at least one central server and said at least one application;
  b) filtering in real time or near real time, all or some of said plurality of conveyance service requests by using said at least one selected preference and said at least one real time or near real time geographical location of said at least one autonomous vehicle, to identify all or some of said plurality of filtered conveyance service requests; and
  c) identifying in real time or near real time, said at least one preferred conveyance service request from all or some of said plurality of filtered conveyance service requests relating to said at least one selected preference.

A further embodiment of the present invention includes, wherein all or some of said plurality of conveyance service requests are filtered in real time or near real time and said at least one preferred conveyance service request is identified in real time or near real time, from all or some of said plurality of filtered conveyance service requests on at least one owner or controller application by:
  a) transmitting in real time or near real time, all or some of said plurality of conveyance service requests from said at least one central server to said at least one owner or controller application by way of at least one link between said at least one central server and said at least one owner or controller application;
  b) filtering in real time or near real time, all or some of said plurality of conveyance service requests by using said at least one selected preference and said at least one real time or near real time geographical location of said at least one autonomous vehicle, to identify all or some of said plurality of filtered conveyance service requests; and
  c) identifying in real time or near real time, said at least one preferred conveyance service request from all or some of said plurality of filtered conveyance service requests relating to said at least one selected preference.

An additional embodiment of the present invention includes, wherein at least one different geographical location is used other than said at least one real time or near real time geographical location of said at least one autonomous vehicle when filtering all or some of said plurality of conveyance service requests.

D. Identifying at Least One Preferred Conveyance Service Request

An embodiment of the present invention includes, wherein said at least one preferred conveyance service request relating to said at least one selected preference is identified from all or some of said plurality of filtered conveyance service requests by using at least one sorting algorithm, at least one selection algorithm, at least one search algorithm, at least one merge algorithm, at least one maximum function, at least one minimum function, at least one comparison, or a combination thereof.

Another embodiment of the present invention includes The method of claim 107, wherein said at least one preferred conveyance service request is identified from all or some of said plurality of filtered conveyance service requests relating to at least one weighted average of said at least one selected preference.

A further embodiment of the present invention includes, wherein said at least one preferred conveyance service request is identified in real time or near real time, from all or some of said plurality of filtered conveyance service requests on said at least one application by:
  a) transmitting in real time or near real time, all or some of said plurality of filtered conveyance service requests from said at least one central server to said at least one application by way of at least one link between said at least one central server and said at least one application; and
  b) identifying in real time or near real time, said at least one preferred conveyance service request from all or some of said plurality of filtered conveyance service requests relating to said at least one selected preference.

An additional embodiment of the present invention includes The method of claim 107, wherein said at least one preferred conveyance service request is identified in real time or near real time, from all or some of said plurality of filtered conveyance service requests on at least one owner or controller application by:
  a) transmitting in real time or near real time, all or some of said plurality of filtered conveyance service requests from said at least one central server to said at least one owner or controller application by way of at least one link between said at least one central server and said at least one owner or controller application; and
  b) identifying in real time or near real time, said at least one preferred conveyance service request from all or some of said plurality of filtered conveyance service requests relating to said at least one selected preference.

E. Securing or Obtaining at Least One Preferred Conveyance Service Request

An embodiment of the present invention includes, wherein said at least one application or at least one owner or controller application secures or obtains said at least one preferred conveyance service request.

Another embodiment of the present invention includes, wherein said at least one owner or said at least one controller of said at least one autonomous vehicle uses at least one owner or controller application, said at least one application, or a combination thereof, to analyze or evaluate and then secure or obtain said at least one preferred conveyance service request.

A further embodiment of the present invention includes, wherein said at least one preferred conveyance service request in conjunction with corresponding conveyance data is transmitted to said at least one owner or controller application or said at least one application and is displayed, includes at least one pop-up, at least one icon, at least one visual, at least one symbol, at least one pattern, at least one marker, at least one notification, at least one alert, at least one message, at least one short message service, at least one multimedia messaging service, at least one smart messaging service, at least one extended message service, or a combination thereof.

An additional embodiment of the present invention includes, wherein said at least one owner or said at least one controller of said at least one autonomous vehicle accepts or declines said at least one preferred conveyance service request.

Another embodiment of the present invention includes, wherein said at least one owner or said at least one controller of said at least one autonomous vehicle declines said at least one preferred conveyance service request and at least one new or different preferred conveyance service request is identified and displayed.

A further embodiment of the present invention includes, wherein more than one said preferred conveyance service requests are secured or obtained concurrently for said at least one autonomous vehicle.

F. Additional Embodiments

An embodiment of the present invention includes, wherein at least one function of said at least one central server is performed by said at least one application, at least one owner or controller application, or a combination thereof.

Another embodiment of the present invention includes, wherein said at least one application, at least one owner or controller application, or a combination thereof, operates on said at least one central server.

A further embodiment of the present invention includes, wherein at least one function of said at least one application, at least one owner or controller application, or a combination thereof, is performed by said at least one central server.

An additional embodiment of the present invention includes, wherein all or some of said plurality of conveyance service requests in conjunction with corresponding conveyance data are sourced or provided by at least one service provider operating in at least one conveyance industry segment.

An embodiment of the present invention includes, wherein said at least one subsequent or additional preferred conveyance service request is secured or obtained in at least one different conveyance industry segment for said at least one autonomous vehicle.

Another embodiment of the present invention includes, wherein said at least one preferred conveyance service request in conjunction with corresponding conveyance data, all or some of said plurality of filtered conveyance service requests in conjunction with corresponding conveyance data, or a combination thereof, is identified or updated in real time or near real time as said at least one real time or near real time geographical location of said at least one autonomous vehicle updates or changes or as traffic information updates or changes.

An additional embodiment of the present invention includes, wherein said plurality of conveyance service requests is a single conveyance service request.

An embodiment of the present invention includes, wherein said plurality of filtered conveyance service requests is a single filtered conveyance service request.

Another embodiment of the present invention includes, wherein said at least one owner or said at least one controller of said at least one autonomous vehicle secures or obtains at least one said filtered conveyance service request other than said at least one preferred conveyance service request.

A further embodiment of the present invention includes, wherein said at least one owner or said at least one controller of said at least one autonomous vehicle is at least one service provider operating in at least one conveyance industry segment.

An additional embodiment of the present invention includes, wherein said at least one subsequent or additional preferred conveyance service request is secured or obtained and at least one order to perform said at least one conveyance service is updated or changed.

An embodiment of the present invention includes, wherein said at least one central server, said at least one application, at least one owner or controller application, or a combination thereof, proposes or recommends at least one different conveyance service request other than said at least one preferred conveyance service request.

IX. Detailed Description of Sections I Through VIII

The following detailed description of invention, which includes in part, a system and method for securing or obtaining at least one preferred conveyance service request within the conveyance industry. The system includes but is not limited to the following hardware, software, parties, automated platforms, and some information involved in securing or obtaining at least one preferred conveyance service request within the conveyance industry.

Near Real Time

Near real time can for example pertain to a delay introduced, by automated data processing, between at least one occurrence of at least one event and at least one use of the processed data. Near real time can refer to the timeliness of data or information, which can be delayed by the time required for electronic communication and automatic data processing. Near real time can imply no significant delays. Near real time can refer to the highest level of development or state of the art.

As a non-limiting example, near real time can be in or similar to real time. As a non-limiting example, near real time can depict at least one event or at least one situation as it existed at the current time less the processing time. As a non-limiting example, at least one function of at least one system, at least one method, or a combination thereof, can be performed in real time or near real time.

Conveyance Client

At least one conveyance client can be but is not limited to at least one person, at least one entity, at least one robot, at least one machine, or a combination thereof, that can for example receive at least one conveyance service. At least one conveyance client does not have to be at least one consumer of at least one conveyance service. At least one conveyance client can perform at least one function in real time or near real time being updated or refreshed in the highest level of development or state of the art.

At least one conveyance client can, for example, input or generate at least one conveyance service request, which can become at least one filtered conveyance service request and/or at least one preferred conveyance service request for including but not limited to at least one representative, at least one autonomous vehicle, at least one owner or at least one controller of at least one autonomous vehicle, at least one service provider, at least one good supplier, or a combination thereof.

As a non-limiting example, at least one conveyance client can be at least one passenger in the ride-hail industry segment. As a non-limiting example, at least one conveyance client can be at least one consumer of at least one good in the food delivery industry segment. As a non-limiting example, at least one conveyance client can be at least one consumer of freight in the freight delivery industry segment.

Service Provider

At least one service provider can be for example at least one entity or at least one business that can retain or contract with including but not limited to at least one representative, at least one autonomous vehicle, at least one owner or at least one controller of at least one autonomous vehicle, at least one good supplier, or a combination thereof, to provide at least one conveyance service. At least one service provider can facilitate at least one conveyance service between including but not limited to at least one representative, at least one autonomous vehicle, at least one owner or at least one controller of at least one autonomous vehicle, at least one good supplier, at least one conveyance client, or a combination thereof. At least one service provider, via at least one external server, can be at least one source or at least one provider of at least one conveyance service request with corresponding conveyance data relating to at least one conveyance industry segment. At least one service provider can use including but not limited to at least one central server, at least one external server, at least one application, at least one owner or controller application, or a combination thereof, to facilitate at least one conveyance service.

At least one service provider can operate in at least one conveyance industry segment. At least one service provider can independently control or operate including but not limited to at least one conveyance network of at least one representative, at least one autonomous vehicle, at least one good supplier, at least one conveyance client, or a combination thereof. At least one service provider can optionally be perceived or referred to as at least one owner or at least one controller of at least one autonomous vehicle. At least one service provider can utilize Information Technology infrastructure relating to including but not limited to at least one service provider, at least one good supplier, or a combination thereof. At least one service provider can perform at least one function in real time or near real time being updated or refreshed in the highest level of development or state of the art.

As a non-limiting example, at least one service provider can be but is not limited to at least one rideshare service controller, at least one ride-hail service controller, at least one car-share service controller, at least one taxi service controller, at least one shuttle service controller, at least one person delivery service controller, at least one food delivery service controller, at least one good delivery service controller, at least one animal delivery service controller, at least one medical service and delivery controller, at least one courier service controller, at least one item delivery service controller, at least one freight delivery service controller, at least one peer-to-peer conveyance service controller, at least one delivery service controller, or a combination thereof.

As a non-limiting example, at least one service provider can be perceived or referred to as at least one representative when utilizing at least one autonomous vehicle. As a non-limiting example, at least one service provider can be perceived or referred to as at least one autonomous vehicle, at least one representative, at least one good supplier, at least one owner or at least one controller of at least one autonomous vehicle, or a combination thereof.

As a non-limiting example, at least one service provider can operate in at least one individual conveyance industry segment. As a non-limiting example, at least one service provider can be at least one source or at least one provider of at least one conveyance service request.

Good Supplier

At least one good supplier can be for example at least one entity or at least one business that can provide or supply including but not limited to at least one good, at least one article, at least one thing, at least one item, or a combination thereof, to be conveyed in at least one conveyance service.

At least one good supplier can utilize Information Technology infrastructure relating to including but not limited to at least one good supplier, at least one service provider, or a combination thereof. At least one good supplier can operate in at least one conveyance industry segment. At least one good supplier can operate for at least one service provider. At least one good supplier can perform at least one function in real time or near real time being updated or refreshed in the highest level of development or state of the art. At least one good supplier can accept or decline at least one preferred conveyance service request.

As a non-limiting example, at least one good supplier can be perceived or referred to as at least one service provider. As a non-limiting example, at least one good supplier can optionally retain and/or contract with at least one representative, at least one autonomous vehicle, at least one owner or at least one controller of at least one autonomous vehicle, or a combination thereof. As a non-limiting example, at least one good supplier can be at least one food truck. As a non-limiting example, at least one good supplier can be at least one entity that produces or supplies freight. As a non-limiting example, at least one good supplier can operate in at least one individual conveyance industry segment. As a non-limiting example, at least one good supplier can operate for at least one individual service provider.

As a non-limiting example, at least one good supplier can use, including but not limited to, at least one central server, at least one external server, at least one application, at least one owner or controller application, or a combination thereof, to facilitate at least one conveyance service. As a non-limiting example, at least one good supplier can be at least one source or at least one provider of at least one conveyance service request.

Representative

At least one representative can be but is not limited to at least one person, at least one entity, at least one robot, at least one machine, or the like, that can for example secure or obtain at least one preferred conveyance service request, at least one filtered conveyance service request, at least one conveyance service request, or a combination thereof. At least one representative can provide or perform at least one conveyance service of including but not limited to at least one person, at least one good, at least one article, at least one thing, at least one item, at least one conveyance client, or a combination thereof. At least one representative can be retained by or contracted with at least one service provider, at least one good supplier, or a combination thereof. At least one representative can at any time sign on and/or sign off of including but not limited to at least one service provider network, at least one application, at least one central server, at least one external server, or a combination thereof. At least one representative can sign in to including but not limited to at least one service provider network, at least one central server, at least one external server, or a combination thereof. Once, for example, at least one beginning service geographical location, at least one ending service geographical location, pricing information, or a combination thereof, is known, at least one conveyance service offering relating to at least one representative can be generated.

At least one representative can input or provide at least one representative preference to be used to filter at least one conveyance service request. At least one representative can input or provide at least one representative preference used to identify including but not limited to at least one preferred conveyance service request, at least one filtered conveyance service request, or a combination thereof.

At least one representative can use at least one application to access at least one service provider network via including but not limited to at least one terminal, at least one central server, at least one external server, or a combination thereof, to facilitate at least one conveyance service. At least one representative can provide at least one conveyance service in at least one conveyance industry segment. At least one representative can provide at least one conveyance service for at least one service provider. At least one representative can use Information Technology infrastructure relating to including but not limited to at least one service provider, at least one good supplier, or a combination thereof. At least one representative can perform at least one function in real time or near real time being updated or refreshed in the highest level of development or state of the art.

At least one Representative Automated Platform can secure or obtain at least one preferred conveyance service request for at least one representative. At least one representative can utilize at least one Representative Automated Platform to secure or obtain at least one proposed or recommended conveyance service request other than at least one preferred conveyance service request. At least one representative can accept or decline at least one preferred conveyance service request when using at least one Representative Automated Platform.

As a non-limiting example, at least one representative can secure or obtain at least one filtered conveyance service request other than at least one preferred conveyance service request. As a non-limiting example, at least one representative can accept or decline at least one preferred conveyance service request using at least one application, at least one central server, at least one external server, or a combination thereof. As a non-limiting example, at least one representative can be perceived or referred to as at least one autonomous vehicle, at least one owner or at least one controller of at least one autonomous vehicle, at least one service provider, at least one good supplier, or a combination thereof. As a non-limiting example, at least one representative can use at least one visual representation such as but not limited to at least one dynamic map, at least one heat map, or a combination thereof, to analyze or evaluate where at least one conveyance client or at least one preferred conveyance service request can be geographically located. As a non-limiting example, at least one representative can use at least one autonomous vehicle to perform at least one conveyance service.

As a non-limiting example, in the ride-hail/ride-share industry segment, at least one representative can be at least one driver. As a non-limiting example, in the food delivery industry segment, at least one representative can be at least one driver picking up at least one food item and dropping at least one food item off to at least one conveyance client. As a non-limiting example, in the courier industry segment, at least one representative can be at least one person picking up and dropping off at least one good, at least one thing, at least one article, or a combination thereof. As a non-limiting example, at least one representative can provide at least one conveyance service in at least one individual conveyance industry segment. As a non-limiting example, at least one representative can provide at least one conveyance service for at least one individual service provider.

Autonomous Vehicle

At least one autonomous vehicle can be but is not limited to at least one machine, at least one robot, at least one car, or the like, that can for example perform at least one conveyance service. At least one autonomous vehicle can be for example at least one self-governing machine, at least one self-maneuvering machine, at least one self-driving machine, or the like, that can be used to convey including but not limited to at least one person, at least one good, at least one thing, at least one article, at least one item, at least one conveyance client, or a combination thereof, from at least one geographical location to at least one other geographical location. At least one autonomous vehicle can sign in to including but not limited to at least one service provider network, at least one central server, at least one external server, or a combination thereof. Once at least one beginning service geographical location, at least one ending service geographical location, pricing information, or a combination thereof, is known, at least one conveyance service offering relating to at least one autonomous vehicle can be generated. At least one autonomous vehicle can provide or perform at least one conveyance service for at least one conveyance client.

At least one autonomous vehicle can be accessed, utilized, controlled, or operated remotely by including but not limited to at least one service provider using at least one central server, at least one application, at least one owner or controller application, or a combination thereof, by at least one link. At least one application or at least one owner or controller application can operate on or control at least one terminal that can be associated with at least one autonomous vehicle and can interface with at least one autonomous vehicle function. At least one autonomous vehicle can utilize machine learning technology or the like to analyze or evaluate and then secure or obtain at least one preferred conveyance service request or propose or recommend at least one different conveyance service request other than at least one preferred conveyance service request. At least one autonomous vehicle can include hardware and/or software alone or in a combination.

At least one selected preference can be used to secure or obtain including but not limited to at least one preferred conveyance service request, at least one filtered conveyance service request, or a combination thereof, for at least one autonomous vehicle. At least one autonomous vehicle can provide at least one conveyance service in at least one conveyance industry segment. At least one autonomous vehicle can provide at least one conveyance service relating to at least one service provider. At least one autonomous vehicle can perform at least one function in real time or near real time being updated or refreshed in the highest level of development or state of the art.

At least one Autonomous Vehicle Automated Platform can secure or obtain at least one preferred conveyance service request for at least one autonomous vehicle. At least one autonomous vehicle can utilize at least one Autonomous Vehicle Automated Platform to secure or obtain at least one proposed or recommended conveyance service request other than at least one preferred conveyance service request.

As a non-limiting example, at least one autonomous vehicle can be but is not limited to at least one car, at least one automobile, at least one van, at least one truck, at least one semi-trailer truck, at least one shuttle, at least one helicopter, at least one boat, at least one vessel, at least one aircraft, at least one spacecraft, at least one bus, at least one train, at least one wagon, at least one all-terrain vehicle, at least one eighteen wheeler, at least one transportation machine, at least one drone, at least one medical vehicle, or a combination thereof.

As a non-limiting example, at least one autonomous vehicle can be at least one machine, at least one robot, at least one car, or the like, that can perform at least one conveyance service without the aid of at least one human driver. As a non-limiting example, at least one autonomous vehicle can secure or obtain at least one filtered conveyance service request other than at least one preferred conveyance service request. As a non-limiting example, at least one autonomous vehicle can be owned or controlled by at least one service provider, at least one entity, at least one business, at least one individual, or a combination thereof.

As a non-limiting example, at least one terminal associated with at least one autonomous vehicle can be accessed, utilized, controlled, or operated by at least one application or at least one owner or controller application through at least one In-Vehicle infotainment, at least one interface, at least one touchscreen, at least one keypad, or a combination thereof. As a non-limiting example, at least one terminal associated with at least one autonomous vehicle can have at least one input source such as but not limited to at least one touchscreen, at least one keypad, or a combination thereof.

As a non-limiting example, at least one autonomous vehicle can be perceived or referred to as at least one representative, at least one service provider, at least one good supplier, at least one owner or at least one controller of at least one autonomous vehicle, or a combination thereof. As a non-limiting example, at least one autonomous vehicle can accept or decline at least one preferred conveyance service request using at least one application, at least one central server, at least one external server, or a combination thereof.

As a non-limiting example, at least one autonomous vehicle can be used to convey freight from at least one geographical location to at least one other geographical location. As a non-limiting example, at least one autonomous vehicle can perform at least one conveyance service while at least one owner or at least one controller of at least one autonomous vehicle is at work. As a non-limiting example, at least one autonomous vehicle can be used for at least one medical service and delivery. As a non-limiting example, at least one autonomous vehicle can provide at least one conveyance service in at least one individual conveyance industry segment. As a non-limiting example, at least one autonomous vehicle can provide at least one conveyance service relating to at least one individual service provider.

Owner or Controller of an Autonomous Vehicle

At least one owner or at least one controller of at least one autonomous vehicle can be but is not limited to at least one person, at least one entity, at least one robot, at least one machine, or a combination thereof, that can for example own or control at least one autonomous vehicle used to provide at least one conveyance service for at least one conveyance client. At least one owner or at least one controller of at least one autonomous vehicle can analyze or evaluate and then secure or obtain at least one preferred conveyance service request for at least one autonomous vehicle.

At least one owner or at least one controller of at least one autonomous vehicle can input or provide at least one selected preference to be used to filter at least one conveyance service request for at least one autonomous vehicle. At least one owner or at least one controller of at least one autonomous vehicle can input or provide at least one selected preference used to identify including but not limited to at least one preferred conveyance service request, at least one filtered conveyance service request, or a combination thereof.

At least one owner or at least one controller of at least one autonomous vehicle can use including but not limited to at least one application or at least one owner or controller application to access at least one service provider network via at least one terminal, at least one central server, at least one external server, or a combination thereof, to facilitate at least one conveyance service. At least one owner or at least one controller of at least one autonomous vehicle can use including but not limited to at least one application or at least one owner or controller application to analyze or evaluate and then secure or obtain at least one preferred conveyance service request.

At least one owner or at least one controller of at least one autonomous vehicle can at any time sign on and/or sign off of including but not limited to at least one service provider network, at least one central server, at least one external server, or a combination thereof. At least one owner or at least one controller of at least one autonomous vehicle can use Information Technology infrastructure relating to including but not limited to at least one service provider, at least one good supplier, or a combination thereof. At least one owner or at least one controller of at least one autonomous vehicle can optionally be perceived or referred to as at least one service provider. At least one owner or at least one controller of at least one autonomous vehicle can work for or be associated with at least one service provider. At least one owner or at least one controller of at least one autonomous vehicle can control or operate at least one autonomous vehicle in at least one conveyance industry segment. At least one owner or at least one controller of at least one autonomous vehicle can control or operate at least one autonomous vehicle relating to at least one service provider. At least one owner or at least one controller of at least one autonomous vehicle can perform at least one function in real time or near real time being updated or refreshed in the highest level of development or state of the art.

At least one Autonomous Vehicle Automated Platform can secure or obtain at least one preferred conveyance service request for at least one owner or at least one controller of at least one autonomous vehicle. At least one owner or at least one controller of at least one autonomous vehicle can utilize at least one Autonomous Vehicle Automated Platform to secure or obtain at least one proposed or recommended different conveyance service request other than at least one preferred conveyance service request. At least one owner or at least one controller of at least one autonomous vehicle can accept or decline at least one preferred conveyance service request when using at least one Autonomous Vehicle Automated Platform.

As a non-limiting example, at least one owner or at least one controller of at least one autonomous vehicle can secure or obtain at least one filtered conveyance service request other than at least one preferred conveyance service request. As a non-limiting example, at least one owner or at least one controller of at least one autonomous vehicle can accept or decline at least one preferred conveyance service request using at least one owner or controller application, at least one application, at least one central server, at least one external server, or a combination thereof.

As a non-limiting example, at least one owner or at least one controller of at least one autonomous vehicle can be at least one private owner or at least one private controller of at least one autonomous vehicle. As a non-limiting example, at least one owner or at least one controller of at least one autonomous vehicle can be perceived or referred to as at least one representative, at least one autonomous vehicle, at least one service provider, at least one good supplier, or a combination thereof. As a non-limiting example, at least one owner or at least one controller of at least one autonomous vehicle can be at least one lessee of at least one autonomous vehicle. As a non-limiting example, at least one owner or at least one controller of at least one autonomous vehicle can control or operate at least one autonomous vehicle in at least one individual conveyance industry segment. As a non-limiting example, at least one owner or at least one controller of at least one autonomous vehicle can control or operate at least one autonomous vehicle relating to at least one individual service provider.

Representative Automated Platform

At least one Representative Automated Platform, automated in whole or in part, can for example analyze or evaluate at least one conveyance service request relating to at least one representative preference and preferably at least one real time or near real time geographical location of at least one representative to secure or obtain at least one preferred conveyance service request for at least one representative. Any at least one conveyance service request secured, obtained, or identified by at least one Representative Automated Platform can be perceived or referred to as at least one preferred conveyance service request. At least one Representative Automated Platform can be at least one computer program product. At least one Representative Automated Platform can be used by including but not limited to at least one representative, at least one service supplier, at least one good supplier, at least one owner or at least one controller of at least one autonomous vehicle, or a combination thereof.

At least one preferred conveyance service request can be secured or obtained and can be displayed to at least one representative. At least one Representative Automated Platform can secure or obtain at least one subsequent or additional preferred conveyance service request after at least one first preferred conveyance service request is secured or obtained.

At least one Representative Automated Platform, when automated in part, can allow at least one representative to use including but not limited to at least one application or at least one central server to analyze or evaluate and then secure or obtain at least one preferred conveyance service request. At least one preferred conveyance service request in conjunction with corresponding conveyance data, at least one filtered conveyance service request in conjunction with corresponding conveyance data, or a combination thereof, can be transmitted from at least one central server to at least one application and displayed as but not limited to at least one pop-up, at least one icon, at least one visual, at least one symbol, at least one pattern, at least one marker, at least one notification, at least one alert, at least one message, at least one short message service, at least one multimedia messaging service, at least one smart messaging service, or at least one extended message service. At least one representative can accept or decline including but not limited to at least one preferred conveyance service request, at least one filtered conveyance service request, or a combination thereof, that can be displayed on at least one application. If at least one representative declines at least one preferred conveyance service request or at least one filtered conveyance service request, at least one new or different preferred conveyance service request or at least one new or different filtered conveyance service request can be identified by at least one Representative Automated Platform and displayed.

At least one Representative Automated Platform can secure or obtain at least one preferred conveyance service request provided or sourced by including but not limited to at least one service provider, at least one external server, at least one central server, or a combination thereof. At least one Representative Automated Platform can secure or obtain at least one preferred conveyance service request in at least one conveyance industry segment. At least one Representative Automated Platform can secure or obtain, for at least one representative, at least one subsequent or additional preferred conveyance service request in at least one different conveyance industry segment. At least one Representative Automated Platform can secure or obtain at least one preferred conveyance service request relating to at least one service provider.

At least one Representative Automated Platform can update at least one preferred conveyance service request, at least one filtered conveyance service request, at least one conveyance service request, or a combination thereof, in real time or near real time as at least one real time or near real time geographical location of at least one representative changes or updates. At least one Representative Automated Platform can identify and preferably secure or obtain at least one new or different preferred conveyance service request as at least one real time or near real time geographical location of at least one representative updates or changes. At least one Representative Automated Platform can update at least one preferred conveyance service request, at least one filtered conveyance service request, at least one conveyance service request, or a combination thereof, as traffic information updates.

At least one Representative Automated Platform can be updated or refreshed in real time or near real time and can refer to being updated or refreshed in the highest level of development or state of the art. At least one Representative Automated Platform can perform at least one function in real time or near real time and can refer to being updated or refreshed in the highest level of development or state of the art.

At least one Representative Automated Platform can repeatedly or continuously analyze or evaluate at least one conveyance service request in real time or near real time and preferably secure or obtain at least one subsequent or additional preferred conveyance service request while at least one representative performs at least one conveyance service and at least one real time or near real time geographical location of at least one representative updates or changes. At least one Representative Automated Platform can update or notify at least one representative while performing at least one conveyance service of including but not limited to at least one direction, at least one route, at least one conveyance client, at least one conveyance service request, at least one filtered conveyance service request, at least one preferred conveyance service request, at least one beginning service geographical location, at least one ending service geographical location, traffic information, or a combination thereof. At least one Representative Automated Platform can update or change at least one order of which at least one conveyance service is to be performed by repeatedly or continuously analyzing or evaluating in real time or near real time, including but not limited to, at least one conveyance service request, at least one filtered conveyance service request, at least one preferred conveyance service request, at least one real time or near real time geographical location of at least one representative, at least one representative preference, or a combination thereof. At least one Representative Automated Platform can unsecure or cancel at least one secured or obtained preferred conveyance service request or at least one secured or obtained filtered conveyance service request.

At least one Representative Automated Platform can use machine learning technology or the like to propose or recommend and optionally secure or obtain at least one preferred conveyance service request, at least one filtered conveyance service request, at least one conveyance service request, or a combination thereof. At least one Representative Automated Platform can propose or recommend at least one different conveyance service request other than at least one preferred conveyance service request based on including but not limited to at least one historical conveyance service, at least one historical pattern, at least one trend of at least one representative, the current real time or near real time environment, at least one real time or near real time geographical location of at least one representative, at least one representative preference, at least one different representative preference, at least one different combination of at least one representative preference, or a combination thereof. At least one representative can rank at least one representative preference for at least one Representative Automated Platform to make at least one proposal or recommendation. At least one Representative Automated Platform can propose, recommend, or notify at least one representative of at least one alternative or at least one different conveyance service request in addition to or replacement of at least one preferred conveyance service request. At least one proposal or recommendation of at least one different conveyance service request can assist at least one representative perform at least one additional conveyance service request. Any proposed or recommended at least one conveyance service request by at least one Representative Automated Platform that is secured or obtained can be identified as at least one preferred conveyance service request.

As a non-limiting example, at least one preferred conveyance service request, at least one filtered conveyance service request, or at least one conveyance service request can be secured or obtained without any interaction with at least one representative. As a non-limiting example, at least one Representative Automated Platform can secure or obtain at least one preferred conveyance service request in at least one individual conveyance industry segment. As a non-limiting example, at least one Representative Automated Platform can secure or obtain at least one preferred conveyance service request relating to at least one individual service provider.

As a non-limiting example, at least one Representative Automated Platform can secure or obtain at least one filtered conveyance service request or at least one conveyance service request other than at least one preferred conveyance service request. As a non-limiting example, at least one Representative Automated Platform can update or notify at least one representative of at least one preferred conveyance service request identified by at least one central server, at least one application, or a combination thereof, that can be accepted or declined by at least one representative. As a non-limiting example, at least one different conveyance service request can be accepted or selected by at least one representative other than at least one preferred conveyance service request identified by at least one Representative Automated Platform.

As a non-limiting example, at least one secured or obtained conveyance service can be performed at the same time or during the same or similar trip. As a non-limiting example, at least one Representative Automated Platform can create and/or optimize at least one route of at least one preferred conveyance service request based on including but not limited to at least one representative preference, at least one real time or near real time geographical location of at least one representative, or a combination thereof. As a non-limiting example, at least one Representative Automated Platform can show at least one preferred conveyance service request on at least one visual representation, at least one application, at least one central server, or a combination thereof.

As a non-limiting example, at least one Representative Automated Platform can unsecure or cancel at least one secured or obtained preferred conveyance service request or at least one secured or obtained filtered conveyance service request if at least one better preferred conveyance service request or at least one better filtered conveyance service request becomes available such as but not limited to in real time or near real time.

As a non-limiting example, at least one Representative Automated Platform can propose or recommend at least one different conveyance service request in at least one other geographical location or at least one other area based on at least one historical conveyance service. As a non-limiting example, at least one Representative Automated Platform can propose or recommend at least one preferred conveyance service request, at least one filtered conveyance service request, at least one conveyance service request, or a combination thereof, based on elevated pricing when at least one representative has chosen at least one specific conveyance industry segment preference and at least one level of service preference as at least one representative preference and at least one pricing preference not being at least one representative preference. As a non-limiting example, at least one application can propose or recommend at least one different conveyance service request other than at least one preferred conveyance service request.

As a non-limiting example, at least one Representative Automated Platform can automatically secure or obtain at least one preferred conveyance service request after at least one pop-up or at least one notification has had a given amount of time elapse. As a non-limiting example, at least one representative can accept or decline at least one preferred conveyance service request identified by at least one Representative Automated Platform by swiping or using at least one other gesture on at least one application. As a non-limiting example, at least one Representative Automated Platform can utilize at least one neural network. As a non-limiting example, at least one Representative Automated Platform can utilize quantum computing. As a non-limiting example, at least one Representative Automated Platform can display at least one preferred conveyance service request or at least one filtered conveyance service request and at least one representative can secure or obtain at least one preferred conveyance service request or at least one filtered conveyance service request. As a non-limiting example, more than one preferred conveyance service request can be secured or obtained concurrently for at least one representative.

Autonomous Vehicle Automated Platform

At least one Autonomous Vehicle Automated Platform, automated in whole or in part, can for example analyze or evaluate at least one conveyance service request relating to at least one selected preference and preferably at least one real time or near real time geographical location of at least one autonomous vehicle to secure or obtain at least one preferred conveyance service request for at least one autonomous vehicle. Any at least one conveyance service request secured, obtained, or identified by at least one Autonomous Vehicle Automated Platform can be perceived or referred to as at least one preferred conveyance service request. At least one Autonomous Vehicle Automated Platform can be at least one computer program product. At least one Autonomous Vehicle Automated Platform can be used by including but not limited to at least one owner or at least one controller of at least one autonomous vehicle, at least one autonomous vehicle, at least one service provider, at least one good supplier, or a combination thereof.

At least one preferred conveyance service request can be secured or obtained for at least one autonomous vehicle. At least one Autonomous Vehicle Automated Platform can secure or obtain at least one subsequent or additional preferred conveyance service request after at least one first preferred conveyance service request is secured or obtained.

At least one Autonomous Vehicle Automated Platform, when automated in part, can allow at least one owner or at least one controller of at least one autonomous vehicle or at least one service provider to use including but not limited to at least one application, at least one owner or controller application, at least one central server, or a combination thereof, to analyze or evaluate and then secure or obtain at least one preferred conveyance service request. At least one preferred conveyance service request in conjunction with corresponding conveyance data, at least one filtered conveyance service request in conjunction with corresponding conveyance data, or a combination thereof, can be transmitted from at least one central server to at least one application or at least one owner or controller application and displayed as but not limited to at least one pop-up, at least one icon, at least one visual, at least one symbol, at least one pattern, at least one marker, at least one notification, at least one alert, at least one message, at least one short message service, at least one multimedia messaging service, at least one smart messaging service, or at least one extended message service. At least one owner or at least one controller of at least one autonomous vehicle or at least one service provider can accept or decline including but not limited to at least one preferred conveyance service request, at least one filtered conveyance service request, or a combination thereof, that can be displayed on at least one application or at least one owner or controller application. If at least one owner or at least one controller of at least one autonomous vehicle or at least one service provider declines at least one preferred conveyance service request or at least one filtered conveyance service request, at least one new or different preferred conveyance service request or at least one new or different filtered conveyance service request can be identified by at least one Autonomous Vehicle Automated Platform and displayed.

At least one Autonomous Vehicle Automated Platform can secure or obtain at least one preferred conveyance service request provided or sourced by including but not limited to at least one service provider, at least one external server, at least one central server, or a combination thereof. At least one Autonomous Vehicle Automated Platform can secure or obtain at least one preferred conveyance service request in at least one conveyance industry segment. At least one Autonomous Vehicle Automated Platform can secure or obtain, for at least one autonomous vehicle, at least one subsequent or additional preferred conveyance service request in at least one different conveyance industry segment. At least one Autonomous Vehicle Automated Platform can secure or obtain at least one preferred conveyance service request relating to at least one service provider.

At least one Autonomous Vehicle Automated Platform can operate or control at least one fleet of at least one autonomous vehicle for at least one service provider or at least one owner or at least one controller of at least one autonomous vehicle. At least one Autonomous Vehicle Automated Platform can update at least one preferred conveyance service request, at least one filtered conveyance service request, at least one conveyance service request, or a combination thereof, in real time or near real time as at least one real time or near real time geographical location of at least one autonomous vehicle changes or updates. At least one Autonomous Vehicle Automated Platform can identify and preferably secure or obtain at least one new or different preferred conveyance service request as at least one real time or near real time geographical location of at least one autonomous vehicle updates or changes. At least one Autonomous Vehicle Automated. Platform can update at least one preferred conveyance service request, at least one filtered conveyance service request, at least one conveyance service request, or a combination thereof, as traffic information updates.

At least one Autonomous Vehicle Automated Platform can be updated or refreshed in real time or near real time and can refer to being updated or refreshed in the highest level of development or state of the art. At least one Autonomous Vehicle Automated Platform can perform at least one function in real time or near real time and can refer to being updated or refreshed in the highest level of development or state of the art.

At least one Autonomous Vehicle Automated Platform can repeatedly or continuously analyze or evaluate at least one conveyance service request in real time or near real time and preferably secure or obtain at least one subsequent or additional preferred conveyance service request while at least one autonomous vehicle performs at least one conveyance service and at least one real time or near real time geographical location of at least one autonomous vehicle updates or changes. At least one Autonomous Vehicle Automated Platform can update or notify at least one autonomous vehicle or at least one owner or at least one controller of at least one autonomous vehicle while performing at least one conveyance service of including but not limited to at least one direction, at least one route, at least one conveyance client, at least one conveyance service request, at least one filtered conveyance service request, at least one preferred conveyance service request, at least one beginning service geographical location, at least one ending service geographical location, traffic information, or a combination thereof. At least one Autonomous Vehicle Automated Platform can update or change at least one order of which at least one conveyance service is to be performed by repeatedly or continuously analyzing or evaluating, in real time or near real time, including but not limited to, at least one conveyance service request, at least one filtered conveyance service request, at least one preferred conveyance service request, at least one real time or near real time geographical location of at least one autonomous vehicle, at least one selected preference, or a combination thereof. At least one Autonomous Vehicle Automated Platform can unsecure or cancel at least one secured or obtained preferred conveyance service request or at least one secured or obtained filtered conveyance service request.

At least one Autonomous Vehicle Automated Platform can use machine learning technology or the like to propose or recommend and optionally secure or obtain at least one preferred conveyance service request, at least one filtered conveyance service request, at least one conveyance service request, or a combination thereof. At least one Autonomous Vehicle Automated Platform can propose or recommend at least one different conveyance service request other than at least one preferred conveyance service request based on including but not limited to at least one historical conveyance service, at least one historical pattern, at least one trend of at least one autonomous vehicle, the current real time or near real time environment, at least one real time or near real time geographical location of at least one autonomous vehicle, at least one selected preference, at least one different selected preference, at least one different combination of at least one selected preference, or a combination thereof. At least one owner or at least one controller of at least one autonomous vehicle or at least one service provider can rank at least one selected preference for at least one Autonomous Vehicle Automated Platform to make at least one proposal or recommendation. At least one Autonomous Vehicle Automated Platform can propose, recommend, or notify at least one autonomous vehicle, at least one owner or at least one controller of at least one autonomous vehicle, at least one service provider, or a combination thereof, of at least one alternative or at least one different conveyance service request in addition to or replacement of at least one preferred conveyance service request. At least one proposal or recommendation of at least one different conveyance service request can assist at least one owner or at least one controller of at least one autonomous vehicle, at least one autonomous vehicle, at least one service provider, or a combination thereof, perform at least one additional conveyance service request. Any proposed or recommended at least one conveyance service request by at least one Autonomous Vehicle Automated Platform that is secured or obtained can be identified as at least one preferred conveyance service request.

As a non-limiting example, at least one preferred conveyance service request, at least one filtered conveyance service request, or at least one conveyance service request can be secured or obtained without any interaction by at least one owner or at least one controller of at least one autonomous vehicle. As a non-limiting example, at least one Autonomous Vehicle Automated Platform can secure or obtain at least one preferred conveyance service request in at least one individual conveyance industry segment. As a non-limiting example, at least one Autonomous Vehicle Automated Platform can secure or obtain at least one preferred conveyance service request relating to at least one individual service provider.

As a non-limiting example, at least one Autonomous Vehicle Automated Platform can secure or obtain at least one filtered conveyance service request or at least one conveyance service request other than at least one preferred conveyance service request. As a non-limiting example, at least one Autonomous Vehicle Automated Platform can update or notify at least one owner or at least one controller of at least one autonomous vehicle or at least one service provider of at least one preferred conveyance service request identified by at least one central server, at least one application, at least one owner or controller application, or a combination thereof, that can be accepted or declined by at least one owner or at least one controller of at least one autonomous vehicle or at least one service provider. As a non-limiting example, at least one different conveyance service request can be accepted or selected by at least one owner or at least one controller of at least one autonomous vehicle or at least one service provider other than at least one preferred conveyance service request identified by at least one Autonomous Vehicle Automated Platform.

As a non-limiting example, at least one secured or obtained conveyance service can be performed at the same time or during the same or similar trip. As a non-limiting example, at least one Autonomous Vehicle Automated Platform can create and/or optimize at least one route of at least one preferred conveyance service request based on including but not limited to at least one selected preference, at least one real time or near real time geographical location of at least one autonomous vehicle, or a combination thereof. As a non-limiting example, at least one Autonomous Vehicle Automated Platform can show at least one preferred conveyance service request on at least one owner or controller application, at least one application, at least one central server, at least one visual representation, or a combination thereof.

As a non-limiting example, at least one Autonomous Vehicle Automated Platform can unsecure or cancel at least one secured or obtained preferred conveyance service request or at least one secured or obtained filtered conveyance service request if at least one better preferred conveyance service request or at least one better filtered conveyance service request becomes available such as but not limited to in real time or near real time.

As a non-limiting example, at least one Autonomous Vehicle Automated Platform can propose or recommend at least one different conveyance service request in at least one other geographical location or at least one other area based on at least one historical conveyance service. As a non-limiting example, at least one Autonomous Vehicle Automated Platform can propose or recommend at least one preferred conveyance service request, at least one filtered conveyance service request, at least one conveyance service request, or a combination thereof, based on high conveyance service request density when at least one owner or at least one controller of at least one autonomous vehicle has chosen at least one specific conveyance industry segment preference and at least one level of service preference as at least one selected preference. As a non-limiting example, at least one application, at least one owner or controller application, or a combination thereof, can propose or recommend at least one different conveyance service request other than at least one preferred conveyance service request. As a non-limiting example, at least one Autonomous Vehicle Automated Platform, automated in whole or in part, can be used as at least one tool to help at least one service provider integrate at least one autonomous vehicle to at least one conveyance industry segment.

As a non-limiting example, at least one Autonomous Vehicle Automated Platform can automatically secure or obtain at least one preferred conveyance service request after at least one pop-up or at least one notification has had a given amount of time elapse. As a non-limiting example, at least one owner or at least one controller of at least one autonomous vehicle can accept or decline at least one preferred conveyance service request identified by at least one Autonomous Vehicle Automated Platform by swiping or using at least one other gesture on at least one owner or controller application or at least one application. As a non-limiting example, at least one Autonomous Vehicle Automated Platform can utilize at least one neural network. As a non-limiting example, at least one Autonomous Vehicle Automated Platform can utilize quantum computing. As a non-limiting example, more than one preferred conveyance service request can be secured or obtained concurrently for at least one autonomous vehicle.

Visual Representation

At least one visual representation can be at least one tool used to assist at least one representative analyze or evaluate at least one conveyance service request or at least one conveyance service request metric on, for example, at least one geographical map to secure or obtain at least one preferred conveyance service request. At least one visual representation can be viewed from including but not limited to at least one perspective, at least one point of reference, at least one point of interest, or a combination thereof.

At least one visual representation can be, for example, at least one geographical map that can display including but not limited to at least one preferred conveyance service request in conjunction with corresponding conveyance data, at least one filtered conveyance service request in conjunction with corresponding conveyance data, at least one conveyance service request in conjunction with corresponding conveyance data, at least one metric relating to at least one respective request, at least one real time or near real time geographical location of at least one representative, at least one real time or near real time geographical location of at least one autonomous vehicle, at least one real time or near real time geographical location of at least one owner or at least one controller of at least one autonomous vehicle, at least one real time or near real time geographical location of at least one service provider, at least one real time or near real time geographical location of at least one good supplier, at least one real time or near real time geographical location of at least one conveyance client, or a combination thereof.

At least one visual representation can be displayed on including but not limited to at least one application, at least one central server, at least one remote display, or a combination thereof. At least one visual representation can be in any form or format, preferably visual. At least one variation in the form, format, and order of at least one visual representation component is within the scope of the present invention. At least one visual representation can be updated or refreshed in real time or near real time and can refer to being updated or refreshed in the highest level of development or state of the art. At least one visual representation can perform at least one function in real time or near real time and can refer to being updated or refreshed in the highest level of development or state of the art.

At least one visual representation can display including but not limited to at least one conveyance service request, at least one conveyance service request metric, or a combination thereof, in at least one conveyance industry segment on at least one geographical map. At least one visual representation can be at least one tool that can display including but not limited to at least one conveyance service request, at least one conveyance service request metric, or a combination thereof, relating to at least one service provider on at least one geographical map. At least one visual representation can display at least one route from at least one representative or at least one autonomous vehicle to at least one beginning service geographical location and then to at least one ending service geographical location.

As a non-limiting example, at least one visual representation can be including but not limited to at least one dynamic map, at least one real time or near real time heat map, at least one historical heat map, at least one predictive heat map, or a combination thereof. As a non-limiting example, at least one visual representation can be compiled on at least one third party server such as but not limited to at least one map provider server. As a non-limiting example, at least one representative can use at least one visual representation to analyze or evaluate pricing information or at least one other metric from at least one service provider. As a non-limiting example, at least one visual representation can be used to analyze or evaluate at least one area on at least one geographical map that can show at least one metric relating to at least one individual conveyance industry segment. As a non-limiting example, at least one visual representation can be used to analyze or evaluate at least one area on at least one geographical map that can show at least one metric relating to at least one individual service provider.

Application

At least one application can be but is not limited to software that can for example facilitate analyzing, evaluating, securing, obtaining, accepting, declining, displaying, communicating, or a combination thereof, at least one preferred conveyance service request. At least one application can be provided in any form or format, such as but not limited to any appropriate tangible or intangible medium of expression, but can preferably be provided in at least one electronic form. At least one application can be associated with, including but not limited to, at least one central server, at least one link, at least one external server, at least one good supplier, at least one autonomous vehicle, at least one owner or controller application, at least one service provider, at least one owner or at least one controller of at least one autonomous vehicle, or a combination thereof.

At least one application can be software appropriate for communicating with but not limited to at least one central server, at least one external server, at least one good supplier, at least one autonomous vehicle, at least one terminal, at least one owner or controller application, at least one service provider, at least one owner or at least one controller of at least one autonomous vehicle, at least one representative, at least one conveyance client, or a combination thereof. At least one application can operate on including but not limited to at least one terminal, at least one central server, or a combination thereof. At least one application can standardize or convert at least one conveyance service request, structured in at least one different format, into at least one uniform format. At least one representative can input or provide at least one representative preference into at least one application.

At least one application can provide including but not limited to at least one real time or near real time geographical location of at least one representative, at least one real time or near real time geographical location of at least one autonomous vehicle, at least one real time or near real time geographical location of at least one service provider, at least one real time or near real time geographical location of at least one good supplier, or a combination thereof, using at least one geographical location module of at least one terminal. Information and/or data inputted or discovered by at least one application can be cached. At least one application can be updated or refreshed in real time or near real time and can refer to being updated or refreshed in the highest level of development or state of the art. At least one application can perform at least one function in real time or near real time and can refer to being updated or refreshed in the highest level of development or state of the art.

At least one application can be used to analyze, evaluate, secure, obtain, accept, or decline at least one preferred conveyance service. At least one application can be used by including but not limited to at least one representative, at least one autonomous vehicle, at least one service provider, at least one good supplier, at least one owner or at least one controller of at least one autonomous vehicle, or a combination thereof. At least one application can be used, accessed, controlled, or operated by including but not limited to at least one owner or at least one controller of at least one autonomous vehicle, at least one service provider, or a combination thereof, to optionally analyze or evaluate and then preferably secure or obtain at least one preferred conveyance service request.

At least one application can display at least one visual representation. At least one application can display at least one secured or obtained preferred conveyance service request. At least one application can display at least one preferred conveyance service request that can be accepted or declined. At least one application can display conveyance data relating to including but not limited to at least one conveyance service request, at least one filtered conveyance service request, at least one preferred conveyance service request, or a combination thereof.

As a non-limiting example, there can be at least one different variation of at least one application used by including but not limited to at least one representative, at least one autonomous vehicle, at least one service provider, at least one good supplier, at least one owner or at least one controller of at least one autonomous vehicle, or a combination thereof. As a non-limiting example, at least one application can transmit at least one Inertial Measurement Unit (IMU) reading of at least one terminal to at least one central server to determine at least one orientation or at least one direction of at least one representative, at least one autonomous vehicle, at least one service provider, at least one good supplier, or a combination thereof. As a non-limiting example, at least one application can be in at least one form of but not limited to at least one mobile application, at least one non-mobile application, at least one website, at least one plugin, or a combination thereof.

As a non-limiting example, at least one application can operate on at least one central server. As a non-limiting example, at least one application can perform at least one central server function. As a non-limiting example, at least one application can perform at least one similar function as at least one central server to identify at least one preferred conveyance service request. As a non-limiting example, there can be at least one different application used by at least one representative, at least one autonomous vehicle, at least one service provider, at least one good supplier, at least one owner or at least one controller of at least one autonomous vehicle, or a combination thereof.

As a non-limiting example, at least one preferred conveyance service request in conjunction with corresponding conveyance data can be transmitted to at least one application and can be displayed as at least one pop-up, at least one icon, at least one visual, at least one symbol, at least one pattern, at least one marker, at least one notification, at least one alert, at least one message, at least one short message service, at least one multimedia messaging service, at least one smart messaging service, at least one extended message service, or a combination thereof.

As a non-limiting example, at least one application can secure or obtain at least one preferred conveyance service request, at least one filtered conveyance service request, or a combination thereof, and can communicate indirectly with at least one external server via at least one central server. As a non-limiting example, at least one application can secure or obtain at least one preferred conveyance service request, at least one filtered conveyance service request, or a combination thereof, and can communicate directly with at least one external server or at least one service provider. As a non-limiting example, at least one application can be at least one service provider application.

As a non-limiting example, at least one application can be accessed, controlled, or operated remotely by at least one service provider, at least one owner or at least one controller of at least one autonomous vehicle, at least one autonomous vehicle, at least one good supplier, at least one representative, or a combination thereof, to optionally analyze or evaluate and then preferably secure or obtain at least one preferred conveyance service request.

As a non-limiting example, at least one conveyance service request can be filtered in real time or near real time. As a non-limiting example, at least one preferred conveyance service request can be identified in real time, from at least one filtered conveyance service request on at least one application.

As a non-limiting example, at least one different geographical location can be used other than at least one real time or near real time geographical location of at least one representative when filtering at least one conveyance service request. As a non-limiting example, at least one different geographical location can be used other than at least one real time or near real time geographical location of at least one autonomous vehicle when filtering at least one conveyance service request.

The following are different examples of at least one application used by various parties:

At least one representative can access at least one application via at least one terminal. As a non-limiting example, at least one representative can analyze or evaluate and then secure or obtain at least one preferred conveyance service request. At least one application can be used with at least one Representative Automated Platform to secure or obtain at least one preferred conveyance service request for at least one representative.

At least one autonomous vehicle can access at least one application via at least one terminal. As a non-limiting example, at least one service provider, at least one good supplier, at least one owner or at least one controller of at least one autonomous vehicle, or a combination thereof, can analyze or evaluate and then secure or obtain at least one preferred conveyance service request. As a non-limiting example, at least one application can be used with at least one Autonomous Vehicle Automated Platform to secure or obtain at least one preferred conveyance service request for at least one autonomous vehicle. As a non-limiting example, at least one application can secure or obtain at least one preferred conveyance service request relating to at least one service provider operating in at least one conveyance industry segment.

Owner or Controller Application

At least one owner or controller application can be but is not limited to software that can for example be used to input or provide at least one selected preference. At least one owner or controller application can for example facilitate analyzing, evaluating, securing, obtaining, accepting, declining, displaying, communicating, or a combination thereof, at least one preferred conveyance service request used by at least one owner or at least one controller of at least one autonomous vehicle or at least one service provider. At least one owner or controller application can for example control or operate at least one autonomous vehicle or at least one fleet of at least one autonomous vehicle. At least one owner or controller application can be provided in any form or format, such as but not limited to any appropriate tangible or intangible medium of expression, but can preferably be provided in at least one electronic form. At least one owner or controller application can be associated with including but not limited to at least one central server, at least one external server, at least one link, at least one good supplier, at least one autonomous vehicle, at least one application, at least one service provider, at least one owner or at least one controller of at least one autonomous vehicle, or a combination thereof.

At least one owner or controller application can operate on including but not limited to at least one terminal, at least one central server, or a combination thereof. At least one owner or controller application can be used in conjunction with or in addition to at least one application associated with at least one autonomous vehicle. Information and/or data inputted or discovered by at least one owner or controller application can be cached.

At least one owner or controller application can be updated or refreshed in real time or near real time and can refer to being updated or refreshed in the highest level of development or state of the art. At least one owner or controller application can perform at least one function in real time or near real time and can refer to being updated or refreshed in the highest level of development or state of the art.

At least one owner or controller application can be used to analyze, evaluate, secure, obtain, accept, or decline at least one preferred conveyance service request. At least one owner or controller application can be used by including but not limited to at least one service provider, at least one autonomous vehicle, at least one owner or at least one controller of at least one autonomous vehicle, at least one representative, or a combination thereof, to secure or obtain at least one preferred conveyance service request for at least one autonomous vehicle. At least one owner or controller application can be used, accessed, controlled, or operated by including but not limited to at least one service provider, at least one good supplier, at least one owner or at least one controller of at least one autonomous vehicle, or a combination thereof, remotely to secure or obtain at least one preferred conveyance service request.

At least one owner or controller application can display at least one visual representation. At least one owner or controller application can display at least one secured or obtained preferred conveyance service request. At least one owner or controller application can display at least one preferred conveyance service request that can be accepted or declined. At least one owner or controller application can display conveyance data relating to including but not limited to at least one conveyance service request, at least one filtered conveyance service request, at least one preferred conveyance service request, or a combination thereof.

As a non-limiting example, at least one owner or at least one controller of at least one autonomous vehicle can input or provide at least one selected preference into at least one owner or controller application. As a non-limiting example, at least one preferred conveyance service request in conjunction with corresponding conveyance data can be transmitted to at least one owner or controller application and can be displayed as at least one pop-up, at least one icon, at least one visual, at least one symbol, at least one pattern, at least one marker, at least one notification, at least one alert, at least one message, at least one short message service, at least one multimedia messaging service, at least one smart messaging service, at least one extended message service, or a combination thereof.

As a non-limiting example, at least one owner or controller application can perform at least one similar function as at least one central server or at least one application to identify at least one preferred conveyance service request. As a non-limiting example, at least one function of at least one central server or at least one application can be performed by at least one owner or controller application. As a non-limiting example, at least one owner or controller application can operate on at least one central server or at least one application. As a non-limiting example, at least one owner or controller application can standardize or convert at least one conveyance service request, structured in at least one different format, into at least one uniform format. As a non-limiting example, at least one owner or controller application can be associated with at least one autonomous vehicle. As a non-limiting example, at least one owner or controller application can be in at least one form of but not limited to at least one mobile application, at least one non-mobile application, at least one website, at least one plugin, or a combination thereof.

As a non-limiting example, at least one conveyance service request can be filtered in real time or near real time and at least one preferred conveyance service request can be identified in real time or near real time, from at least one filtered conveyance service request on at least one owner or controller application.

As a non-limiting example, at least one owner or controller application can secure or obtain at least one preferred conveyance service request, at least one filtered conveyance service request, or a combination thereof, and can communicate indirectly with at least one external server via at least one central server. As a non-limiting example, at least one owner or controller application can secure or obtain at least one preferred conveyance service request, at least one filtered conveyance service request, or a combination thereof, and can communicate directly with at least one external server. As a non-limiting example, at least one owner or controller application can secure or obtain at least one preferred conveyance service request, at least one filtered conveyance service request, or a combination thereof, and can communicate directly with at least one service provider. As a non-limiting example, at least one owner or controller application can be at least one service provider application. As a non-limiting example, at least one owner or controller application can secure or obtain at least one preferred conveyance service request relating to at least one service provider operating in at least one conveyance industry segment.

Terminal

At least one terminal can be but is not limited to at least one device that can for example facilitate operating at least one application. At least one terminal can for example be capable of communicating with at least one central server, at least one external server, at least one application, at least one owner or controller application, at least one autonomous vehicle, or a combination thereof, by way of at least one link. At least one terminal can be but is not limited to at least one electronic computing device that can include at least one computer processor, at least one computer readable memory, at least one input source, at least one geographical location module, at least one display, at least one network interface, or a combination thereof. At least one terminal can encompass hardware and/or software alone or in a combination.

At least one terminal can be used to access including but not limited to at least one application, at least one owner or controller application, or a combination thereof. At least one application can operate on at least one terminal. At least one terminal can be associated with at least one autonomous vehicle. At least one operating system can run on at least one terminal. At least one terminal can facilitate including but not limited to at least one display function, at least one input function, at least one operation, or a combination thereof, of at least one application. At least one application can provide at least one real time or near real time geographical location of including but not limited to at least one representative, at least one autonomous vehicle, at least one service provider, at least one good supplier, or a combination thereof, using at least one geographical location module of at least one terminal. At least one terminal can be associated with at least one display or at least one remote display.

As a non-limiting example, at least one terminal can be but is not limited to at least one computer, at least one smartphone device, at least one plug-in device, at least one mobile computing device, at least one handheld computing device, at least one tablet computing device, at least one laptop computing device, at least one wearable computing device, at least one portable computing device, at least one fixed computing device, at least one non-fixed computing device, at least one physiologically embedded computing device, at least one biologically integrated computing device, at least one In-Vehicle infotainment device, at least one Internet of Things (IoT) device, at least one projecting device, at least one computing device embedded in at least one vehicle, at least one head-up display, or a combination thereof.

As a non-limiting example, at least one Inertial Measurement Unit (IMU) reading of at least one terminal can be used to determine at least one orientation or at least one direction least one representative, at least one autonomous vehicle, at least one service provider, at least one good supplier, or a combination thereof. As a non-limiting example, at least one geographical location module of at least one terminal can include but is not limited to at least one Global Positioning System (GPS), at least one satellite tracking, at least one RFID tracking, at least one radiolocation, at least one WiFi positioning system, at least one geofencing, at least one global system for mobile communications, at least one cell phone triangulation, at least one Internet tracking, or a combination thereof.

As a non-limiting example, at least one central server can optionally be located on at least one terminal. As a non-limiting example, at least one owner or controller application can optionally be located on at least one terminal. As a non-limiting example, at least one input source of at least one terminal can be but is not limited to at least one touchscreen, at least one keypad, at least one keyboard, at least one voice controlled input, or a combination thereof. As a non-limiting example, at least one visual representation can be displayed on at least one application using at least one display of at least one terminal. As a non-limiting example, at least one terminal can be embedded in or attached to at least one autonomous vehicle. As a non-limiting example, at least one terminal can be inside or outside of at least one autonomous vehicle. As a non-limiting example, at least one terminal can be at least one smartphone that can be used by at least one representative, at least one owner or at least one controller of at least one autonomous vehicle, or a combination thereof.

Link

At least one link can include but is not limited to at least one electronic communication network channel. At least one link can be for example at least one appropriate link that can allow an efficient, rapid, accurate, or the like transmission of information or data. At least one link can be but is not limited to at least one combination of at least one connection between at least one central server, at least one external server, at least one terminal, at least one owner or controller application, at least one autonomous vehicle, at least one application, or a combination thereof. Preferably, at least one link between including but not limited to at least one central server, at least one external server, at least one terminal, at least one application, at least one owner or controller application, or a combination thereof, can be via the Internet, preferably secure, and can be more preferably encrypted. The definition of at least one link can encompass hardware and/or software alone or in a combination.

At least one link can communicate or provide data or information in real time or near real time and can refer to the highest level of development or state of the art. At least one link can be updated or refreshed in real time or near real time and can refer to being updated or refreshed in the highest level of development or state of the art. At least one link can perform at least one function in real time or near real time and can refer to being updated or refreshed in the highest level of development or state of the art.

As a non-limiting example, at least one link can be any appropriate connection, such as but not limited to at least one WiFi connection, at least one wireless connection, at least one Ethernet connection, at least one LTE connection, at least one 3G connection, at least one 4G connection, at least one 5G connection, at least one 6G connection, at least one 7G connection, at least one radio connection, at least one RFID connection, at least one Bluetooth connection, at least one BLE connection, at least one PAN connection, at least one LAN connection, at least one MAN connection, at least one WAN connection, at least one WLAN connection, at least one GSM connection, at least one GPRS connection, at least one UMTS connection, at least one dial-up connection, at least one broadband connection, at least one mobile connection, at least one DSL connection, at least one cable connection, at least one wired connection, at least one satellite connection, at least one ISDN connection, at least one fiber-optics connection, at least one infrared connection, at least one client-server network such as at least one cloud computing network connection, at least one other appropriate method, means, hardware and/or software capable of conveying information, or a combination thereof.

Central Server

At least one central server can for example facilitate at least one operation or at least one function to secure or obtain at least one preferred conveyance service request. At least one central server can include but is not limited to at least one computer processor, at least one computer readable memory, at least one network interface, or a combination thereof. At least one central server can be but is not limited to at least one computer network system. At least one central server can preferably encompass hardware and/or software alone or in a combination.

At least one central server can be associated with including but not limited to at least one external server, at least one link, at least one owner or controller application, at least one good supplier, at least one autonomous vehicle, at least one application, at least one service provider, at least one owner or at least one controller of at least one autonomous vehicle, at least one representative, at least one conveyance client, or a combination thereof. At least one central server can encompass different hardware and/or software alone or in a combination. At least one central server can include or connect to at least one database. At least one computer readable memory of at least one central server can be or include at least one database that at least one central server can connect to. At least one central server can connect to or communicate with including but not limited to at least one application, at least one external server, at least one owner or controller application, at least one terminal, or a combination thereof, by way of at least one link. At least one central server can control the flow of information or data between including but not limited to at least one application, at least one owner or controller application, at least one external server, or a combination thereof, in either direction. At least one central server can be at least one server in at least one individual geographical location or at least one additional geographical location. At least one central server can preferably relate to a single Internet location, but that need not be the case.

At least one central server can standardize or convert at least one conveyance service request, structured in at least one different format, into at least one uniform format. At least one central server can preferably be at least one secure server. At least one central server can be made secure using hardware and/or software commercially available. Additionally, at least one central server can include encryption software such that communications entering or exiting at least one server are encrypted. Encryption hardware and/or software are commercially available. At least one central server can be updated or refreshed in real time or near real time and can refer to being updated or refreshed in the highest level of development or state of the art. At least one central server can perform at least one function in real time or near real time and can refer to being updated or refreshed in the highest level of development or state of the art.

At least one central server can filter at least one conveyance service request relating to at least one representative preference and preferably at least one real time or near real time geographical location of at least one representative, to identify at least one filtered conveyance service request by at least one process including but not limited to at least one of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

At least one central server can filter at least one conveyance service request relating to at least one selected preference and preferably at least one real time or near real time geographical location of at least one autonomous vehicle, to identify at least one filtered conveyance service request by at least one process including but not limited to at least one of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

At least one central server can filter, categorize, or the like, at least one conveyance service request upon being received. At least one central server can filter, or the like, at least one conveyance service request more than once. At least one central server can, including but not limited to, receive, transmit, store, standardize, aggregate, or a combination thereof, at least one conveyance service request in any order prior to filtering at least one conveyance service request.

At least one central server can identify at least one preferred conveyance service request from at least one filtered conveyance service request or at least one pre-filtered conveyance service request.

At least one preferred conveyance service request relating to at least one representative preference or at least one selected preference can be identified from at least one filtered conveyance service request by using including but not limited to at least one sorting algorithm, at least one selection algorithm, at least one search algorithm, at least one merge algorithm, at least one maximum function, at least one minimum function, at least one comparison, or a combination thereof.

At least one central server can preferably sort, or the like, at least one filtered conveyance service request using at least one representative preference or at least one selected preference to identify at least one preferred conveyance service request.

At least one central server can preferably sort, or the like, at least one filtered conveyance service request in at least one order relating to at least one weighted average of at least one representative preference to identify at least one preferred conveyance service request. At least one central server can preferably sort, or the like, at least one filtered conveyance service request in at least one order relating to at least one weighted average of at least one selected preference to identify at least one preferred conveyance service request.

At least one central server can process or facilitate including but not limited to at least one conveyance service request, at least one filtered conveyance service request, at least one preferred conveyance service request, or a combination thereof, relating to at least one service provider operating in at least one conveyance industry segment.

When at least one Representative Automated Platform or at least one Autonomous Vehicle Automated Platform is used, at least one central server can analyze or evaluate at least one conveyance service request in real time or near real time. At least one conveyance service request can be filtered by using at least one representative preference or at least one selected preference and preferably at least one real time or near real time geographical location of at least one representative or at least one autonomous vehicle respectively. If at least one conveyance service request is pre-filtered or pre-categorized, then at least one conveyance service request can be perceived or referred to as at least one filtered conveyance service request and at least one central server can identify at least one preferred conveyance service request. At least one filtered conveyance service request can preferably be sorted relating to at least one weighted average of at least one representative preference or at least one selected preference, however, sorting is not required to identify at least one preferred conveyance service request respectively. At least one preferred conveyance service request can be identified and then preferably secured or obtained.

As a non-limiting example, at least one computer readable memory of at least one central server can be but is not limited to at least one database, at least one cloud storage, at least one hard disk drive, at least one solid state drive, at least one optical disk drive, at least one flash memory, at least one Random Access Memory (RAM), at least one tape, or a combination thereof.

As a non-limiting example, at least one central server can include at least one distinct server operably linked in the same or at least one different geographical location. As a non-limiting example, at least one central server can optionally be part of at least one terminal. As a non-limiting example, at least one central server can optionally be part of at least one application or at least one owner or controller application. As a non-limiting example, at least one central server can optionally be located on at least one terminal. As a non-limiting example, at least one application, at least one owner or controller application, or a combination thereof, can optionally operate on at least one central server. As a non-limiting example, at least one function of at least one central server can be performed by at least one application, at least one owner or controller application, or a combination thereof. As a non-limiting example, at least one function of at least one application, at least one owner or controller application, or a combination thereof, can be performed by at least one central server. As a non-limiting example, at least one central server can include or utilize quantum computing. As a non-limiting example, at least one central server can include or utilize at least one neural network. As a non-limiting example, at least one central server can include or utilize machine learning technology or the like. As a non-limiting example, at least one central server can be dispersed across at least one geographical location such as Los Angeles and New York.

As a non-limiting example, at least one central server can aggregate at least one conveyance service request within at least one service provider. As a non-limiting example, at least one central server can process or facilitate at least one conveyance service request, at least one filtered conveyance service request, at least one preferred conveyance service request, or a combination thereof, from at least one individual service provider relating to at least one individual conveyance industry segment. As a non-limiting example, at least one central server can compile at least one visual representation to be transmitted to at least one application or at least one owner or controller application. As a non-limiting example, at least one central server can control or operate at least one fleet of at least one autonomous vehicle.

As a non-limiting example, at least one conveyance service request can be structured in at least one uniform format prior to being transmitted from at least one external server and is not needed to be standardized.

As a non-limiting example, at least one central server can execute at least one function of the present invention for at least one representative and/or at least one autonomous vehicle including but not limited to receiving, standardizing, aggregating, filtering and preferably sorting, at least one conveyance service request in conjunction with corresponding conveyance data, and securing or obtaining at least one preferred conveyance service request.

As a non-limiting example, at least one different geographical location can be used other than at least one real time or near real time geographical location of at least one representative or at least one real time or near real time geographical location of at least one autonomous vehicle when filtering at least one conveyance service request.

As a non-limiting example, at least one representative preference, preferably at least one real time or near real time geographical location of at least one representative, or a combination thereof, can be transmitted to at least one central server at any time prior to filtering at least one conveyance service request. As a non-limiting example, at least one selected preference, preferably at least one real time or near real time geographical location of at least one autonomous vehicle, or a combination thereof, can be transmitted to at least one central server at any time prior to filtering at least one conveyance service request.

As a non-limiting example, at least one central server can use at least one equal weight or at least one unequal weight for at least one representative preference when calculating at least one weighted average to identify at least one preferred conveyance service request. As a non-limiting example, at least one central server can use at least one equal weight or at least one unequal weight for at least one selected preference when calculating at least one weighted average to identify at least one preferred conveyance service request.

As a non-limiting example, when at least one central server receives at least one conveyance service request, at least one central server can categorize or pre-filter at least one conveyance service request. As a non-limiting example, at least one central server can obtain or receive at least one pre-filtered or at least one pre-categorized conveyance service request relating to at least one geographical area. As a non-limiting example, at least one central server can obtain or receive at least one pre-filtered or at least one pre-categorized conveyance service request relating to at least one level of service. As a non-limiting example, at least one conveyance service request can be pre-filtered or pre-categorized on at least one central server based on at least one geographical area. As a non-limiting example, at least one conveyance service request can be pre-filtered or pre-categorized on at least one central server based on at least one level of service.

As a non-limiting example, at least one conveyance service request can be filtered based on at least one representative preference, at least one selected preference, or a combination thereof, on at least one central server after being pre-filtered or pre-categorized.

As a non-limiting example, when at least one central server obtains at least one pre-filtered conveyance service request, at least one central server can compare at least one pre-filtered conveyance service request to at least one representative preference or at least one selected preference to identify at least one filtered conveyance service request.

As a non-limiting example, if at least one conveyance service request is pre-filtered, then at least one conveyance service request is not filtered. As a non-limiting example, at least one pre-filtered conveyance service request can be perceived or referred to as at least one filtered conveyance service request. As a non-limiting example, at least one central server can filter at least one conveyance service request at least once. As a non-limiting example, at least one central server can preferably sort, or the like, at least one conveyance service request at least once to identify at least one preferred conveyance service request. As a non-limiting example, at least one central server can filter at least one conveyance service request more than once based on at least one pricing preference and then at least one service provider preference. As a non-limiting example, at least one conveyance service request can be categorized by at least one geographical location after being received on at least one central server.

As a non-limiting example, at least one filtered conveyance service request can preferably be sorted in at least one ascending or descending order relating to at least one weighted average of at least one representative preference or at least one selected preference to identify at least one preferred conveyance service request.

As a non-limiting example, at least one preferred conveyance service request in conjunction with corresponding conveyance data, at least one filtered conveyance service request in conjunction with corresponding conveyance data, or a combination thereof, can be identified or updated in real time or near real time as at least one real time or near real time geographical location of at least one representative or at least one autonomous vehicle updates or changes.

As a non-limiting example, at least one preferred conveyance service request in conjunction with corresponding conveyance data, at least one filtered conveyance service request in conjunction with corresponding conveyance data, or a combination thereof, can be identified or updated in real time or near real time as traffic information updates or changes.

As a non-limiting example, at least one central server can secure or obtain at least one preferred conveyance service request, at least one filtered conveyance service request, or a combination thereof, and can communicate directly with at least one external server or at least one service provider.

As a non-limiting example, at least one secured or obtained preferred conveyance service request can be sent to including but not limited to at least one service provider, at least one external server, at least one good supplier, at least one owner or at least one controller of at least one autonomous vehicle, at least one owner or controller application, at least one autonomous vehicle, at least one representative, at least one conveyance client, or a combination thereof.

System

At least one system can be but is not limited to a collection of elements of the present invention that can for example secure or obtain at least one preferred conveyance service request. The collection of elements or individual elements can be in the same or different locations. At least one system can be but is not limited to at least one computer program product.

As a non-limiting example, in the present invention, at least one conveyance client, at least one application, at least one owner or controller application, at least one representative, at least one autonomous vehicle, at least one owner or at least one controller of at least one autonomous vehicle, at least one terminal, at least one link, at least one central server, at least one external server, at least one service provider, at least one good supplier, at least one Representative Automated Platform, at least one Autonomous Vehicle Automated Platform, at least one visual representation, at least one representative preference, at least one selected preference, conveyance data, at least one conveyance service request, at least one filtered conveyance service request, and at least one preferred conveyance service request can all be in at least one similar geographical location, or spread out in at least one distant location, including at least one cross-border location.

At least one system can be used to analyze or evaluate and secure or obtain at least one preferred conveyance service request relating to at least one service provider operating in at least one conveyance industry segment. At least one system can be updated or refreshed in real time or near real time and can refer to being updated or refreshed in the highest level of development or state of the art. At least one system can perform at least one function in real time or near real time and can refer to being updated or refreshed in the highest level of development or state of the art.

Method

At least one method can be but is not limited to a collection of elements of the present invention that can for example secure or obtain at least one preferred conveyance service request. The collection of elements or individual elements can be in the same or different locations. At least one method can be but is not limited to at least one computer program product.

As a non-limiting example, in the present invention, at least one conveyance client, at least one application, at least one owner or controller application, at least one representative, at least one autonomous vehicle, at least one owner or at least one controller of at least one autonomous vehicle, at least one terminal, at least one link, at least one central server, at least one external server, at least one service provider, at least one good supplier, at least one Representative Automated Platform, at least one Autonomous Vehicle Automated Platform, at least one visual representation, at least one representative preference, at least one selected preference, conveyance data, at least one conveyance service request, at least one filtered conveyance service request, and at least one preferred conveyance service request can all be in at least one similar geographical location, or spread out in at least one distant location, including at least one cross-border location.

At least one method can be used to analyze or evaluate and secure or obtain at least one preferred conveyance service request relating to at least one service provider operating in at least one conveyance industry segment. At least one method can be updated or refreshed in real time or near real time and can refer to being updated or refreshed in the highest level of development or state of the art. At least one method can perform at least one function in real time or near real time and can refer to being updated or refreshed in the highest level of development or state of the art.

External Server

At least one external server can include but is not limited to at least one source of at least one conveyance service request in conjunction with corresponding conveyance data. At least one external server can be for example at least one source of at least one real time or near real time conveyance service request. At least one external server can be but is not limited to at least one computer network system. At least one external server can include but is not limited to at least one computer processor, at least one computer readable memory, and at least one network interface. At least one external server preferably can encompass hardware and/or software alone or in a combination.

At least one external server can be but is not limited to at least one server that can connect to or communicate with at least one central server by way of at least one link. At least one external server can transmit in real time or near real time, including but not limited to, at least one conveyance service request in conjunction with conveyance data to at least one central server by way of at least one link. At least one external server can encompass different hardware and/or software alone or in a combination. At least one external server can include or connect to at least one database. At least one computer readable memory of at least one external server can be at least one database that at least one external server can connect to.

At least one external server can have or be associated with including but not limited to at least one central server, at least one link, at least one terminal, at least one owner or controller application, at least one good supplier, at least one autonomous vehicle, at least one application, at least one service provider, at least one owner or at least one controller of at least one autonomous vehicle, or a combination thereof. At least one external server can optionally be perceived or referred to as at least one service provider server. At least one external server can be at least one server in at least one individual geographical location or at least one additional geographical location. At least one external server can preferably relate to a single Internet location, but that need not be the case. Preferably, at least one external server can be at least one secure server. At least one external server can be made secure using hardware and/or software commercially available. Additionally, at least one external server can include encryption software such that communications entering or exiting at least one external server are encrypted. Encryption hardware and/or software are commercially available.

At least one external server Application Program Interface (API) or the like can be used to facilitate communication between including but not limited to at least one central server, at least one external server, at least one application, at least one owner or controller application, or a combination thereof. At least one external server can provide at least one conveyance service request in conjunction with conveyance data relating to at least one service provider operating in at least one conveyance industry segment. At least one external server can be updated or refreshed in real time or near real time and can refer to being updated or refreshed in the highest level of development or state of the art. At least one external server can perform at least one function in real time or near real time and can refer to being updated or refreshed in the highest level of development or state of the art.

As a non-limiting example, at least one external server being at least one source of at least one conveyance service request in conjunction with corresponding conveyance data can be associated with at least one individual service provider.

As a non-limiting example, at least one external server can operate on at least one central server. As a non-limiting example, at least one external server can include at least one distinct server operably linked in the same or at least one different geographical location. As non-limiting example, at least one external server can optionally be perceived or referred to as at least one peer-to-peer network. As a non-limiting example, at least one external server can transmit at least one conveyance service request that can be pre-standardized to at least one central server. As a non-limiting example, at least one external server can be but is not limited to at least one server that can connect to or communicate with at least one application, at least one owner or controller application, or a combination thereof, by way of at least one link.

Conveyance Data

Conveyance data can be but is not limited to any data or information corresponding to at least one conveyance service request, at least one filtered conveyance service request, or at least one preferred conveyance service request that can for example be transmitted between at least one external server, at least one central server, at least one application, at least one terminal, at least one owner or controller application, or a combination thereof, by way of at least one link. Conveyance data can be for example used by at least one representative, at least one owner or at least one controller of at least one autonomous vehicle, at least one autonomous vehicle, or a combination thereof, to analyze or evaluate and then secure or obtain at least one conveyance service request.

Conveyance data can be for example data or information corresponding to at least one past metric, at least one current metric, or at least one future metric of including but not limited to at least one request for transporting at least one person, at least one good, at least one article, at least one thing, or a combination thereof from at least one geographical location to at least one other geographical location. Conveyance data can for example be transmitted from at least one external server to at least one central server, at least one application, at least one owner or controller application, or a combination thereof. Conveyance data retrieved from at least one external server can be for example cached on at least one central server, at least one application, at least one owner or controller application, or a combination thereof, to provide enhanced performance and better avoid at least one relevant limitation including but not limited to at least one central server limitation, at least one external server limitation, at least one service provider limitation, at least one link limitation, and any involved service provider limitation. Conveyance data can be stored or cached in at least one database. Conveyance data can be updated or refreshed in real time or near real time and can refer to being updated or refreshed in the highest level of development or state of the art. Conveyance data can correspond to at least one preferred conveyance service request, at least one filtered conveyance service request, at least one conveyance service request, or a combination thereof, relating to at least one service provider operating in at least one conveyance industry segment.

Conveyance data can include but is not limited to at least one statistical variable of at least one filtered conveyance service request. Conveyance data can include but is not limited to at least one statistical variable of at least one preferred conveyance service request.

As a non-limiting example, conveyance data can preferably be in real time or near real time and can include but is not limited to at least one beginning service geographical location, at least one ending service geographical location, pricing information, elevated pricing information, at least one representative preference, at least one selected preference, at least one distance parameter, at least one estimated time of arrival, at least one time to destination, at least one conveyance client geographical location, at least one conveyance client review, at least one conveyance client rating, at least one conveyance client detail, at least one conveyance service detail, at least one conveyance service route, at least one preferred conveyance client, at least one representative geographical location, at least one representative review, at least one representative rating, at least one representative detail, at least one autonomous vehicle geographical location, at least one autonomous vehicle review, at least one autonomous vehicle rating, at least one autonomous vehicle detail, at least one service provider geographical location, at least one service provider review, at least one service provider rating, at least one service provider detail, at least one preferred service provider, at least one good supplier geographical location, at least one good supplier review, at least one good supplier rating, at least one good supplier detail, at least one preferred good supplier, at least one conveyance industry segment detail, at least one preferred conveyance industry segment, at least one good detail, at least one item detail, at least one type of vehicle detail, at least one vehicle detail, at least one measurement of at least one statistical variable, at least one level of service detail, or a combination thereof.

As a non-limiting example, conveyance data can be generated from at least one central server, at least one application, at least one owner or controller application, or a combination thereof.

Conveyance Service Request

At least one conveyance service request can be for example at least one request from at least one conveyance client for the transportation of including but not limited to at least one person, at least one good, at least one article, at least one thing, or a combination thereof from at least one geographical location to at least one other geographical location. Once, for example, at least one beginning service geographical location, at least one ending service geographical location, or a combination thereof, is inputted or provided into at least one application, at least one central server or at least one external server, at least one conveyance service request relating to at least one conveyance client can be generated. At least one conveyance service request can be sourced or provided from at least one external server. At least one conveyance service request can be stored or cached in at least one computer readable memory and/or at least one database of at least one central server. At least one conveyance service request can relate to at least one conveyance industry segment. At least one conveyance service request can relate to at least one service provider.

At least one conveyance service request can be updated or refreshed in real time or near real time and can refer to being updated or refreshed in the highest level of development or state of the art. At least one conveyance service request can be pre-filtered or pre-categorized on at least one central server. At least one conveyance service request can become at least one filtered conveyance service request, at least one preferred conveyance service request, or a combination thereof, based on at least one representative preference inputted or provided by at least one representative. At least one conveyance service request can become at least one filtered conveyance service request, at least one preferred conveyance service request, or a combination thereof, based on at least one selected preference inputted or provided by at least one owner or at least one controller of at least one autonomous vehicle or at least one service provider.

As a non-limiting example, at least one conveyance service request can be at least one ride-hail service request, at least one ride-share service request, at least one car-share service request, at least one peer-to-peer conveyance service request, at least one person delivery service request, at least one taxi service request, at least one shuttle service request, at least one good delivery service request, at least one item delivery service request, at least one medical service and delivery service request, at least one food delivery service request, at least one courier delivery service request, at least one freight delivery service request, at least one animal delivery service request, at least one delivery service request, or a combination thereof.

As a non-limiting example, at least one conveyance service request can be identified or referred to as at least one filtered conveyance service request or at least one preferred conveyance service request for at least one representative, at least one autonomous vehicle, at least one owner or at least one controller of at least one autonomous vehicle, at least one service provider, or a combination thereof. As a non-limiting example, at least one conveyance service request can include at least one waypoint. As a non-limiting example, at least one conveyance service request can be pre-scheduled. As a non-limiting example, at least one thing to be conveyed can include but is not limited to at least one personal item such as but not limited to keys or documents. As a non-limiting example, at least one conveyance service request can include special request information. As a non-limiting example, at least one conveyance service request can be stored or cached in at least one computer readable memory and/or at least one database of at least one application. As a non-limiting example, at least one conveyance service request can relate to at least one individual conveyance industry segment. As a non-limiting example, at least one conveyance service request can relate to at least one individual service provider. As a non-limiting example, at least one conveyance service request can be at least one pre-filtered conveyance service request. As a non-limiting example, a plurality of conveyance service requests can be a single conveyance service request. As a non-limiting example, at least one conveyance service request can be pre-filtered or pre-categorized on at least one central server based on at least one geographical location.

Filtered Conveyance Service Request

At least one filtered conveyance service request can be for example at least one conveyance service request that can be filtered with including but not limited to at least one representative preference, at least one selected preference, at least one real time or near real time geographical location of at least one representative, at least one real time or near real time geographical location of at least one autonomous vehicle, or a combination thereof. At least one filtered conveyance service request can be stored or cached in at least one computer readable memory and/or at least one database of at least one central server. When at least one representative preference or at least one selected preference is updated, modified, added, removed, and/or refreshed, at least one new set of at least one filtered conveyance service request can be generated. At least one filtered conveyance service request can relate to at least one conveyance industry segment. At least one filtered conveyance service request can relate to at least one service provider.

At least one filtered conveyance service request can be updated or refreshed in real time or near real time and can refer to being updated or refreshed in the highest level of development or state of the art. At least one filtered conveyance service request can be pre-filtered or pre-categorized on at least one central server. At least one filtered conveyance service request can be filtered more than once.

As a non-limiting example, at least one filtered conveyance service request can be displayed on at least one application or at least one owner or controller application. As a non-limiting example, at least one filtered conveyance service request can be displayed on at least one geographical map of at least one visual representation. As a non-limiting example, at least one filtered conveyance service request can relate to at least one individual conveyance industry segment. As a non-limiting example, at least one filtered conveyance service request can relate to at least one individual service provider. As a non-limiting example, if at least one representative, at least one owner or at least one controller of at least one autonomous vehicle, at least one service provider, or a combination thereof, secures or obtains at least one filtered conveyance service request, that same at least one secured or obtained filtered conveyance service request can be referred to or identified as at least one preferred conveyance service request. As a non-limiting example, at least one filtered conveyance service request can be at least one pre-filtered conveyance service request. As a non-limiting example, at least one filtered conveyance service request can be perceived or referred to as at least one conveyance service request. As a non-limiting example, a plurality of filtered conveyance service requests can be a single filtered conveyance service request.

Preferred Conveyance Service Request

At least one preferred conveyance service request can be for example at least one request for transporting including but not limited to at least one person, at least one good, at least one thing, at least one article, or a combination thereof, from at least one geographical location to at least one other geographical location that can be identified from at least one filtered conveyance service request. At least one preferred conveyance service request can be for example at least one request that including but not limited to at least one central server, at least one representative, at least one application, at least one owner or controller application, at least one owner or at least one controller of at least one autonomous vehicle, at least one autonomous vehicle, at least one service provider, or a combination thereof, identifies as preferred. At least one preferred conveyance service request can be at least one conveyance service request that matches or satisfies at least one representative preference or at least one selected preference. At least one filtered conveyance service request can be identified as preferred by at least one representative, at least one owner or at least one controller of at least one autonomous vehicle or at least one service provider, or a combination thereof, and then at least one filtered conveyance service request can become at least one preferred conveyance service request. At least one preferred conveyance service request can be identified as preferred with at least one highest weighted average of at least one representative preference. At least one preferred conveyance service request can be identified as preferred with at least one highest weighted average of at least one selected preference.

At least one preferred conveyance service request can be updated or changed in real time or near real time as at least one real time or near real time geographical location of at least one representative or at least one autonomous vehicle changes or updates. At least one preferred conveyance service request can relate to at least one conveyance industry segment. At least one preferred conveyance service request can relate to at least one service provider. At least one preferred conveyance service request can be updated or refreshed in real time or near real time and can refer to being updated or refreshed in the highest level of development or state of the art.

At least one conveyance service request can be filtered in real time or near real time by using at least one representative preference or at least one selected preference to create at least one set of at least one filtered conveyance service request. At least one filtered conveyance service request can preferably be sorted in real time or near real time relating to at least one weighted average of at least one representative preference or at least one selected preference to identify at least one preferred conveyance service request.

As a non-limiting example, at least one preferred conveyance service request can be updated in real time or near real time as traffic information changes or updates. As a non-limiting example, at least one different geographical location can be used other than at least one real time or near real time geographical location of at least one representative, when filtering at least one conveyance service request, to identify at least one preferred conveyance service request. As a non-limiting example, at least one application or at least one owner or controller application can secure or obtain at least one preferred conveyance service request. As a non-limiting example, at least one preferred conveyance service request can be visually identifiable from at least one filtered conveyance service request displayed on at least one visual representation. As a non-limiting example, at least one preferred conveyance service request can relate to at least one individual conveyance industry segment. As a non-limiting example, at least one preferred conveyance service request can relate to at least one individual service provider. As a non-limiting example, at least one preferred conveyance service request can be identified from at least one filtered conveyance service request that has at least one highest weighted average of at least one representative preference or at least one selected preference. As a non-limiting example, at least one representative preference or at least one selected preference can have at least one equal weight or at least one unequal weight when using at least one weighted average to identify at least one preferred conveyance service request. As a non-limiting example, at least one preferred conveyance service request can be perceived or referred to as at least one conveyance service request or at least one filtered conveyance service request. As a non-limiting example, more than one preferred conveyance service request can be secured or obtained concurrently.

Representative Preference

At least one representative preference can for example be used by at least one representative to identify and preferably secure or obtain at least one preferred conveyance service request. At least one representative preference can include but is not limited to at least one option for example selected or provided by at least one representative to filter and/or preferably sort at least one conveyance service request in real time or near real time in order to identify at least one preferred conveyance service request. At least one representative preference can be used in conjunction with at least one real time or near real time geographical location of at least one representative or at least one different geographical location to filter at least one conveyance service request into at least one filtered conveyance service request. At least one filtered conveyance service request can preferably be sorted in real time or near real time in at least one order relating to at least one weighted average of at least one representative preference to identify at least one preferred conveyance service request. At least one representative can input or provide at least one representative preference into at least one application that can be used to identify and preferably secure or obtain at least one preferred conveyance service request.

At least one representative preference can be stored or cached on including but not limited to at least one central server, at least one application, at least one external server, or a combination thereof. At least one representative preference can be stored or cached on or transmitted to including but not limited to at least one central server, at least one application, at least one external server, or a combination thereof. At least one representative preference can be pre-set on including but not limited to at least one central server, at least one external server, at least one application, or a combination thereof. At least one representative preference can be either inclusive or exclusive for filtering or the like at least one conveyance service request. At least one individual representative preference can have at least one equal weight or at least one unequal weight when calculating at least one weighted average to identify at least one preferred conveyance service request. At least one representative can optionally choose at least one weight for at least one representative preference to have at least one equal weight or at least one unequal weight.

At least one representative preference can be updated or refreshed in real time or near real time and can refer to being updated or refreshed in the highest level of development or state of the art. At least one representative preference can be used to perform at least one function in real time or near real time being updated or refreshed in the highest level of development or state of the art.

At least one central server, at least one application, or a combination thereof, can filter out, hide, or remove at least one conveyance service request that does not meet at least one representative preference criteria for at least one representative. At least one representative preference can be updated or changed and at least one new or different set of including but not limited to at least one filtered conveyance service request, at least one preferred conveyance service request, or a combination thereof, can be identified. At least one representative preference can be used to identify at least one preferred conveyance service request from at least one filtered conveyance service request or at least one pre-filtered conveyance service request. At least one representative preference can be used for at least one conveyance industry segment. At least one representative preference can be used for at least one service provider.

As a non-limiting example, at least one representative preference can be but is not limited to at least one pricing preference, at least one elevated pricing preference, at least one geographical location preference, at least one distance preference, at least one route preference, at least one service duration preference, at least one beginning service geographical location preference, at least one ending service geographical location preference, at least one time preference, at least one predictive preference, at least one historical preference, at least one efficiency preference, at least one event inclusion preference, at least one event exclusion preference, at least one traffic based preference, at least one road condition preference, at least one weather condition preference, at least one duration of conveyance service preference, at least one conveyance service request density preference, at least one conveyance client density preference, at least one conveyance client detail preference, at least one conveyance client rating preference, at least one representative density preference, at least one service provider inclusion preference, at least one service provider exclusion preference, at least one service provider density preference, at least one level of service preference, at least one good supplier inclusion preference, at least one good supplier exclusion preference, at least one good supplier density preference, at least one good detail preference, at least one conveyance industry segment preference, at least one freight preference, at least one waypoint preference, at least one delivery service preference, or a combination thereof.

As a non-limiting example, if at least one efficiency preference is selected, at least one representative can accept at least one additional food delivery service request for the same restaurant to perform at least one additional conveyance service and earn more money. As a non-limiting example, if at least one price preference is selected, then preferably at least one conveyance service request priced higher than at least one set minimum price can be identified as at least one preferred conveyance service request. As a non-limiting example, if a distance preference is selected, then preferably at least one conveyance service request within a selected distance can be identified as at least one preferred conveyance service request. As a non-limiting example, at least one good detail preference can include at least one item being fragile. As a non-limiting example, if at least one good detail preference is selected, then preferably at least one conveyance service request for conveying at least one certain type and/or quantity of at least one good that at least one representative is capable of delivering can be identified as at least one preferred conveyance service request, such as the capability to deliver at least one refrigerator or at least one mirror. As a non-limiting example, if at least one freight preference is selected, then preferably at least one conveyance service request for conveying freight that at least one representative is capable of delivering can be identified as at least one preferred conveyance service request, such as at least one conveyance service request to deliver at least one biohazardous material or at least one flammable material.

As a non-limiting example, when at least one individual representative preference has at least one unequal weight, at least one pricing preference can have 70% weight and at least one distance preference can have 30% weight which can be used to identify at least one preferred conveyance service request when determining which at least one filtered conveyance service request has the highest weighted average.

As a non-limiting example, at least one representative preference can be used for at least one individual conveyance industry segment. As a non-limiting example, at least one representative preference can be used for at least one individual service provider. As a non-limiting example, at least one representative can specify at least one representative preference to work in at least one given area by using at least one geographical location preference. As a non-limiting example, at least one representative can specify at least one representative preference to work in a six-mile perimeter by using at least one geographical location preference.

As a non-limiting example, at least one representative preference, once inputted or provided into at least one application, can be stored or cached on at least one application, at least one computer readable memory of at least one central server, or a combination thereof, and at least one representative preference is not inputted or provided again into at least one application by at least one representative. As a non-limiting example, at least one representative preference can be stored or cached in at least one computer readable memory of at least one central server and at least one representative preference is not transmitted again from at least one application to at least one central server. As a non-limiting example, at least one representative preference, at least one real time or near real time geographical location of at least one representative, or a combination thereof, can be transmitted from at least one application to at least one central server at any time prior to filtering or the like at least one conveyance service request.

Selected Preference

At least one selected preference can for example be used by at least one owner or at least one controller of at least one autonomous vehicle or at least one service provider to identify and preferably secure or obtain at least one preferred conveyance service request. At least one selected preference can include but is not limited to at least one option for example selected or provided by at least one owner or at least one controller of at least one autonomous vehicle or at least one service provider to filter and/or preferably sort, or the like, at least one conveyance service request in real time or near real time to identify at least one preferred conveyance service request. At least one selected preference can be used in conjunction with at least one real time or near real time geographical location of at least one autonomous vehicle or at least one different geographical location to filter at least one conveyance service request into at least one filtered conveyance service request. At least one filtered conveyance service request can preferably be sorted in real time or near real time in at least one order relating to at least one weighted average of at least one selected preference to identify at least one preferred conveyance service request. At least one owner or at least one controller of at least one autonomous vehicle can input or provide at least one selected preference into at least one owner or controller application that can be used to identify and preferably secure or obtain at least one preferred conveyance service request.

At least one selected preference can be stored or cached on including but not limited to at least one central server, at least one application, at least one owner or controller application, at least one external server, or a combination thereof. At least one selected preference can be stored or cached on or transmitted to including but not limited to at least one central server, at least one external server, at least one application, at least one owner or controller application, or a combination thereof. At least one selected preference can be pre-set on including but not limited to at least one central server, at least one external server, at least one application, at least one owner or controller application, or a combination thereof. At least one selected preference can be either inclusive or exclusive for filtering or the like at least one conveyance service request. At least one individual selected preference can have at least one equal weight or at least one unequal weight when calculating at least one weighted average to identify at least one preferred conveyance service request. At least one owner or at least one controller of at least one autonomous vehicle or at least one service provider can optionally choose at least one weight for at least one selected preference to have at least one equal weight or at least one unequal weight.

At least one selected preference can be updated or refreshed in real time or near real time and can refer to being updated or refreshed in the highest level of development or state of the art. At least one selected preference can be used to perform at least one function in real time or near real time being updated or refreshed in the highest level of development or state of the art.

At least one central server, at least one application, at least one owner or controller application, or a combination thereof, can filter out, hide, or remove at least one conveyance service request that does not meet at least one selected preference criteria for at least one owner or at least one controller of at least one autonomous vehicle or at least one service provider. At least one selected preference can be updated or changed and at least one new or different set of including but not limited to at least one filtered conveyance service request, at least one preferred conveyance service request, or a combination thereof, can be identified. At least one selected preference can be used to identify at least one preferred conveyance service request from at least one filtered conveyance service request or at least one pre-filtered conveyance service request. At least one selected preference can be used for at least one conveyance industry segment. At least one selected preference can be used for at least one service provider.

As a non-limiting example, at least one selected preference can be but is not limited to at least one pricing preference, at least one elevated pricing preference, at least one geographical location preference, at least one distance preference, at least one route preference, at least one service duration preference, at least one beginning service geographical location preference, at least one ending service geographical location preference, at least one time preference, at least one predictive preference, at least one historical preference, at least one efficiency preference, at least one event inclusion preference, at least one event exclusion preference, at least one traffic based preference, at least one road condition preference, at least one weather condition preference, at least one duration of conveyance service preference, at least one conveyance service request density preference, at least one conveyance client density preference, at least one conveyance client detail preference, at least one conveyance client rating preference, at least one representative density preference, at least one autonomous vehicle density preference, at least one service provider inclusion preference, at least one service provider exclusion preference, at least one service provider density preference, at least one level of service preference, at least one good supplier inclusion preference, at least one good supplier exclusion preference, at least one good supplier density preference, at least one good detail preference, at least one conveyance industry segment preference, at least one freight preference, at least one waypoint preference, at least one delivery service preference, or a combination thereof.

As a non-limiting example, if at least one conveyance service request density preference is selected as at least one selected preference, at least one service provider can strategically position at least one autonomous vehicle in at least one area of greater supply of at least one conveyance service request. As a non-limiting example, if at least one service provider inclusion preference is selected by at least one owner or at least one controller of at least one autonomous vehicle, then preferably at least one conveyance service request from at least one selected service provider can be identified as at least one preferred conveyance service request. As a non-limiting example, if at least one weather preference is selected, then preferably at least one conveyance service request without at least one route through at least one area with inclement weather, such as snow, can be identified as at least one preferred conveyance service request. As a non-limiting example, at least one selected preference can be transmitted from at least one owner or controller application to at least one central server. As a non-limiting example when at least one individual selected preference has at least one equal weight, at least one industry segment preference can have 25% weight, at least one service provider inclusion preference can have 25% weight, at least one pricing preference can have 25% weight, and at least one good detail preference can have 25% weight, which can be used to identify at least one preferred conveyance service request when determining which at least one filtered conveyance service request has at least one highest weighted average.

As a non-limiting example, at least one selected preference can be used for at least one individual conveyance industry segment. As a non-limiting example, at least one selected preference can be used for at least one individual service provider. As a non-limiting example, at least one owner or at least one controller of at least one autonomous vehicle or at least one service provider can specify at least one selected preference to work in at least one given area by using at least one geographical location preference. As a non-limiting example, at least one owner or at least one controller of at least one autonomous vehicle or at least one service provider can specify at least one selected preference to work in a five-mile perimeter by using at least one geographical location preference.

As a non-limiting example, at least one selected preference can be provided or inputted by at least one owner or at least one controller of at least one autonomous vehicle or at least one service provider into at least one application or at least one owner or controller application and can be stored or cached on at least one application, at least one owner or controller application, at least one central server, or a combination thereof. As a non-limiting example, at least one selected preference can be transmitted from at least one application to at least one central server by way of at least one link between at least one application and at least one central server. As a non-limiting example, at least one selected preference can be transmitted from at least one owner or controller application to at least one central server by way of at least one link between at least one owner or controller application and at least one central server. As a non-limiting example, at least one selected preference, at least one real time or near real time geographical location of at least one autonomous vehicle, or a combination thereof, can be transmitted from at least one application or at least one owner or controller application to at least one central server at any time prior to filtering or the like at least one conveyance service request.

Geographical Location of at Least One Representative, Autonomous Vehicle, Conveyance Client, Service Provider, or Good Supplier At least one geographical location of at least one representative can be but is not limited to at least one geographical location, at least one coordinate, at least one position, or at least one place where at least one representative can be at any given point in time. At least one geographical location of at least one representative, at least one autonomous vehicle, at least one conveyance client, at least one service provider, at least one good supplier, or a combination thereof, can be for example in real time or near real time.

At least one geographical location of at least one conveyance client can be but is not limited to at least one geographical location, at least one coordinate, at least one position, or at least one place where at least one conveyance client can be at any given point in time. At least one geographical location of at least one autonomous vehicle can be but is not limited to at least one geographical location, at least one coordinate, at least one position, or at least one place where at least one autonomous vehicle can be at any given point in time. At least one geographical location of at least one service provider can be but is not limited to at least one geographical location, at least one coordinate, at least one position, or at least one place where at least one service provider can be at any given point in time. At least one geographical location of at least one good supplier can be but is not limited to at least one geographical location, at least one coordinate, at least one position, or at least one place where at least one good supplier can be at any given point in time.

At least one geographical location of at least one representative, at least one autonomous vehicle, at least one conveyance client, at least one service provider, at least one good supplier, or a combination thereof, can be for example displayed on at least one visual representation.

At least one geographical location of any individual person, machine, entity, or a combination thereof, can be updated or refreshed in real time or near real time and can refer to being updated or refreshed in the highest level of development or state of the art. At least one geographical location of any individual person, machine, entity, or a combination thereof, can be used to perform at least one function in real time or near real time being updated or refreshed in the highest level of development or state of the art. At least one geographical location can be pre-set on including but not limited to at least one central server, at least one application, at least one owner or controller application, or a combination thereof. At least one geographical location of at least one representative, at least one autonomous vehicle, at least one conveyance client, at least one service provider, at least one good supplier, or a combination thereof, can relate to at least one service provider operating in at least one conveyance industry segment.

As a non-limiting example, at least one geographical location of at least one representative, at least one autonomous vehicle, at least one conveyance client, at least one service provider and/or at least one good supplier can be used for respective density preferences. As a non-limiting example, at least one geographical location of at least one representative, at least one autonomous vehicle, at least one conveyance client, at least one service provider, at least one good supplier, or a combination thereof, can relate to at least one individual service provider operating in at least one individual conveyance industry segment.

As a non-limiting example, at least one geographical location of at least one representative, at least one autonomous vehicle, at least one conveyance client, at least one service provider, at least one good supplier, or a combination thereof, can be static or non-real time. As a non-limiting example, at least one geographical location of at least one good supplier can be static or non-real time as it can relate to at least one brick and mortar geographical location.

Beginning Service Geographical Location

At least one beginning service geographical location can be but is not limited to at least one geographical location for example requested by at least one conveyance client where at least one conveyance service begins or is requested. At least one beginning service geographical location need not be at least one real time or near real time geographical location of at least one conveyance client. At least one beginning service geographical location can be updated or refreshed in real time or near real time and can refer to being updated or refreshed in the highest level of development or state of the art. At least one beginning service geographical location can be used to perform at least one function in real time or near real time being updated or refreshed in the highest level of development or state of the art. At least one beginning service geographical location can be pre-set on including but not limited to at least one central server, at least one external server, at least one application, or a combination thereof: At least one beginning service geographical location can be associated with at least one conveyance service request.

As a non-limiting example, at least one beginning service geographical location can be static or non-real time. As a non-limiting example, at least one representative or at least one autonomous vehicle can pick up at least one conveyance client at at least one beginning service geographical location.

Ending Service Geographical Location

At least one ending service geographical location can be but is not limited to at least one geographical location for example requested by at least one conveyance client where at least one conveyance service ends. At least one ending service geographical location can be modified before and/or during at least one conveyance service. At least one ending service geographical location can include at least one waypoint. At least one ending service geographical location can be updated or refreshed in real time or near real time and can refer to being updated or refreshed in the highest level of development or state of the art. At least one ending service geographical location can be used to perform at least one function in real time or near real time being updated or refreshed in the highest level of development or state of the art. At least one ending service geographical location can be pre-set on including but not limited to at least one central server, at least one external server, at least one application, or a combination thereof. At least one ending service geographical location can be associated with at least one conveyance service request.

As a non-limiting example, at least one ending service geographical location can be static or non-real time. As a non-limiting example, at least one representative or at least one autonomous vehicle can drop off at least one conveyance client at at least one ending service geographical location.

Conveyance Industry Segment

The conveyance industry can be for example an industry categorized by the transportation of someone or something from at least one geographical location to at least one other geographical location. At least one conveyance industry segment can be for example a smaller part of the overall conveyance industry as a whole, categorized by different limiting characteristics. At least one conveyance industry segment can be updated or refreshed in real time or near real time and can refer to being updated or refreshed in the highest level of development or state of the art. At least one service provider can operate in at least one conveyance industry segment. At least one conveyance service request can be associated with at least one conveyance industry segment.

As a non-limiting example, at least one conveyance industry segment can be but is not limited to at least one ride-hail industry segment, at least one ride-share industry segment, at least one car-share industry segment, at least one peer-to-peer conveyance industry segment, at least one person delivery industry segment, at least one taxi industry segment, at least one good delivery industry segment, at least one freight industry segment, at least one medical service and delivery industry segment, at least one food delivery industry segment, at least one courier industry segment, at least one animal delivery industry segment, or a combination thereof.

As a non-limiting example, at least one individual service provider can operate in at least one individual conveyance industry segment. As a non-limiting example, the present invention can allow at least one representative or at least one autonomous vehicle to provide a ride in the ride-hail industry segment and deliver food in the food delivery industry segment relating to at least one similar service provider for at least one conveyance client.

EXAMPLES

Example 1

General Description of Preferred Elements and Preferred Interactions Thereof

This general description of some but not all elements of some but not all aspects and embodiments of the present inventions disclosed relate to some preferred non-limiting aspects of at least one exemplary system of the present invention and at least one exemplary method of use of at least one system of the present invention at least one conveyance industry segment, particularly as set forth in the figures and the description thereof. Not all of these elements need be used in the present invention, other elements can be included or some elements removed, and inventions without any of these elements can be part of the present invention. Numerical references refer to those in the figures. The following are elements shown in FIG. 1 through FIG. 8.

At least one conveyance client 1 can be but is not limited to at least one person, at least one robot, at least one machine, or a combination thereof, that can receive at least one conveyance service. At least one conveyance client 1 does not necessarily have to be at least one consumer of at least one service.

At least one representative 2 can be but is not limited to at least one person, at least one robot, at least one machine, or a combination thereof, that can analyze or evaluate and then preferably secure or obtain at least one preferred conveyance service request 17. At least one representative 2 can provide or perform at least one conveyance service of including but not limited to at least one person, at least one good, at least one thing, at least one article, at least one item, at least one conveyance client 1, or a combination thereof. At least one representative 2 can input or provide at least one representative preference 18 used to identify at least one preferred conveyance service request 17. At least one representative 2 can provide or perform at least one conveyance service relating to at least one service provider 5 operating in at least one conveyance industry segment. At least one representative 2 can accept or decline at least one preferred conveyance service request 17.

At least one autonomous vehicle 3 can be for example at least one self-governing machine, at least one self-maneuvering machine, at least one self-driving machine, or the like, that can be used to provide or perform at least one conveyance service of including but not limited to at least one person, at least one good, at least one article, at least one thing, at least one item, at least one conveyance client 1, or a combination thereof. At least one autonomous vehicle 3 can perform or provide at least one conveyance service relating to at least one service provider 5 operating in at least one conveyance industry segment. At least one autonomous vehicle 3 can include hardware and/or software alone or in a combination.

At least one owner or at least one controller of at least one autonomous vehicle 4 can be but is not limited to at least one entity, at least one business, at least one person, at least one robot, at least one machine, or a combination thereof, that can own or control at least one autonomous vehicle 3. At least one owner or at least one controller of at least one autonomous vehicle 4 can input or provide at least one selected preference 19 used to identify at least one preferred conveyance service request 17. At least one owner or at least one controller of at least one autonomous vehicle 4 can accept or decline at least one preferred conveyance service request 17. At least one owner or at least one controller of at least one autonomous vehicle 4 can be at least one service provider 5.

At least one service provider 5 can be for example at least one entity or at least one business that can retain or contract with including but not limited to at least one representative 2, at least one autonomous vehicle 3, at least one good supplier, or a combination thereof. At least one service provider 5 can facilitate at least one conveyance service between including but not limited to at least one representative 2, at least one autonomous vehicle 3, at least one good supplier, at least one conveyance client 1, at least one owner or at least one controller of at least one autonomous vehicle 4, or a combination thereof. At least one service provider 5 can operate in at least one conveyance industry segment. At least one service provider 5 can be at least one owner or at least one controller of at least one autonomous vehicle 4.

At least one application 6 can be but is not limited to software accessible through at least one terminal 7. At least one application 6 can be for example used to analyze, evaluate, secure, obtain, accept, or decline at least one preferred conveyance service request 17. At least one application 6 can display including but not limited to at least one preferred conveyance service request 17. At least one representative 2 can input or provide at least one representative preference 18 into at least one application 6. At least one application 6 can display including but not limited to at least one visual representation 12.

At least one terminal 7 can be but is not limited to at least one electronic computing device. At least one terminal 7 can include but is not limited to at least one computer processor, at least one computer readable memory, at least one input source, at least one geographical location module, at least one display, at least one network interface, or a combination thereof. At least one terminal 7 can be capable of communicating by way of at least one link 8. At least one terminal 7 can be used to access at least one application 6. At least one terminal 7 can encompass hardware and/or software alone or in a combination. At least one terminal 7 can be associated with at least one autonomous vehicle 3.

At least one link 8 can be but is not limited to at least one electronic communication network channel. At least one link 8 can be at least one combination of connections between including but not limited to at least one central server 9, at least one external server 10, a least one terminal 7, at least one application 6, at least one autonomous vehicle 3, at least one owner or controller application 11, or a combination thereof. At least one link 8 can encompass hardware and/or software alone or in a combination.

At least one central server 9 can execute at least one operation of the present invention including but not limited to receiving, transmitting, storing, standardizing, aggregating, and filtering at least one conveyance service request 15 and identifying at least one preferred conveyance service request 17 for at least one representative 2 or at least one autonomous vehicle 3. At least one central server 9 can include but is not limited to at least one computer processor, at least one computer readable memory, at least one network interface, or a combination thereof. At least one central server 9 can connect to or communicate with including but not limited to at least one external server 10, at least one application 6, at least one terminal 7, at least one owner or controller application 11, at least one autonomous vehicle 3, or a combination thereof, by way of at least one link 8. At least one central server 9 can include or connect to at least one database. At least one central server 9 can encompass hardware and/or software alone or in a combination.

At least one external server 10, can be but is not limited to at least one source of at least one conveyance service request 15 in conjunction with corresponding conveyance data. At least one external server 10 can include but is not limited to at least one computer processor, at least one computer readable memory, at least one network interface, or a combination thereof. At least one external server 10 can connect to or communicate with at least one central server 9, at least one application 6, at least one terminal 7, at least one owner or controller application 11, at least one autonomous vehicle 3, or a combination thereof, by way of at least one link 8. At least one external server 10 can include or connect to at least one database. At least one external server 10 can encompass hardware and/or software alone or in a combination.

At least one owner or controller application 11 can be for example software appropriate for communicating with but not limited to at least one central server 9, at least one external server 10, at least one autonomous vehicle 3, at least one application 6, or a combination thereof, by way of at least one link 8. At least one owner or controller application 11 can be used by at least one owner or at least one controller of at least one autonomous vehicle 4 to input or provide at least one selected preference 19 that can be used to identify at least one preferred conveyance service request 17. At least one owner or controller application 11 can be used to analyze, evaluate, secure, obtain, accept, or decline at least one preferred conveyance service request 17. At least one owner or controller application 11 can display at least one preferred conveyance service request 17 to be accepted or declined. At least one owner or controller application 11 can display at least one secured or obtained preferred conveyance service request 17.

At least one visual representation 12 can be at least one tool used to assist at least one representative 2 analyze or evaluate at least one conveyance service request 15 or at least one conveyance service request metric on, for example, at least one geographical map to secure or obtain at least one preferred conveyance service request 17. At least one visual representation 12 can be viewed from including but not limited to at least one perspective, at least one point of reference, at least one point of interest, or a combination thereof.

At least one Representative Automated Platform 13, automated in whole or in part, can for example continuously or repeatedly analyze or evaluate at least one conveyance service request 15 in real time or near real time relating to at least one representative preference 18 and preferably at least one real time or near real time geographical location of at least one representative 2 to secure or obtain at least one preferred conveyance service request 17 for at least one representative 2. At least one Representative Automated Platform 13 can preferably secure or obtain at least one subsequent or additional preferred conveyance service request 17 after at least one first preferred conveyance service request 17 is secured or obtained, while at least one real time or near real time geographical location of at least one representative 2 updates or changes. At least one Representative Automated Platform 13 can secure or obtain at least one preferred conveyance service request 17 relating to at least one service provider 5 operating in at least one conveyance industry segment.

At least one Autonomous Vehicle Automated Platform 14, automated in whole or in part, can for example continuously or repeatedly analyze or evaluate at least one conveyance service request 15 in real time or near real time relating to at least one selected preference 19 and preferably at least one real time or near real time geographical location of at least one autonomous vehicle 3 to secure or obtain at least one preferred conveyance service request 17 for at least one autonomous vehicle 3. At least one Autonomous Vehicle Automated Platform 14, can preferably secure or obtain at least one subsequent or additional preferred conveyance service request 17 after at least one first preferred conveyance service request 17 is secured or obtained, while at least one real time or near real time geographical location of at least one autonomous vehicle 3 updates or changes. At least one Autonomous Vehicle Automated Platform 14, can secure or obtain at least one preferred conveyance service request 17 relating to at least one service provider 5 operating in at least one conveyance industry segment.

At least one conveyance service request 15 can be for example at least one request for transportation of including but not limited to at least one person, at least one good, at least one article, at least one thing, at least one item, at least one conveyance client 1, or a combination thereof, from at least one geographical location to at least one other geographical location. At least one conveyance service request 15 can be but is not limited to at least one request from at least one conveyance client 1. At least one conveyance service request 15 can be sourced or provided from at least one external server 10. At least one conveyance service request 15 can be sourced or provided by at least one service provider 5. At least one conveyance service request 15 can be updated in real time or near real time.

At least one filtered conveyance service request 16 can be for example at least one conveyance service request 15 that can be filtered by using including but not limited to at least one representative preference 18, at least one real time or near real time geographical location of at least one representative 2, or a combination thereof. At least one filtered conveyance service request 16 can be but is not limited to at least one conveyance service request 15 that can be filtered by using at least one selected preference 19, at least one real time or near real time geographical location of at least one autonomous vehicle 3, or a combination thereof. At least one filtered conveyance service request 16 can be updated in real time or near real time.

At least one preferred conveyance service request 17 can be for example at least one filtered conveyance service request 16 that can be identified as preferred by including but not limited to at least one representative 2, at least one autonomous vehicle 3, at least one owner or at least one controller of at least one autonomous vehicle 4, at least one central server 9, at least one application 6, at least one owner or controller application 11, or a combination thereof. At least one preferred conveyance service request 17 can be identified as preferred for example by using at least one representative preference 18 or at least one selected preference 19. At least one preferred conveyance service request 17 can be updated in real time or near real time.

At least one representative preference 18 can be but is not limited to at least one option selected or provided by at least one representative 2 that can be used to filter at least one conveyance service request 15 and preferably identify at least one preferred conveyance service request 17. At least one representative preference 18 can be stored or cached on at least one central server 9, at least one external server 10, at least one application 6, or a combination thereof. At least one representative preference 18 can be inclusive or exclusive for filtering at least one conveyance service request 15.

At least one selected preference 19 can be but is not limited to at least one option selected or provided by at least one owner or at least one controller of at least one autonomous vehicle 4 that can be used to filter at least one conveyance service request 15 and preferably identify at least one preferred conveyance service request 17. At least one selected preference 19 can be stored or cached on at least one central server 9, at least one external server 10, at least one application 6, at least one owner or controller application 11, or a combination thereof. At least one selected preference 19 can be inclusive or exclusive for filtering of at least one conveyance service request 15.

Example 2

This example establishes some preferred non-limiting aspects of an exemplary system of the present invention and an exemplary method of use of a system of the present invention, automated in whole or in part, where at least one representative can benefit from the present invention, particularly as set forth in the figures and the description thereof. The following is a non-limiting example where at least one Representative Automated Platform is used by at least one representative. Numerical references refer to those in the figures. The following are steps of an exemplary method in a preferable but not required order. Generally see FIG. 1 and FIG. 2 for a non-limiting and exemplary system and FIG. 3 for a method of the present invention.

Step 1. At least one conveyance service request can be transmitted from at least one external server to at least one central server continuously in real time or near real time by way of at least one link Step 2. At least one conveyance service request can be stored, standardized, aggregated, or a combination thereof, at least once on at least one central server Step 3. At least one representative can use at least one terminal to access at least one application Step 4. At least one representative can be authenticated Step 5. At least one representative can input or provide at least one representative preference into at least one application Step 6. At least one representative preference and preferably at least one real time or near real time geographical location of at least one representative can be transmitted from at least one application to at least one central server by way of at least one link Step 7. At least one conveyance service request can be filtered by at least one central server using at least one representative preference and preferably at least one real time or near real time geographical location of at least one representative into at least one filtered conveyance service request Step 8. At least one filtered conveyance service request can preferably be sorted in at least one order relating to at least one weighted average of at least one representative preference to identify at least one preferred conveyance service request Step 9. At least one preferred conveyance service request can be identified by at least one central server as at least one filtered conveyance service request that has the highest weighted average from at least one filtered conveyance service request Step 10. At least one preferred conveyance service request can be transmitted from at least one central server to at least one application by way of at least one link Step 11. At least one application can, for example, display at least one pop-up with details, such as but not limited to price and at least one service provider of at least one preferred conveyance service request Step 12. At least one representative can, for example, decline at least one preferred conveyance service request Step 13. At least one new or different preferred conveyance service request can be identified by at least one central server in real time or near real time Step 14. At least one application can, for example, display at least one new or different pop-up with details, such as but not limited to price and at least one service provider of at least one new or different preferred conveyance service request Step 15. At least one representative can accept at least one new or different preferred conveyance service request Step 16. At least one central server can secure or obtain at least one accepted preferred conveyance service request Step 17. At least one secured or obtained preferred conveyance service request can be transmitted from at least one central server to at least one application by way of at least one link Step 18. At least one representative can perform at least one conveyance service relating to at least one secured or obtained preferred conveyance service request and at least one real time or near real time geographical location of at least one representative can update or change, while at least one Representative Automated Platform can analyze or evaluate at least one conveyance service request continuously in real time or near real time, and then preferably can secure or obtain at least one subsequent or additional preferred conveyance service request, until stopped by at least one representative The present non-limiting example can be applied to any conveyance of goods or services, however, the following is a non-limiting example in more than one conveyance industry segment. In this non-limiting example, a representative 2 can be a driver, a conveyance client 1 can be a passenger or recipient of a conveyance service, and preferred conveyance service requests 17 can be a delivery service request, a ride service request, and a food delivery service request.

In this non-limiting example, a representative 2 can use a Representative Automated Platform 13 to secure or obtain five preferred conveyance service requests 17. A representative 2 can provide conveyance services based on guidance provided by a Representative Automated Platform 13. Individual preferred conveyance service requests 17 can be secured or obtained and then preferably completed in any order as laid out by a Representative Automated Platform 13. A Representative Automated Platform 13 can apply representative preferences 18 to preferably enable only preferred conveyance service requests 17 to be accepted. A central server 9 can continuously receive conveyance service requests 15 from preferably more than one external server 10 by way of at least one link 8 in real time or near real time and can store, standardize, aggregate, and filter conveyance service requests 15 in real time or near real time. A central server 9 can preferably sort filtered conveyance service requests 16 in real time or near real time, or use another technique, to identify preferred conveyance service requests 17. A representative 2 can access an application 6 using a terminal 7 to gain knowledge of more than one conveyance industry segment, for example.

Once logged into an application 6, a representative 2 can input or provide, for example, representative preferences 18 into an application 6. In this non-limiting example, a representative 2 can input or provide two representative preferences 18, an efficiency preference and a service provider 5 inclusion preference. An efficiency preference can be, for example, a preference of three or more preferred conveyance service requests 17 within a specific geographical location that can be performed at the same time or during the same trip. A service provider 5 inclusion preference can be, for example, a preference to include three specific service providers 5 that a representative 2 holds accounts with.

For example, a central server 9 can filter out conveyance service requests 15 that do not match or satisfy the two representative preferences 18 for a representative 2. Benefits of representative preferences 18 can be to allow a representative 2 to better meet their criteria in providing conveyance services such as but not limited to higher earning potential, better efficiencies, more suitable conveyance service requests 15, or a combination thereof. The two representative preferences 18 for this example and preferably the real time or near real time geographical location of a representative 2 can be transmitted from an application 6 to a central server 9 by way of at least one link 8.

A central server 9 can filter conveyance service requests 15 into filtered conveyance service requests 16 by comparing to, for example, the two representative preferences 18 and preferably the real time or near real time geographical location of a representative 2. The conveyance service requests 15 that match the indicated two representative preferences 18 can be identified as filtered conveyance service requests 16. The conveyance service requests 15 that do not match the indicated two representative preferences 18 can be discarded or ignored as not being filtered conveyance service requests 16. The filtered conveyance service requests 16 can preferably be sorted by a weighted average of, for example, the two representative preferences 18 to identify preferred conveyance service requests 17. The representative preferences 18 can be but are not limited to unequal weights of, for example, 75% efficiency preference and, for example, 25% service provider 5 inclusion preference when calculating a weighted average. A representative 2 can optionally choose for representative preferences 18 to have equal or unequal weights. In this non-limiting example, a representative 2 can favor an efficiency preference more than working with specific service providers 5.

Preferably, the filtered conveyance service requests 16 with a highest weighted average can be identified as preferred conveyance service requests 17. For example, a central server 9 can identify preferred conveyance service requests 17 from filtered conveyance service requests 16 by preferably using the highest weighted averages of an efficiency preference and service provider 5 inclusion preference. Preferably, additional conveyance service requests 15 can be received and continuously filtered by a central server 9 into additional filtered conveyance service requests 16. Preferably, additional filtered conveyance service requests 16 can be sorted by a central server 9 into preferred conveyance service requests 17.

The preferred conveyance service requests 17 in conjunction with corresponding conveyance data can be transmitted from a central server 9 to an application 6 by way of at least one link 8. An application 6 can, for example, display a pop-up with details such as but not limited to price and a service provider 5 of preferred conveyance service requests 17. A representative 2 can analyze or evaluate preferred conveyance service requests 17 with corresponding conveyance data and can, for example, decline preferred conveyance service requests 17. New preferred conveyance service requests 17 can be identified by a central server 9 and can be, for example, displayed to a representative 2 via another pop-up on an application 6. Preferably, a representative 2 can accept new preferred conveyance service requests 17 and a central server 9 can secure or obtain new accepted preferred conveyance service requests 17 for a representative 2. Secured or obtained preferred conveyance service requests 17 can be transmitted from a central server 9 to an application 6 by way of at least one link 8.

A representative 2 can perform a conveyance service and the real time or near real time geographical location of a representative 2 can update or change, while a Representative Automated Platform 13 can continuously analyze or evaluate conveyance service requests 15 in real time or near real time, and then preferably secure or obtain subsequent or additional preferred conveyance service requests 17, until stopped by a representative 2.

In this non-limiting example, a Representative Automated Platform 13 can first secure or obtain three preferred conveyance service requests 17 relating to an individual good supplier in the good delivery industry segment accepted by a representative 2 (service request #1, #2, and #3).

For example, a representative 2 can begin performing the conveyance services and can pick up all three good deliveries to be conveyed from the good supplier. Before the completion of service requests #1, #2, and #3, a Representative Automated Platform 13 can, for example, secure or obtain a preferred conveyance service request 17 in the ride-hail industry segment (service request #4).

Preferably a representative 2 can begin service request #4 and pick up a conveyance client 1 at a beginning service geographical location then preferably drop off a conveyance client 1 at an ending service geographical location to complete service request #4. After completion of service request #4, a Representative Automated Platform 13 can, for example, secure or obtain a preferred conveyance service request 17 in the food delivery industry segment (service request #5).

Preferably a representative 2 can begin service request #5 and pick up the requested food at the good supplier geographical location then preferably drop off the requested food at an ending service geographical location to complete service request #5. After completion of service request #5, a Representative Automated Platform 13 can indicate to a representative 2 to complete service request #1, for example.

Preferably a representative 2 can drop off a delivery at an ending service geographical location to complete service request #1. Next, a Representative Automated Platform 13 can indicate to a representative 2 to complete service request #3, for example. Preferably a representative 2 can drop off a delivery at an ending service geographical location to complete service request #3. Lastly, a Representative Automated Platform 13 can indicate to a representative 2 to complete service request #2, for example. Preferably a representative 2 can drop off a delivery at an ending service geographical location to complete service request #2. A representative 2 can then, for example, turn off a Representative Automated Platform 13.

Example 3

This example establishes some preferred non-limiting aspects of an exemplary system of the present invention and an exemplary method of use of a system of the present invention, automated in whole or in part, where at least one owner or at least one controller of at least one autonomous vehicle can benefit from the present invention, particularly as set forth in the figures and the description thereof. The following is a non-limiting example where at least one Autonomous Vehicle Automated Platform is used by at least one autonomous vehicle. Numerical references refer to those in the figures. The following are steps of an exemplary method in a preferable but not required order. Generally see FIG. 4 and FIG. 5 for a non-limiting and exemplary system and FIG. 6 and FIG. 8 for a method of the present invention.

Step 1. At least one conveyance service request can be transmitted from at least one external server to at least one central server continuously in real time or near real time by way of at least one link Step 2. At least one conveyance service request can be stored, standardized, aggregated, or a combination thereof, at least once on at least one central server Step 3. At least one owner or at least one controller of at least one autonomous vehicle can input or provide at least one selected preference into at least one owner or controller application Step 4. At least one autonomous vehicle can connect to at least one application via at least one terminal Step 5. At least one autonomous vehicle can be authenticated Step 6. At least one selected preference can be transmitted from at least one owner or controller application to at least one central server by way of at least one link Step 7. Preferably at least one real time or near real time geographical location of at least one autonomous vehicle can be transmitted from at least one application to at least one central server by way of at least one link Step 8. At least one conveyance service request can be filtered by at least one central server using at least one selected preference and preferably at least one real time or near real time geographical location of at least one autonomous vehicle into at least one filtered conveyance service request Step 9. At least one filtered conveyance service request can preferably be sorted in at least one order relating to at least one weighted average of at least one selected preference to identify at least one preferred conveyance service request Step 10. At least one preferred conveyance service request can be identified by at least one central server as at least one filtered conveyance service request that has the highest weighted average from at least one filtered conveyance service request Step 11. At least one central server can secure or obtain at least one preferred conveyance service request Step 12. At least one secured or obtained preferred conveyance service request can be transmitted from at least one central server to at least one application by way of at least one link Step 13. At least one autonomous vehicle can perform at least one conveyance service relating to at least one secured or obtained preferred conveyance service request and at least one real time or near real time geographical location of at least one autonomous vehicle can update or change, while at least one Autonomous Vehicle Automated Platform can analyze or evaluate at least one conveyance service request continuously in real time or near real time, and then preferably can secure or obtain at least one subsequent or additional preferred conveyance service request, until stopped by at least one owner or at least one controller of at least one autonomous vehicle The present non-limiting example can be applied to any conveyance of goods or services, however, the following is a non-limiting example of an individual service provider 5 that owns or controls a fleet of autonomous vehicles 3 in more than one conveyance industry segment. Even though a fleet of autonomous vehicles 3 can be controlled or operated in a similar fashion, in this non-limiting example, the focus is on one autonomous vehicle 3 being controlled or operated by a service provider 5. In this non-limiting example, a conveyance client 1 can be a passenger or recipient of a conveyance service, an owner or controller of an autonomous vehicle 4 can be a service provider 5, and preferred conveyance service requests 17 can be a courier service request, a ride service request, and a food delivery service request.

An autonomous vehicle 3 can provide conveyance services based on guidance provided by an Autonomous Vehicle Automated Platform 14. Individual preferred conveyance service requests 17 can be secured or obtained and then preferably completed in any order as laid out by an Autonomous Vehicle Automated Platform 14. An Autonomous Vehicle Automated Platform 14 can apply selected preferences 19 to preferably enable only preferred conveyance service requests 17 to be accepted. A central server 9 can continuously receive conveyance service requests 15 from, for example, one external server 10 by way of at least one link 8 in real time or near real time and can store, standardize, aggregate, and filter conveyance service requests 15 in real time or near real time. A central server 9 can preferably sort filtered conveyance service requests 16 in real time or near real time, or use another technique, to identify preferred conveyance service requests 17.

An owner or controller of an autonomous vehicle 4 can input or provide, for example, selected preferences 19 into an owner or controller application 11. In this non-limiting example, an owner or controller of an autonomous vehicle 4 can input or provide two selected preferences 19, an industry segment preference and a geographical location preference. An industry segment preference can be, for example, that an autonomous vehicle 3 can provide conveyance services in a courier industry segment, ride-hail industry segment, and food delivery industry segment. A geographical location preference can be, for example, that an autonomous vehicle 3 can provide conveyance services in a certain quadrant or geographical area. A service provider 5 can control where an autonomous vehicle 3 can provide conveyance services across a city or place. For example, a central server 9 can filter out conveyance service requests 15 that do not match or satisfy criteria of the selected preferences 19 for an owner or controller of an autonomous vehicle 4.

Benefits of selected preferences 19 can be to allow an owner or controller of an autonomous vehicle 4 to better meet their criteria in providing conveyance services such as but not limited to higher earning potential, better efficiencies, greater number of conveyance services provided, more suitable conveyance service requests 15, or a combination thereof. The two selected preferences 19 for this example can be transmitted from an owner or controller application 11 to a central server 9 by way of at least one link 8. Preferably the real time or near real time geographical location of an autonomous vehicle 3 can be transmitted from an application 6 to a central server 9 by way of at least one link 8.

A central server 9 can communicate with an autonomous vehicle 3 by using an application 6 on a terminal 7 associated with an autonomous vehicle 3. An autonomous vehicle 3 can connect to an application 6 via a terminal 7 and can be authenticated.

A central server 9 can filter conveyance service requests 15 into filtered conveyance service requests 16 by comparing to, for example, the two selected preferences 19 and preferably the real time or near real time geographical location of an autonomous vehicle 3. The conveyance service requests 15 that match the indicated two selected preferences 19 can be identified as filtered conveyance service requests 16. The conveyance service requests 15 that do not match the indicated two selected preferences 19 can be discarded or ignored as not being filtered conveyance service requests 16. The filtered conveyance service requests 16 can preferably be sorted by a weighted average of, for example, the two selected preferences 19 to identify preferred conveyance service requests 17. An owner or controller of an autonomous vehicle 4 can optionally choose for selected preferences 19 to have equal or unequal weights. The selected preferences 19 can be but are not limited to equal weights, for example, of 50% when calculating a weighted average.

The selected preferences 19 chosen by an owner or controller of an autonomous vehicle 4 can optionally be given unequal weights, for example but not limited to 70% and 30%. In this non-limiting specific example, an industry segment preference can be given a weight of 70% and can be set to include the ride-hail industry, courier industry, and food delivery industry by an owner or controller of an autonomous vehicle 4. The filtered conveyance service requests 16 in the ride-hail industry, courier industry, or food delivery industry can be assigned a score of 10 out of 10 by a central server 9. The filtered conveyance service requests 16 not in the ride-hail industry, courier industry, or food delivery industry can be assigned a score of 0 out of 10 by a central server 9. A geographical location preference can be given a weight of 30% and can be set by an owner or controller of an autonomous vehicle 4 to include filtered conveyance service requests 16 within an area or a perimeter of five miles from the real time or near real time geographical location of an autonomous vehicle 3. The filtered conveyance service requests 16 within one mile from the real time or near real time geographical location of an autonomous vehicle 3 can be assigned a score of 10 out of 10 by a central server 9. The filtered conveyance service requests 16 within two miles from the real time or near real time geographical location of an autonomous vehicle 3 can be assigned a score of 8 out of 10 by a central server 9. The filtered conveyance service requests 16 within three miles from the real time or near real time geographical location of an autonomous vehicle 3 can be assigned a score of 6 out of 10 by a central server 9. The filtered conveyance service requests 16 within four miles from the real time or near real time geographical location of an autonomous vehicle 3 can be assigned a score of 4 out of 10 by a central server 9. The filtered conveyance service requests 16 within five miles from the real time or near real time geographical location of an autonomous vehicle 3 can be assigned a score of 2 out of 10 by a central server 9. The filtered conveyance service requests 16 more than five miles away from the real time or near real time geographical location of an autonomous vehicle 3 can be assigned a score of 0 out of 10 by a central server 9. For example, a filtered conveyance service request 16 in the ride-hail industry within three miles from the real time or near real time geographical location of an autonomous vehicle 3 can be calculated or determined by a central server 9 as having a weighted average of (70% of 10) plus (30% of 6) that can equal 8.8 based on an industry segment preference and a geographical location preference. A filtered conveyance service request 16 with the highest weighted average of 8.8 in this instance can be identified as a preferred conveyance service request 17 in comparison to other filtered conveyance service requests 16 with lower weighted averages.

Preferably, a filtered conveyance service request 16 with the highest weighted average can be identified as a preferred conveyance service request 17. For example, a central server 9 can identify a preferred conveyance service request 17 from filtered conveyance service requests 16 by preferably using the highest weighted average of an industry segment preference and a geographical location preference. Preferably, additional conveyance service requests 15 can be received and continuously filtered by a central server 9 into additional filtered conveyance service requests 16. Preferably, additional filtered conveyance service requests 16 can be sorted by a central server 9 into preferred conveyance service requests 17 when appropriate.

A central server 9 can secure or obtain a preferred conveyance service request 17 for an autonomous vehicle 3. A secured or obtained preferred conveyance service request 17 can be transmitted from a central server 9 to an application 6 in an autonomous vehicle 3 by way of at least one link 8.

An autonomous vehicle 3 can perform a conveyance service and the real time or near real time geographical location of an autonomous vehicle 3 can update or change, while an Autonomous Vehicle Automated Platform 14 can analyze or evaluate conveyance service requests 15 continuously in real time or near real time, and then preferably secure or obtain subsequent or additional preferred conveyance service requests 17, until stopped by an owner or controller of an autonomous vehicle 4.

In this non-limiting example, an Autonomous Vehicle Automated Platform 14 can be used by an autonomous vehicle 3 to secure or obtain, for example, three preferred conveyance service requests 17. Preferably an autonomous vehicle 3 can perform or provide conveyance services based on guidance provided by an Autonomous Vehicle Automated Platform 14. Individual preferred conveyance service requests 17 can be secured or obtain and then preferably completed in any order as laid out by an Autonomous Vehicle Automated Platform 14. In this non-limiting example, an Autonomous Vehicle Automated Platform 14 can first accept a preferred conveyance service request 17 in the courier industry segment (service request #1).

For example, an autonomous vehicle 3 can begin the conveyance service and can pick up a package to be conveyed. A package can be placed in an autonomous vehicle 3. Before the completion of service request #1, an Autonomous Vehicle Automated Platform 14 can, for example, secure or obtain an additional preferred conveyance service request 17 in the ride-hail industry segment (service request #2).

Preferably an autonomous vehicle 3 can begin service request #2 and pick up a conveyance client 1 at a beginning service geographical location then preferably drop off a conveyance client 1 at an ending service geographical location to complete service request #2. After completion of service request #2, an Autonomous Vehicle Automated Platform 14 can, for example, secure or obtain an additional preferred conveyance service request 17 in the food delivery industry (service request #3).

Preferably an autonomous vehicle 3 can begin service request #3 and the food to be delivered can be placed in an autonomous vehicle 3 at a good supplier geographical location. An autonomous vehicle 3 can drop off the food delivery at an ending service geographical location to complete service request #3, for example. After completion of service request #3 an Autonomous Vehicle Automated Platform 14 can, for example, indicate to an autonomous vehicle 3 to complete service request #1. An autonomous vehicle 3 can drop off the package at an ending service geographical location to complete service request #1, for example. An owner or controller of an autonomous vehicle 4 can then, for example, turn off an Autonomous Vehicle Automated Platform 14.

Example 4

This example establishes some preferred non-limiting aspects of an exemplary system of the present invention and an exemplary method of use of a system of the present invention, automated in whole or in part, where at least one representative can benefit from the present invention, particularly as set forth in the figures and the description thereof. The following is a non-limiting example where at least one Representative Automated Platform is used by at least one representative. Numerical references refer to those in the figures. The following are steps of an exemplary method in a preferable but not required order. Generally see FIG. 7 for both a non-limiting and exemplary system and for a method of the present invention.

The present non-limiting example can illustrate how conveyance service requests 15 can become filtered conveyance service requests 16 and then a preferred conveyance service request 17. In this non-limiting example, a representative 2 can be a driver, a conveyance client 1 can be a passenger or recipient of a conveyance service, and a preferred conveyance service request 17 can be a ride service request. In this non-limiting example, a representative 2 can use a Representative Automated Platform 13 to secure or obtain a preferred conveyance service request 17.

A central server 9 can receive conveyance service requests 15 from an external server 10 continuously or repeatedly in real time or near real time. A central server 9 can store, standardize, aggregate, or a combination thereof, conveyance service requests 15 in any order. A representative 2 can input or provide two representative preferences 18, the real time or near real time geographical location of a representative, or a combination thereof, to a central server 9.

A central server 9 can compare conveyance service requests 15 to the real time or near real time geographical location of a representative 2 and discard or ignore conveyance service requests 15 being further than 10 miles perimeter. A subset of conveyance service requests 15 within 10 miles perimeter that also match or satisfy an industry segment preference can be identified as filtered conveyance service requests 16.

In this non-limiting specific example, an industry segment preference can be given a weight of 40% and can be set to include only the ride-hail industry segment by a representative 2. The filtered conveyance service requests 16 in a ride-hail industry segment can be assigned a score of 10 out of 10 by a central server 9. The filtered conveyance service requests 16 not in a ride-hail industry segment can be assigned a score of 0 out of 10 by a central server 9.

A pricing preference can be given a weight of 60% and can be set by a representative 2 to include filtered conveyance service requests 16 with at least $10.00 revenue per conveyance service performed.

The filtered conveyance service requests 16 with less than $10.00 revenue can be assigned a score of 0 out of 10 by a central server 9. The filtered conveyance service requests 16 with pricing being $10.00-$14.99 revenue can be assigned a score of 4 out of 10 by a central server 9. The filtered conveyance service requests 16 with pricing being $15.00-$19.99 revenue can be assigned a score of 7 out of 10 by a central server 9. The filtered conveyance service requests 16 with pricing of $20.00 or more in revenue can be assigned a score of 10 out of 10 by a central server 9.

For example, a filtered conveyance service request 16 in a ride-hail industry segment with pricing being $17.00 can be calculated or determined by a central server 9 as having a weighted average of (40% of 10) plus (60% of 7) that can equal 8.2 based on an industry segment preference and a pricing preference. A filtered conveyance service request 16 can preferably be sorted in an ascending order relating to a weighted average of 8.2 in this instance and can be identified as a preferred conveyance service request 17 in comparison to other filtered conveyance service requests 16 with lower weighted averages.

A Representative Automated Platform 13 can secure or obtain a preferred conveyance service request 17 in a ride-hail industry segment with pricing being $17.00. A representative 2 can perform a conveyance service and the real time or near real time geographical location of a representative 2 can update or change, while a Representative Automated Platform 13 can continuously analyze or evaluate conveyance service requests 15 in real time or near real time, and then preferably secure or obtain a subsequent or additional preferred conveyance service request 17, until stopped by a representative 2. At least one function of a central server 9 can be performed by an application 6.

Example 5

This example establishes some preferred non-limiting aspects of an exemplary system of the present invention and an exemplary method of use of a system of the present invention, automated in whole or in part, where at least one owner or at least one controller of at least one autonomous vehicle can benefit from the present invention, particularly as set forth in the figures and the description thereof. The following is a non-limiting example where at least one Autonomous Vehicle Automated Platform is used by at least one autonomous vehicle. Numerical references refer to those in the figures. The following are steps of an exemplary method in a preferable but not required order. Generally see FIG. 7 for both a non-limiting and exemplary system and for a method of the present invention.

The present non-limiting example can illustrate how conveyance service requests 15 can become filtered conveyance service requests 16 and then a preferred conveyance service request 17. The present non-limiting example can be applied to any conveyance of goods or services, however, the following is a non-limiting example in a food delivery industry segment. In this non-limiting example, a conveyance client 1 can be a person that can order food, an autonomous vehicle 3 can perform a conveyance service, an owner or controller of an autonomous vehicle 4 can be a private owner of an autonomous vehicle 3, and a preferred conveyance service request 17 can be a food delivery service request.

A central server 9 can receive conveyance service requests 15 from external servers 10 continuously or repeatedly in real time or near real time and can pre-categorize conveyance service requests 15 by zip code. A central server 9 can store, standardize, aggregate, or a combination thereof, conveyance service requests 15 in any order. An owner or controller of an autonomous vehicle 4 can input or provide one selected preference 19 to a central server 9. The real time or near real time geographical location of an autonomous vehicle 3 can be transmitted from an application 6 to a central server 9 by way of at least one link 8.

A central server 9 can compare pre-categorized conveyance service requests 15 to the real time or near real time geographical location of an autonomous vehicle 3 and discard or ignore conveyance service requests 15 being in a different zip code area other than an autonomous vehicle 3. A subset of conveyance service requests 15 within the zip code area of an autonomous vehicle 3 that also matches or satisfies an estimated time of arrival preference can be identified as filtered conveyance service requests 16.

In this non-limiting specific example, an estimated time of arrival preference can be given a weight of 100% and can be set by an owner or controller of an autonomous vehicle 4 to less than twenty minutes from an autonomous vehicle 3. The filtered conveyance service requests 16 with an estimated time of arrival of more than twenty minutes can be assigned a score of 10 out of 10 by a central server 9. The filtered conveyance service requests 16 with an estimated time of arrival of less than or equal to twenty minutes can be assigned a score of 0.5 per minute by a central server 9. For example, a filtered conveyance service request 16 with an estimated time of arrival of fourteen minutes can be assigned a score of 7 out of 10 or a filtered conveyance service request 16 with an estimated time of arrival of six minutes can be assigned a score of 3 out of 10.

For example, a filtered conveyance service request 16 in a food delivery industry segment with an estimated time of arrival of four minutes can be calculated or determined by a central server 9 as having a weighted average of (100% of 2) that can equal 2 based on an estimated time of arrival preference. A minimum function can be utilized to identify a filtered conveyance service request 16 having the lowest weighted average in comparison to other filtered conveyance service requests 16 with higher weighted averages as a preferred conveyance service request 17.

All publications, including patent documents and scientific articles, referred to in this application and the bibliography and attachments are incorporated by reference in their entirety for all purposes to the same extent as if each individual publication were individually incorporated by reference.

All headings and titles are for the convenience of the reader and should not be used to limit the meaning of the text that follows the heading, unless so specified. When the singular is referred to, the plural is also included; and when the plural is referred to the singular is also included.

What is claimed is:

1. A network for securing one or more conveyance services for a conveyance client by at least one autonomous vehicle (AV) operated by an owner/controller and in communication with the network, wherein the conveyance client has a conveyance client device in communication with the network for submitting conveyance service requests, the network comprising:
    at least one external server in communication with the network, the at least one external server associated with a business entity that provides goods or services and configured for receiving the conveyance service requests from the conveyance client, wherein the conveyance service requests comprise a plurality of features including conveyance data, at least a portion of conveyance data comprising autonomous vehicle (AV)-related data for the at least one AV;
    at least one central server in communication with the network, wherein the at least one central server is automated in whole or in part and configured for repeatedly receiving the conveyance service requests from the at least one external server;
    at least one autonomous vehicle (AV) application associated with the at least one AV, the at least one AV application configured for communicating one or more of geographical location data and conveyance data to the network;
    at least one owner/controller application in communication with the network, the at least one owner/controller application configured for entry by the owner/controller of one or more owner/controller-selected preference;
    wherein the at least one central server is further configured to process at least one feature of the conveyance service requests, conveyance data, the geographical location data, and the one or more owner/controller-selected preference, and to execute the steps of:
        (a) performing one or more of standardizing and aggregating the conveyance service requests;
        (b) filtering the conveyance service requests using one or a combination of the one or more owner/controller-selected preference and the geographical location data to identify a filtered subset of conveyance service requests;
        (c) identifying one or more matches between the filtered subset of conveyance service requests and the at least one AV based on one or a combination of the one or more owner/controller-selected preference and the geographical location data;
        (d) securing the one or more matches;
        (e) communicating one or more of the one or more matches and conveyance service instructions to the at least one AV to perform the one or more conveyance services for the conveyance client; and
        wherein the at least one central server is further configured to continuously repeat steps (a) through (e) for additional conveyance service requests, until halted by the owner/controller or the business entity.

2. The network of claim 1, wherein the business entity comprises one or more of a service provider, a good supplier, and the owner/controller.

3. The network of claim 1, wherein the at least one external server comprises a plurality of external servers, and wherein a first business entity is associated with a first external server and a second business entity is associated with a second external server.

4. The network of claim 1, wherein the at least one external server comprises a plurality of external servers, and wherein each external server is associated with a different business entity.

5. The network of claim 1, wherein at least a portion of the conveyance service requests are structured in at least one different format, wherein the at least one central server is further configured to standardize the differently-formatted portion into at least one uniform format.

6. The network of claim 1, wherein at least a portion of the conveyance service requests are pre-structured in at least one uniform format prior to being transmitted to the at least one central server by the at least one external server.

7. The network of claim 1, wherein at least a portion of conveyance data within the conveyance service requests is pre-set by the at least one external server or the owner/controller.

8. The network of claim 1, wherein one or more of the at least one AV, the owner/controller, and the conveyance client operates within a freight industry segment.

9. The network of claim 1, wherein conveyance data comprises at least one data type selected from data corresponding to a geographical location of one or more of beginning service, ending service, the conveyance client, a representative, the at least one AV, a service provider, a freight provider, the business entity, a good supplier, a logistics provider, the owner/controller, a fleet manager, and a point of interest, data corresponding to one or more of pricing, data corresponding to one or more of timing, duration, route, traffic, and arrival, data corresponding to preferences of one of more of the conveyance client, the owner/controller, and the representative, and data corresponding to details about one or more of the conveyance client, the representative, the at least one AV, the service provider, the freight provider, the business entity, the good supplier, the logistics provider, the owner/controller, the fleet manager, an industry segment, and one or more items to be conveyed.

10. The network of claim 1, wherein the one or more owner/controller-selected preference comprises one or more service characteristic selected from pricing, geographical location, distance, route, service duration, estimated time of arrival, beginning service geographical location, ending service geographical location, the geographical location data, time, predictive, historical, efficiency, sensor, event, traffic, road condition, weather condition, transportation, route planning, fuel economy, battery longevity, vehicle capacity, vehicle diagnostic, the AV-related data, conveyance data, duration of conveyance service, conveyance service request density, conveyance client density, conveyance client detail, representative density, autonomous vehicle density, service provider, service provider density, level of service, good supplier, good supplier density, owner/controller detail, owner/controller density, fleet manager, the business entity, business entity density, fleet manager density, logistics provider, logistics provider density, freight provider, freight provider density, good detail, conveyance industry segment, freight, waypoint, and delivery service.

11. The network of claim 1, wherein the conveyance service requests are selected from requests for service comprising one or more of ride-hail, ride-share, car-share, peer-to-peer conveyance, transportation, person delivery, taxi, shuttle, item delivery, medical delivery, food delivery, freight delivery, and animal delivery.

12. The network of claim 1, wherein the owner/controller comprises one or more of an enterprise, a service provider, a good supplier, a fleet manager, a freight provider, a logistics provider, the business entity, a map provider, a courier, a representative, a private owner/controller, and an individual person.

13. The network of claim 1, wherein the one or more owner/controller-selected preference is inputted by the owner/controller into the at least one owner/controller application and stored or cached on one or more of the at least one owner/controller application, the at least one AV application, the at least one central server, and the at least one external server.

14. The network of claim 1, wherein the geographical location data comprises one or more of a coordinate, a point of reference, a point of interest, a geographical location of one or more of the business entity, a representative, the conveyance client, the at least one AV, the owner/controller, a service provider, a good supplier, a freight provider, a brick and mortar, an object, a person, freight, a package, a beginning service location, an ending service location, a waypoint, a past location, a future location, and an estimated location.

15. The network of claim 1, wherein at least a portion of the conveyance service requests are pre-filtered conveyance service requests.

16. The network of claim 1, wherein at least one different geographical location is used other than the geographical location data when filtering the conveyance service requests.

17. The network of claim 1, wherein the conveyance service requests are filtered to identify the filtered subset of conveyance service requests by one or more of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, and comparing.

18. The network of claim 1, wherein the conveyance service requests are filtered using one or a combination of the one or more owner/controller-selected preference and the geographical location data to identify the filtered subset of conveyance service requests by one or more of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, and comparing.

19. The network of claim 1, wherein the one or more matches is identified from the filtered subset of conveyance service requests by processing using one or more algorithm selected from the group consisting of sorting, selection, search, merge, maximum function, minimum function, and comparison.

20. The network of claim 1, wherein the one or more matches is identified between the filtered subset of conveyance service requests and the at least one AV by processing using one or more algorithm selected from the group consisting of sorting, selection, search, merge, maximum function, minimum function, and comparison.

21. The network of claim 1, wherein the one or more matches is identified from the filtered subset of conveyance service requests relating to at least one weighted average of the one or more owner/controller-selected preference.

22. The network of claim 1, wherein the one or more matches is identified from the filtered subset of conveyance service requests relating to at least one weighted average of the geographical location data.

23. The network of claim 1, wherein the at least one AV comprises one or more vehicle selected from an automobile, a delivery vehicle, a vehicle with a compartment, a truck, a shuttle, a vessel, an aircraft, a spacecraft, a bus, a train, a transportation machine, and a drone.

24. The network of claim 1, wherein the at least one external server and the at least one central server are operated by the business entity or the owner/controller.

25. The network of claim 1, wherein at least one representative provides or performs all or some of the one or more conveyance services in conjunction with the at least one AV.

26. The network of claim 1, wherein at least one of the group consisting of the conveyance service requests, conveyance data, the one or more matches, the additional conveyance service requests, the one or more owner/controller-selected preference, and the geographical location data is identified or updated in substantially real time as the geographical location of the at least one AV updates or changes or as traffic information updates or changes.

27. The network of claim 1, wherein the one or more matches comprise a plurality of matches that are secured concurrently.

28. The network of claim 1, wherein the one or more matches comprise matches that are secured in a different conveyance industry segment.

29. The network of claim 1, wherein the one or more matches comprise matches that are secured in a similar conveyance industry segment.

30. The network of claim 1, wherein the one or more matches comprise matches that are secured and the at least one central server is further configured to generate an updated order in which the one or more conveyance services are to be performed.

31. The network of claim 1, wherein the one or more matches comprise matches that are secured and an updated route is identified or updated.

32. The network of claim 1, wherein the at least one owner/controller application comprises one or more of a mobile application, a website, and a plugin.

33. The network of claim 1, wherein the owner/controller and the business entity are a single entity.

34. The network of claim 1, wherein the at least one central server is located on a terminal associated with the at least one AV.

35. The network of claim 1, wherein the geographical location data is identified or updated in substantially real time.

36. The network of claim 1, wherein the at least one central server utilizes machine learning technology to execute one or more of steps (a), (b), (c), (d), and (e).

37. The network of claim 1, wherein the at least one central server is automated in part and further configured to communicate the one or more matches to the owner/controller, and wherein the owner/controller accepts or declines the one or more matches.

38. The network of claim 37, wherein the owner/controller declines the one or more matches and in response thereto, the at least one central server identifies one or more different matches.

39. A method for securing one or more conveyance services for a conveyance client by at least one autonomous vehicle (AV) operated by an owner/controller and in communication with the network, the conveyance client having a conveyance client device in communication within the network for submitting conveyance service requests, the method comprising:
   (a) receiving at at least one central server in communication with the network, in any order:
      (i) the conveyance service requests from at least one external server associated with a business entity that provides goods or services, wherein, the at least one external server comprising a source of the conveyance service requests, wherein the conveyance service requests comprise a plurality of features including conveyance data, at least a portion of conveyance data comprising autonomous vehicle (AV)-related data relating to the at least one AV;
      (ii) geographical location data; and
      (iii) one or more owner/controller-selected preference entered by the owner/controller;
   (b) filtering the conveyance service requests to identify a filtered subset of conveyance service requests using one or a combination of the one or more owner/controller-selected preference and the geographical location data;
   (c) identifying one or more matches between the filtered subset of conveyance service requests and the at least one AV based on one or a combination of the one or more owner/controller-selected preference and the geographical location data;
   (d) securing the one or more matches; and
   (e) communicating one or more of the one or more matches and conveyance service instructions to the at least one AV to provide the one or more conveyance services for the conveyance client;
   wherein the at least one central server is further configured to continuously repeat steps (a) through (e) for additional conveyance service requests, until halted by the owner/controller or the business entity.

40. The method of claim 39, wherein the at least one central server performs one or more of standardizing and aggregating at least a portion of the conveyance service requests.

41. The method of claim 39, wherein at least one of a portion of the conveyance service requests is structured in at least one different format, wherein the at least one central server is further configured to standardize or convert the differently-formatted portion into at least one uniform format.

42. The method of claim 39, wherein one or more of the conveyance service requests and conveyance data is pre-structured in at least one uniform format prior to being transmitted by the at least one external server.

43. The method of claim 39, wherein at least a portion of the conveyance service requests are pre-filtered conveyance service requests.

44. The method of claim 39, wherein the one or more owner/controller-selected preference is stored or cached on the at least one central server.

45. The method of claim 39, wherein the one or more owner/controller-selected preference is received at the at least one central server and stored or cached on one or more of the at least one AV, the at least one central server, and the at least one external server.

46. The method of claim 39, wherein the owner/controller utilizes one or more of a mobile application, a website, and a plugin to store or cache the one or more owner/controller-selected preference within the network.

47. The method of claim 39, wherein the one or more owner/controller-selected preference is stored or cached on one or more of the at least one AV, the at least one central server, and the at least one external server, further wherein the one or more owner/controller-selected preference is not provided again by the owner/controller.

48. The method of claim 39, wherein the geographical location data comprises one or more of a coordinate, a point of reference, a point of interest, a geographical location of one or more of the business entity, a representative, the conveyance client, the at least one AV, the owner/controller, a service provider, a good supplier, a freight provider, a brick and mortar, an object, a person, freight, a package, a beginning service location, an ending service location, a waypoint, a past location, a future location, and an estimated location.

49. The method of claim 39, wherein the geographical location data is identified or updated in substantially real time.

50. The method of claim 39, wherein the at least one AV further comprises a terminal configured to communicate one or more of the geographical location data and AV-related data with the network.

51. The method of claim 39, wherein the conveyance service requests are selected from requests for service comprising one or more of ride-hail, ride-share, car-share, peer-to-peer conveyance, transportation, person delivery, taxi, shuttle, item delivery, medical delivery, food delivery, freight delivery, and animal delivery.

52. The method of claim 39, wherein at least one different geographical location is used other than the geographical location data when filtering the conveyance service requests.

53. The method of claim 39, wherein the conveyance service requests are filtered to identify the filtered subset of conveyance service requests by one or more of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, and comparing.

54. The method of claim 39, wherein the conveyance service requests and conveyance data are filtered using one or a combination of the one or more owner/controller-selected preference and the geographical location data to identify the filtered subset of conveyance service requests by one or more of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, and comparing.

55. The method of claim 39, wherein the one or more matches is identified from the filtered subset of conveyance service requests by processing using one or more algorithm selected from the group consisting of sorting, selection, search, merge, maximum function, minimum function, graph, tree, matrix, and comparison.

56. The method of claim 39, wherein the one or more matches is identified between the filtered subset of conveyance service requests and the at least one AV by processing using one or more algorithm selected from the group consisting of sorting, selection, search, merge, maximum function, minimum function, graph, tree, matrix, and comparison.

57. The method of claim 39, wherein the one or more matches is identified from the filtered subset of conveyance service requests relating to at least one weighted average of the one or more owner/controller-selected preference.

58. The method of claim 39, wherein the one or more matches is identified from the filtered subset of conveyance service requests relating to at least one weighted average of the geographical location data.

59. The method of claim 39, wherein the owner/controller secures the one or more matches using an owner/controller application or an AV-application.

60. The method of claim 39, wherein the at least one central server is automated in part and further configured to communicate the one or more matches to the owner/controller.

61. The method of claim 39, wherein one or more of the at least one central server, the at least one external server, the business entity, the at least one AV, and the owner/controller, secures the one or more matches.

62. The method of claim 39, wherein one or more of the conveyance service requests and conveyance data is provided by the at least one external server, the business entity, or the owner/controller.

63. The method of claim 39, wherein the at least one external server comprises a plurality of external servers, and wherein each external server is associated with a different business entity.

64. The method of claim 39, wherein the owner/controller and the business entity are a single entity.

65. The method of claim 39, the one or more matches comprise a plurality of matches that are secured concurrently.

66. The method of claim 39, wherein the one or more matches comprise matches that are secured in a different conveyance industry segment.

67. The method of claim 39, wherein the one or more matches comprise matches that are secured in a similar conveyance industry segment.

68. The method of claim 39, wherein the one or more matches comprise matches that are secured and the at least one central server is further configured to generate an updated order in which the one or more conveyance services are to be performed.

69. The method of claim 39, wherein the one or more matches comprise matches that are secured and the at least one central server is further configured to generate an updated or modified route in which the one or more conveyance services are to be performed.

70. The method of claim 39, wherein at least one representative provides or performs all or some of the one or more conveyance services in conjunction with the at least one AV.

71. The method of claim 39, wherein at least one of the group consisting of the conveyance service requests, conveyance data, the one or more matches, the additional conveyance service requests, the one or more owner/controller-selected preference, and the geographical location data is identified or updated in substantially real time as the geographical location of the at least one AV updates or changes or as traffic information updates or changes.

72. The method of claim 39, wherein the at least one central server utilizes machine learning technology to execute one or more of steps (a), (b), (c), (d), and (e).

73. The method of claim 39, wherein the business entity comprises one or more of a business, a freight provider, a service provider, a good supplier, a fleet manager, a logistics provider, a map provider, a courier, an individual, and the owner/controller.

74. The method of claim 39, wherein the owner/controller comprises one or more of an enterprise, a service provider, a good supplier, a fleet manager, a freight provider, a logistics provider, the business entity, a map provider, a courier, a representative, a private owner/controller, and an individual person.

75. The method of claim 39, wherein conveyance data comprises at least one of data type selected from beginning service geographical location, ending service geographical location, pricing information, the one or more owner/controller-selected preference, distance parameter, estimated time of arrival, time to destination, traffic, coordinates, point of interest, point in time, perspective, the geographical location data, conveyance client geographical location, conveyance client detail, conveyance service detail, conveyance service route, sensor data, representative geographical location, representative detail, the AV-related data, autonomous vehicle geographical location, autonomous vehicle detail, route planning preference, battery longevity preference, conveyance data preference, service provider geographical location, service provider detail, freight provider geographical location, freight provider detail, business entity geographical location, business entity detail, good supplier geographical location, good supplier detail, owner/controller geographical location, owner/controller detail, fleet manager geographical location, fleet manager detail, logistics provider geographical location, logistics provider detail, conveyance industry segment detail, event detail, entity detail, good detail, vehicle detail, statistical variable measurement, level of service detail, and fuel consumption.

76. The method of claim 39, wherein the one or more owner/controller-selected preference comprises one or more service characteristic selected from pricing, geographical location, distance, route, service duration, estimated time of arrival, beginning service geographical location, ending service geographical location, the geographical location data, time, predictive, historical, efficiency, sensor, event, traffic, road condition, weather condition, transportation, route planning, fuel economy, battery longevity, vehicle capacity, vehicle diagnostic, the AV-related data, conveyance data, duration of conveyance service, conveyance service request density, conveyance client density, conveyance client detail, representative density, autonomous vehicle density, service provider, service provider density, level of service, good supplier, good supplier density, owner/controller detail, owner/controller density, fleet manager, the business entity, business entity density, fleet manager density, logistics provider, logistics provider density, freight provider, freight provider density, good detail, conveyance industry segment, freight, waypoint, and delivery service.

77. The method of claim 60, wherein the owner/controller accepts or declines the one or more matches.

78. The method of claim 77, wherein the owner/controller declines the one or more matches and in response thereto, the at least one central server identifies one or more different matches.

\* \* \* \* \*